(12) United States Patent
Kudo et al.

(10) Patent No.: US 6,497,621 B2
(45) Date of Patent: Dec. 24, 2002

(54) CONSTANT VELOCITY UNIVERSAL JOINT AND METHOD FOR ASSEMBLING THE SAME

(75) Inventors: Satoru Kudo, Mooka (JP); Shouichi Nakao, Mooka (JP); Tsutomu Kawakatsu, Mooka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/984,898

(22) Filed: Oct. 31, 2001

(65) Prior Publication Data

US 2002/0045486 A1 Apr. 18, 2002

Related U.S. Application Data

(62) Division of application No. 09/456,488, filed on Dec. 7, 1999.

(30) Foreign Application Priority Data

| Dec. 8, 1998 | (JP) | 10-349144 |
| Dec. 25, 1998 | (JP) | 10-371639 |
| Sep. 27, 1999 | (JP) | 11-272958 |

(51) Int. Cl.$^7$ ............................................. F16D 3/202
(52) U.S. Cl. ..................... 464/111; 464/120; 464/905
(58) Field of Search .................. 384/569; 464/111, 464/120, 122, 123, 124, 905

(56) References Cited

U.S. PATENT DOCUMENTS

| 4,010,625 A | * 3/1977 | Orain ......................... 464/111 |
| 4,955,847 A | * 9/1990 | Orain ......................... 464/111 |
| 5,069,653 A | 12/1991 | Mizukoshi |
| 5,376,049 A | * 12/1994 | Welschof et al. ............ 464/111 |
| 5,507,693 A | 4/1996 | Schwarzler et al. |
| 5,525,109 A | 6/1996 | Hofmann et al. |
| 5,538,473 A | 7/1996 | Busch et al. |
| 5,573,464 A | 11/1996 | Hofmann et al. |
| 5,591,085 A | 1/1997 | Stall et al. |
| 5,791,995 A | * 8/1998 | Kudo et al. ................... 464/11 |
| 5,836,822 A | 11/1998 | Kudo et al. |
| 6,168,529 B1 | * 1/2001 | Moulinet ..................... 464/905 |
| 6,176,787 B1 | * 1/2001 | Oh ............................. 464/111 |
| 6,217,454 B1 | * 4/2001 | Ikeda et al. .................. 464/111 |
| 6,298,556 B1 | * 10/2001 | Stall et al. .................... 464/111 |

FOREIGN PATENT DOCUMENTS

| DE | 0532992 A2 | 3/1992 |
| DE | 9218285 U | 4/1994 |
| DE | 4305278 C1 | 7/1994 |
| DE | 4327036 A1 | 2/1995 |
| DE | 4331474 A1 | 3/1995 |
| EP | 0441382 A1 | 8/1991 |
| FR | 2608701 A | 6/1988 |
| FR | 2670547 | 6/1992 |
| FR | 2698928 | 6/1992 |
| GB | 226102 A | 6/1990 |
| JP | 54132046 | 10/1979 |
| JP | A-7103251 | 4/1995 |
| JP | 10184717 | 7/1998 |
| WO | WO9006451 A | 6/1990 |
| WO | WO9523928 | 9/1995 |

* cited by examiner

*Primary Examiner*—Greg Binda
*Assistant Examiner*—Aaron M Dunwoody
(74) *Attorney, Agent, or Firm*—Birch, Stewart, Kolasch & Birch, LLP

(57) ABSTRACT

A constant velocity universal joint comprises trunnions each of which expands toward a guide groove and each of which is provided with a spherical surface along a circumferential direction, inner rollers each of which has a recess having a spherical surface formed on an inner circumferential surface to make surface-to-surface contact corresponding to the spherical surface, and outer rollers each of which is externally fitted to the inner roller via needle bearings and each of which is provided relatively displaceably with respect to the inner roller along an axial direction (direction of the arrow B) of the trunnion.

17 Claims, 53 Drawing Sheets

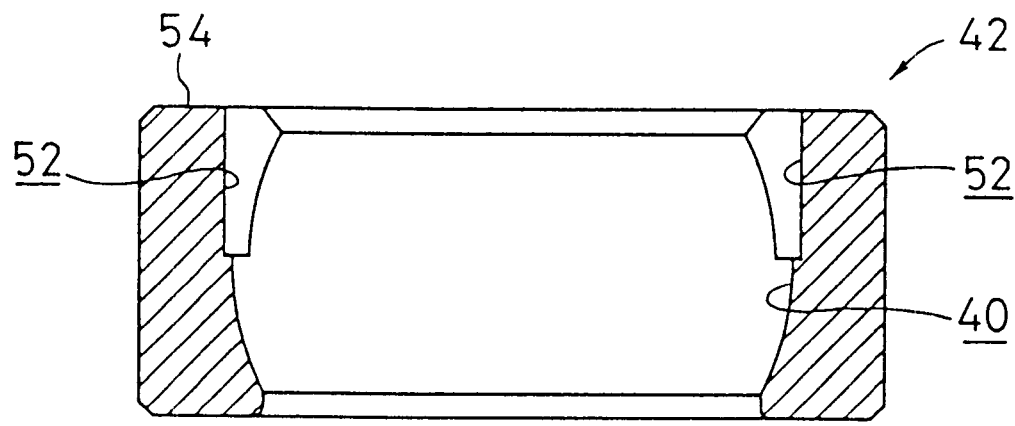
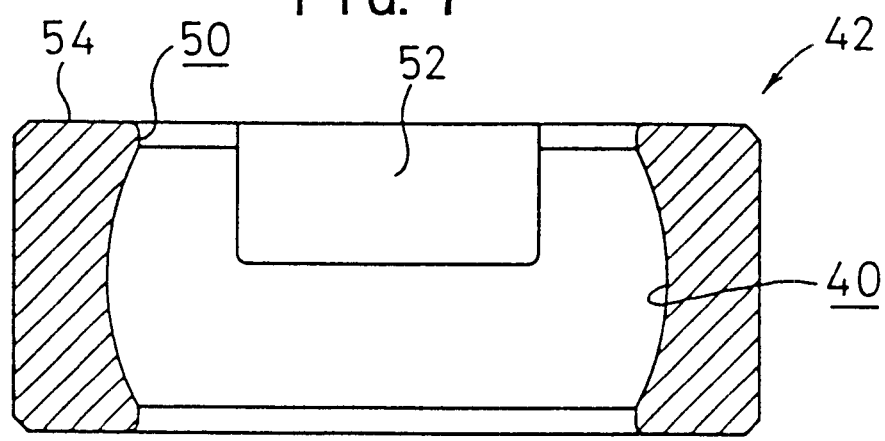

F I G. 56
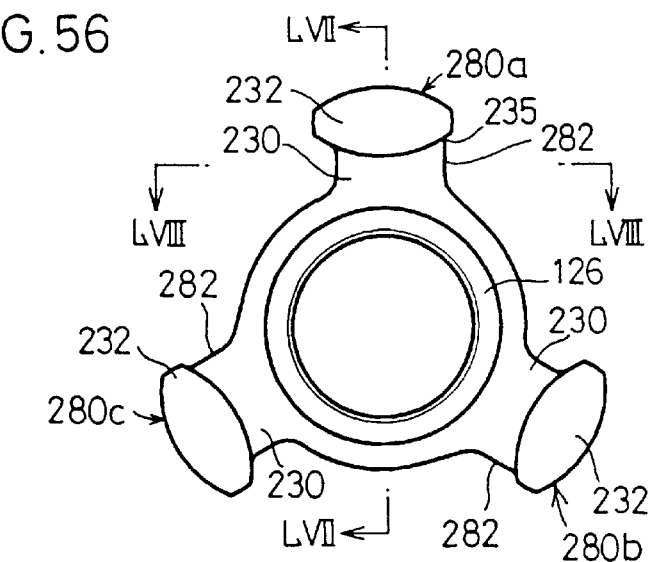
F I G. 57
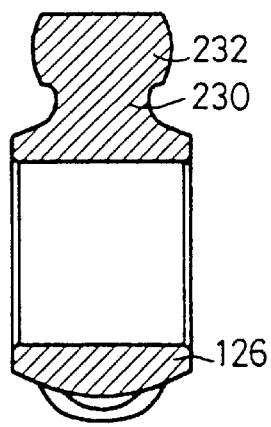
F I G. 58
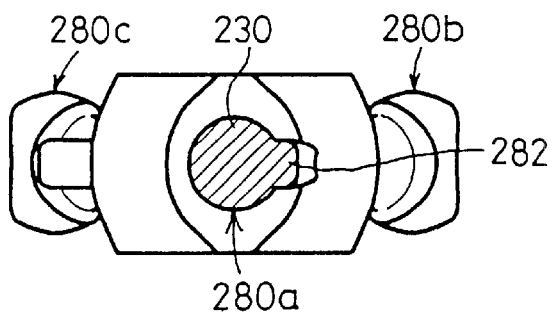

F I G. 61
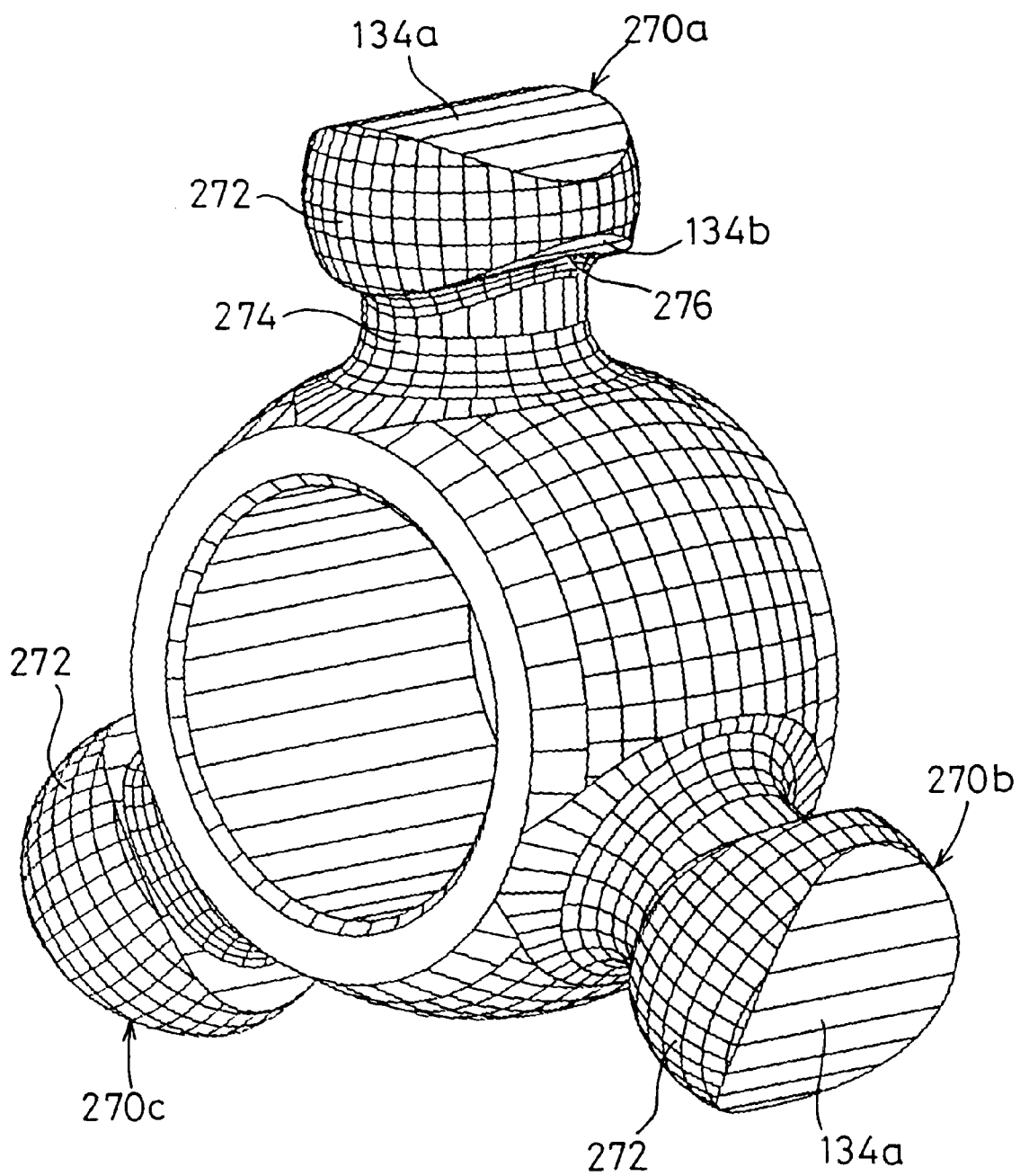

F I G. 68
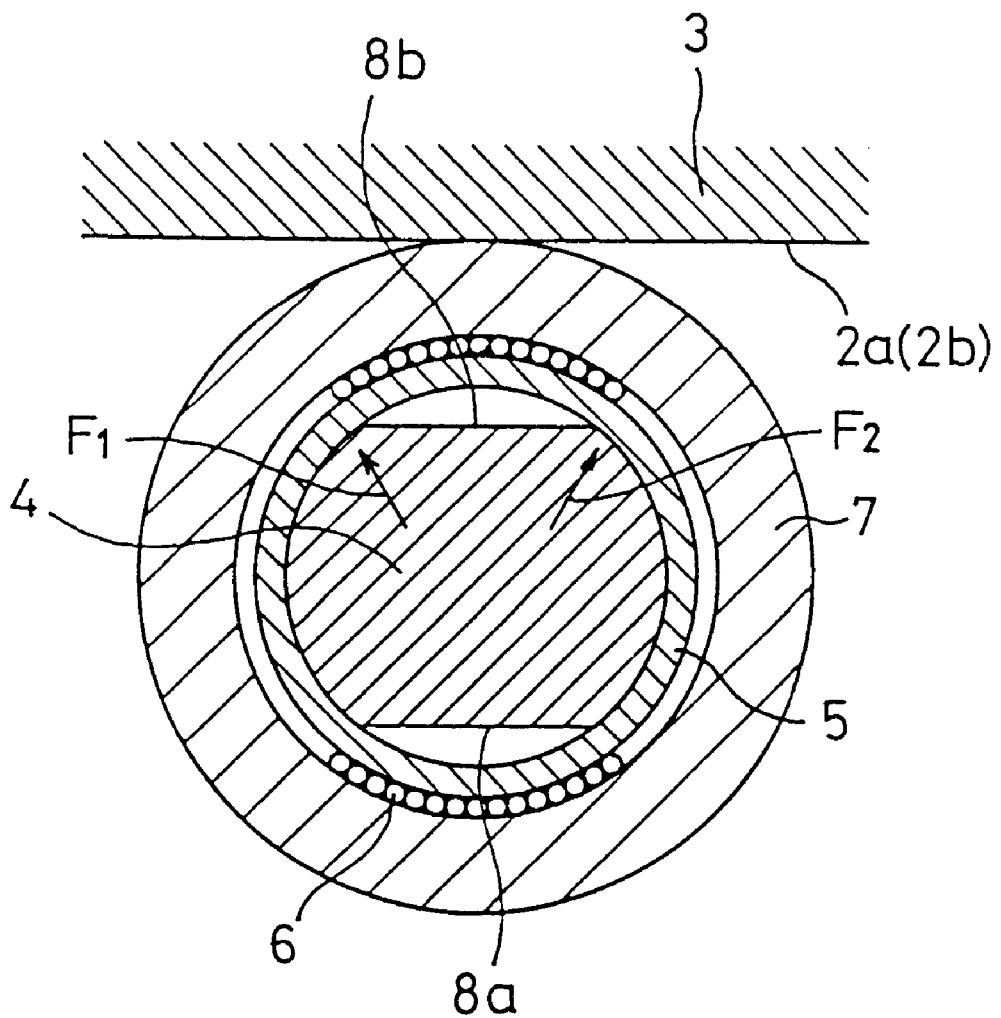

CONSTANT VELOCITY UNIVERSAL JOINT AND METHOD FOR ASSEMBLING THE SAME

CROSS REFERENCE TO RELATED APPLICATIONS

This is a Divisional Patent application of application Ser. No. 09/456,488 filed on Dec. 17, 1999, the entire contents of which are hereby incorporated by reference and for which priority is claimed under 35 USC 120; and this application claims priority of application Ser. Nos. 10-349144, 10-371639 and 11-272958 filed in Japan on Dec. 8, 1998, Dec. 25, 1998 and Sep. 27, 1999, respectively.

BACKGROUND OF THE INVENTION

1. Field of the Invention

The present invention relates to a constant velocity universal joint which is used, for example, to couple a first transmission shaft and a second transmission shaft at a driving force-transmitting section of an automobile. The present invention also relates to a method for assembling such a constant velocity universal joint.

2. Description of the Related Art

A constant velocity universal joint has been hitherto used for a driving force-transmitting section of an automobile, for coupling a first transmission shaft and a second transmission shaft so that the rotary force is transmitted to each axle.

Such a constant velocity universal joint concerning the conventional technique is shown in FIGS. 67 and 68 (see Japanese Laid-Open Patent Publication No. 7-103251).

The constant velocity universal joint 1 comprises mutually opposing guide tracks 2a, 2b which are formed on an inner wall surface of an outer joint 3. A spherical tripod journal 4 is arranged between the guide tracks 2a, 2b. An inner roller 5 is externally fitted to the tripod journal 4. An outer roller 7 is supported via a plurality of needle bearings 6 on an outer circumferential surface of the inner roller 5.

In this arrangement, surfaces 8a, 8b, 9a, 9b, which extend substantially in parallel to the axis of the tripod journal 4, are formed on the circumferential surfaces of the tripod journal 4 and the outer roller 7 on the both opposing sides in the rotational direction of the joint. The surfaces 8a, 8b, 9a, 9b function such that the force, which is applied to the tripod journal 4 and which is effective in the circumferential direction, is divided into two components of force. Owing to such an arrangement, the improvement in distribution of the contact surface pressure is achieved under the load of torque.

However, in the case of the constant velocity universal joint 1 concerning the conventional technique described above, for example, each of the components of force $F_1, F_2$, which is applied to the inner roller 5 by the surface 8b formed on the circumferential surface of the tripod journal 4, is composed of a relatively high load. Therefore, an inconvenience arises in that the contact surface pressure (force to press the contact surface), which is exerted in the direction of the arrow between the tripod journal 4 and the inner roller 5, is increased as compared with the contact surface pressure on other circumferential surfaces. This results in a problem that the durability is deteriorated.

Further, the constant velocity universal joint 1 concerning the conventional technique comprises the inner roller 5 and the outer roller 7 held by the guide tracks 2a, 2b via the needle bearings 6. The tripod journal 4 is provided such that it makes displacement in the vertical direction along the inner wall surface of the inner roller 5 held by the guide tracks 2a, 2b. Therefore, the constant velocity universal joint 1 concerning the conventional technique is inconvenient in that it is impossible to reduce the slide resistance on the sliding surface between the tripod journal 4 and the inner roller 5.

SUMMARY OF THE INVENTION

A general object of the present invention is to provide a constant velocity universal joint which makes it possible to improve the durability by decreasing the contact surface pressure on the contact surface between a trunnion and an annular member externally fitted to the trunnion.

A principal object of the present invention is to provide a constant velocity universal joint which makes it possible to further improve the induced thrust performance by reducing the slide resistance generated when a first transmission shaft is inclined and a trunnion is displace along a guide groove.

Another object of the present invention is to provide a constant velocity universal joint which makes it possible to further improve the strength of a trunnion without inhibiting the assembling performance when an annular member is externally fitted to the trunnion.

Still another object of the present invention is to provide a method for assembling a constant velocity universal joint, which makes it possible to conveniently assemble a trunnion provided with a spherical surface and an annular member formed with a recess corresponding to the spherical surface of the trunnion.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 shows a vertical sectional view taken along a line VI—VI shown in FIG. 5;

FIG. 7 shows a vertical sectional view taken along a line VII—VII shown in FIG. 5;

FIG. 56 shows a front view illustrating the trunnions shown in FIG. 55;

FIG. 57 shows a vertical sectional view taken along a line LVII—LVII shown in FIG. 56;

FIG. 58 shows a lateral sectional view taken along a line LVIII—LVIII shown in FIG. 56;

FIG. 61 shows a perspective view illustrating comparative trunnions constructed for the purpose of comparison;

FIG. 68 shows a lateral sectional view, with partial omission, illustrating the constant velocity universal joint concerning the conventional technique.

DESCRIPTION OF THE PREFERRED EMBODIMENTS

Figure 1:
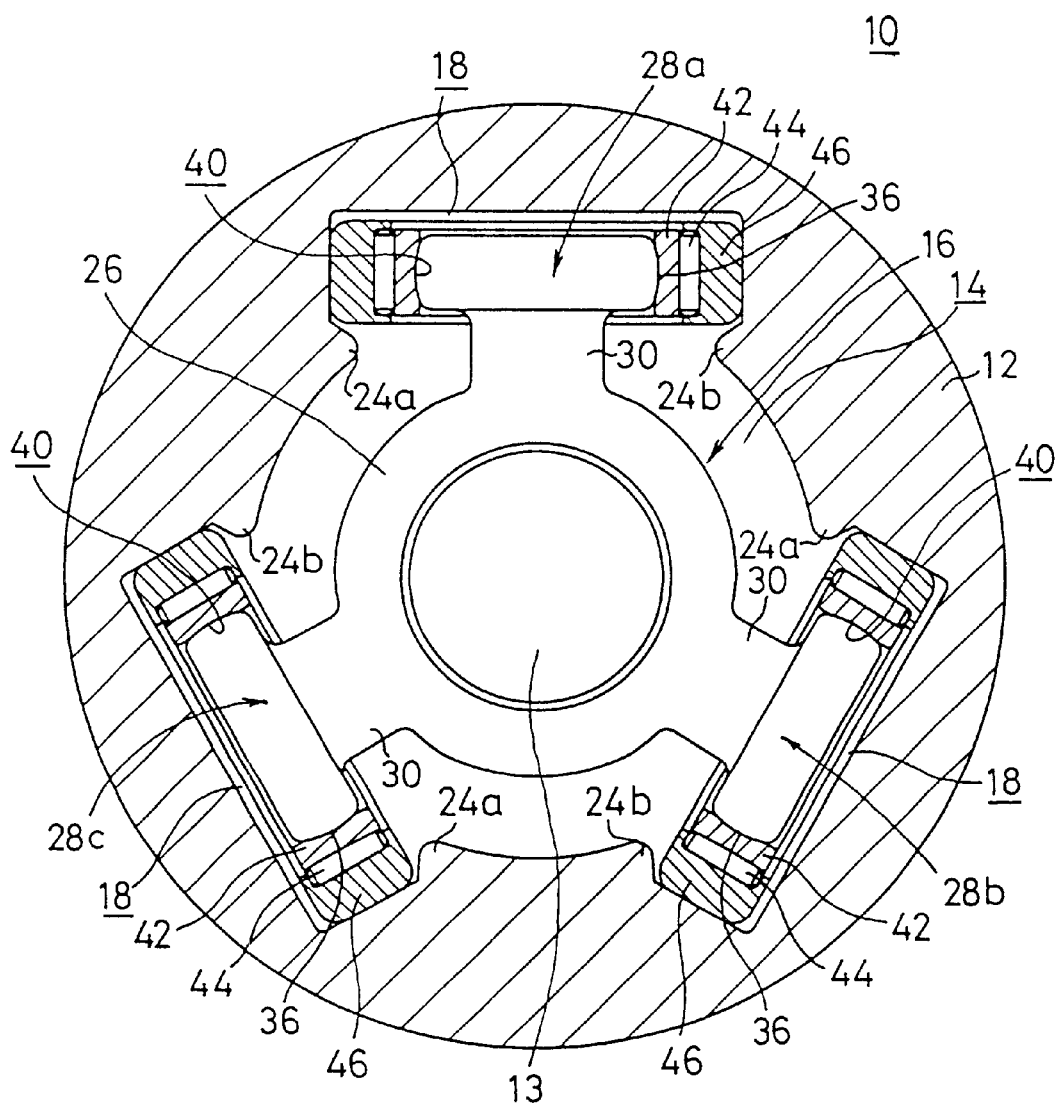
FIG. 1 shows a vertical sectional view taken along a direction substantially perpendicular to a longitudinal direction of a constant velocity universal joint according to a first embodiment of the present invention.
Figure 2:
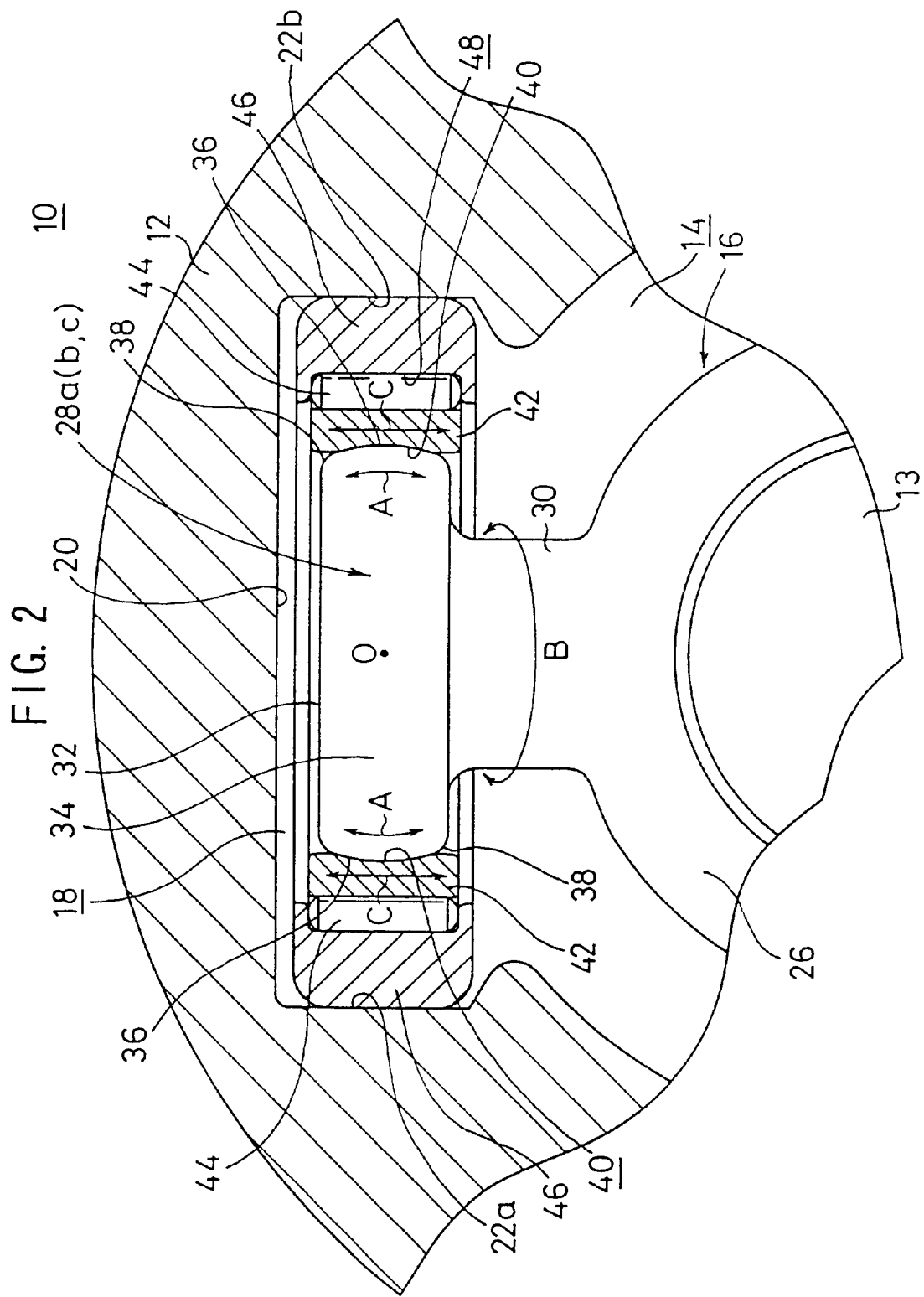
FIG. 2 shows an enlarged vertical sectional view, with partial omission, illustrating the constant velocity universal joint shown in FIG. 1.

With reference to FIGS. 1 and 2, reference numeral 10 indicates a constant velocity universal joint according to the first embodiment of the present invention.

The constant velocity universal joint 10 basically comprises a cylindrical outer cup (outer member) 12 which has an opening and which is integrally connected to one end of an unillustrated first shaft, and an inner member 16 which is secured to one end of a second shaft 13 and which is accommodated in a hole 14 of the outer cup 12.

As shown in FIG. 1, three guide grooves 18, which extend in the axial direction and which are spaced apart from each other by about 120 degrees about the central axis, are formed on the inner wall surface of the outer cup 12. As shown in FIG. 2, the guide groove 18 includes a ceiling section 20 which is formed to have a planar configuration, and side surface sections 22a, 22b which are formed substantially perpendicularly on both sides of the ceiling section 20 and which are opposed to one another. Each of the side surface sections 22a, 22b is formed to have a planar configuration extending along the axial direction of the outer cup 12.

A pair of step sections 24a, 24b, which continue to lower ends of the side surface sections 22a, 22b and which are opposed to one another, are formed on the inner wall surface of the outer cup 12.

Figure 3:
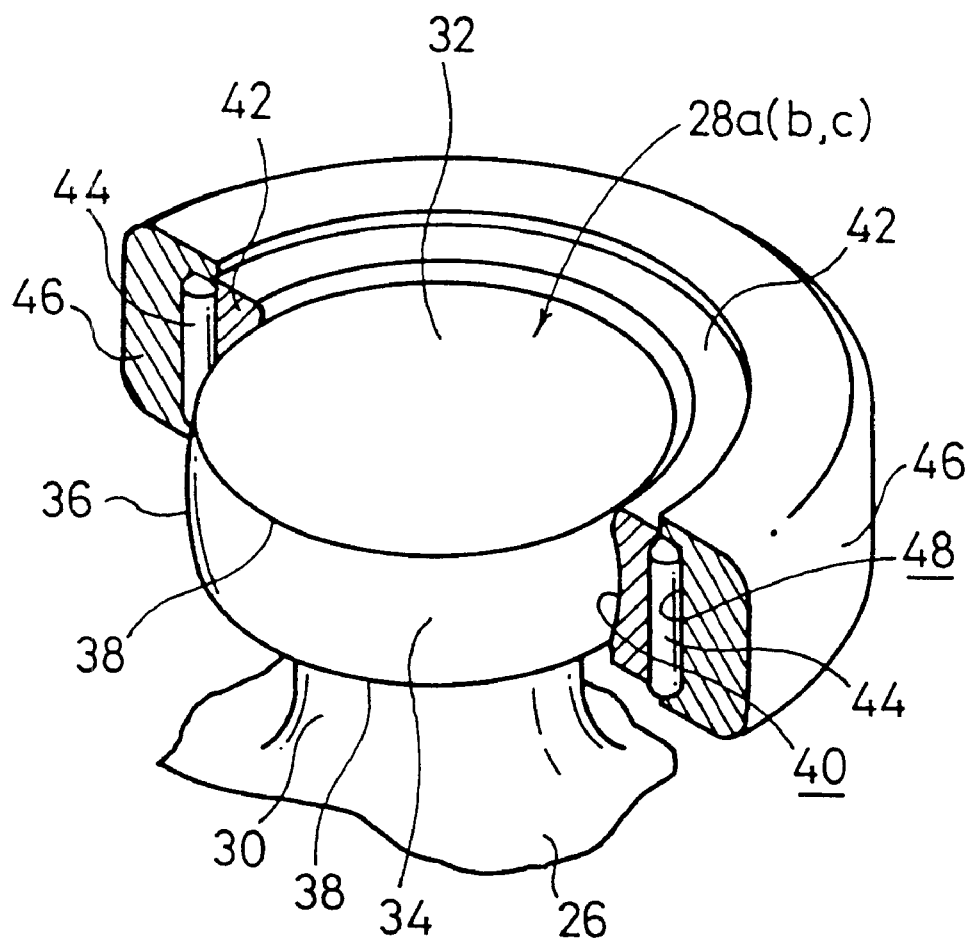
FIG. 3 shows a perspective view, with partial cutout, illustrating an inner member arranged in an outer cup.

A ring-shaped spider boss 26 is externally fitted to the second shaft 13. Three trunnions 28a to 28c, which expand toward the guide grooves 18 respectively and which are spaced apart from each other by about 120 degrees about the central axis, are integrally formed on the outer circumferential surface of the spider boss 26. As shown in FIG. 3, each of the trunnions 28a (28b, 28c) integrally comprises a neck section 30 which expands radially outwardly from the ring-shaped spider boss 26, and a flat disk section 34 which has a flat upper surface 32. An outer circumferential surface of the trunnion 28a (28b, 28c), which is substantially perpendicular to the upper surface 32, is formed to be a spherical surface 36. A filleting section 38 having a curved cross section is provided at a boundary between the upper surface 32 and the spherical surface 36 and at a boundary between the lower surface and the spherical surface 36 of each of the trunnions 28a, (28b, 28c).

As shown in FIG. 3, those disposed between the trunnion 28a (28b, 28c) and the side surface sections are an inner roller (first annular member) 42 which is composed of a ring member and which is formed with a recess 40 having a spherical surface over the entire inner circumferential surface corresponding to the spherical surface 36 of the trunnion 28a (28b, 28c), and an outer roller (second annular member) 46 which is externally fitted to the inner roller 42 via a plurality of needle bearings (bearing members) 44. The plurality of needle bearings 44 are rollably installed in annular recesses 48 which are formed on the inner circumferential surface of the outer roller 46, and they are incorporated so that they are not disengaged from the recesses 48 owing to the keystone effect.

Figure 4:
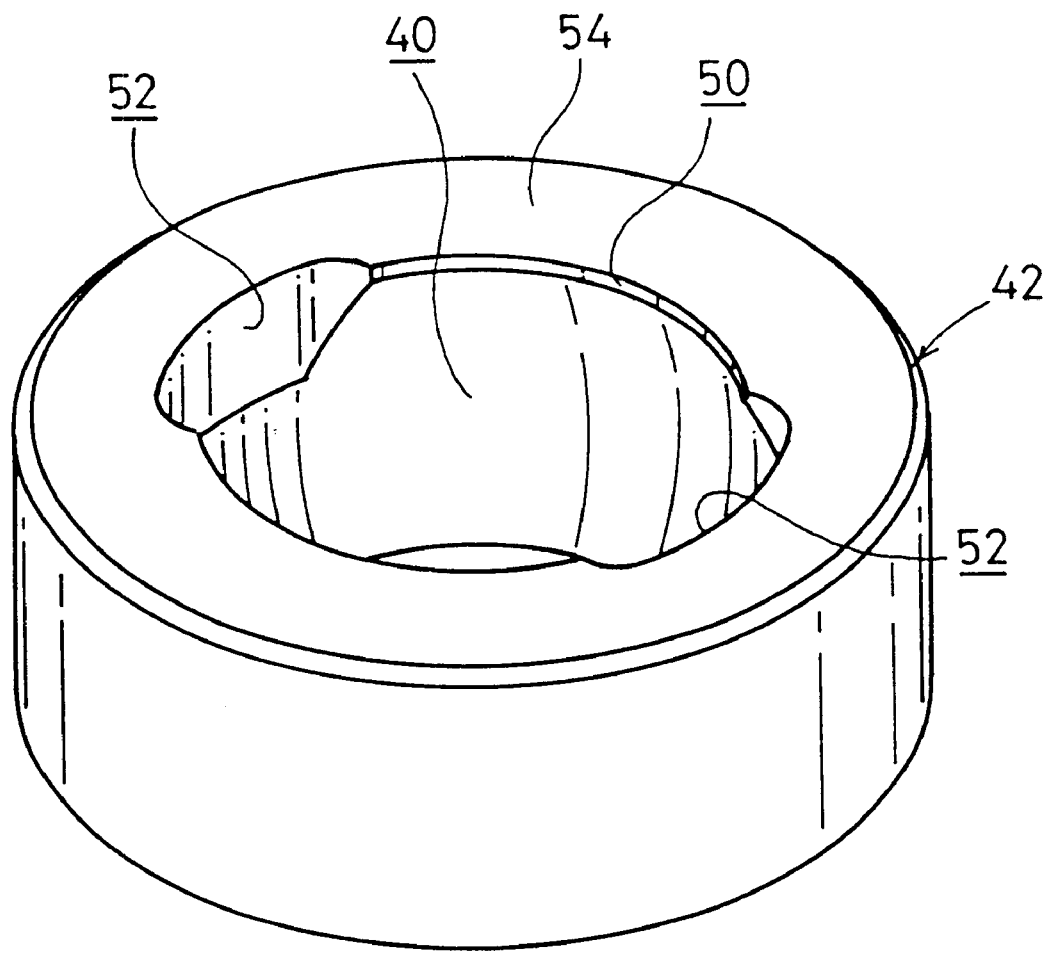
FIG. 4 shows a perspective view illustrating an inner roller for constructing the inner member.
Figure 5:
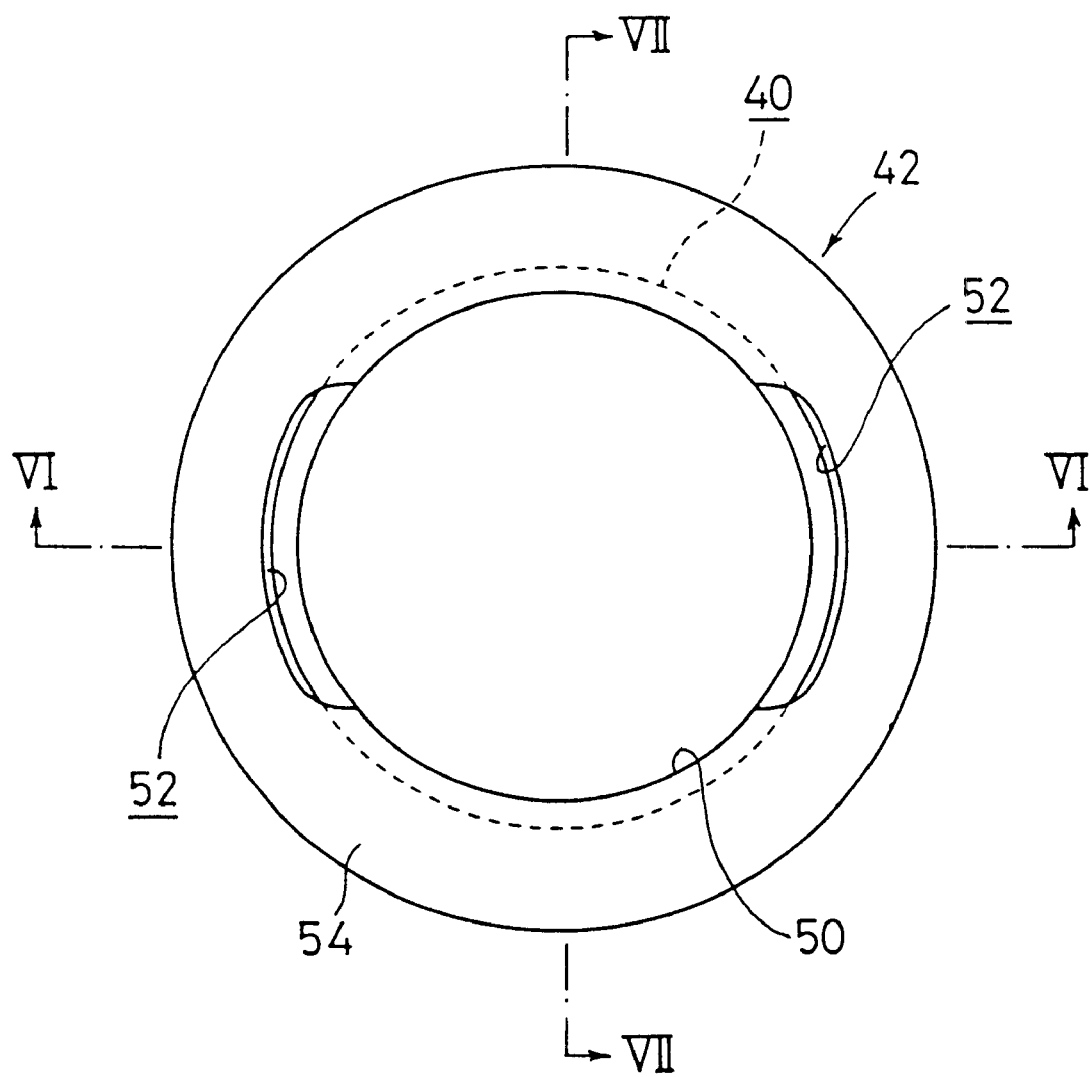
FIG. 5 shows a plan view illustrating the inner roller shown in FIG. 4.
Figure 8:
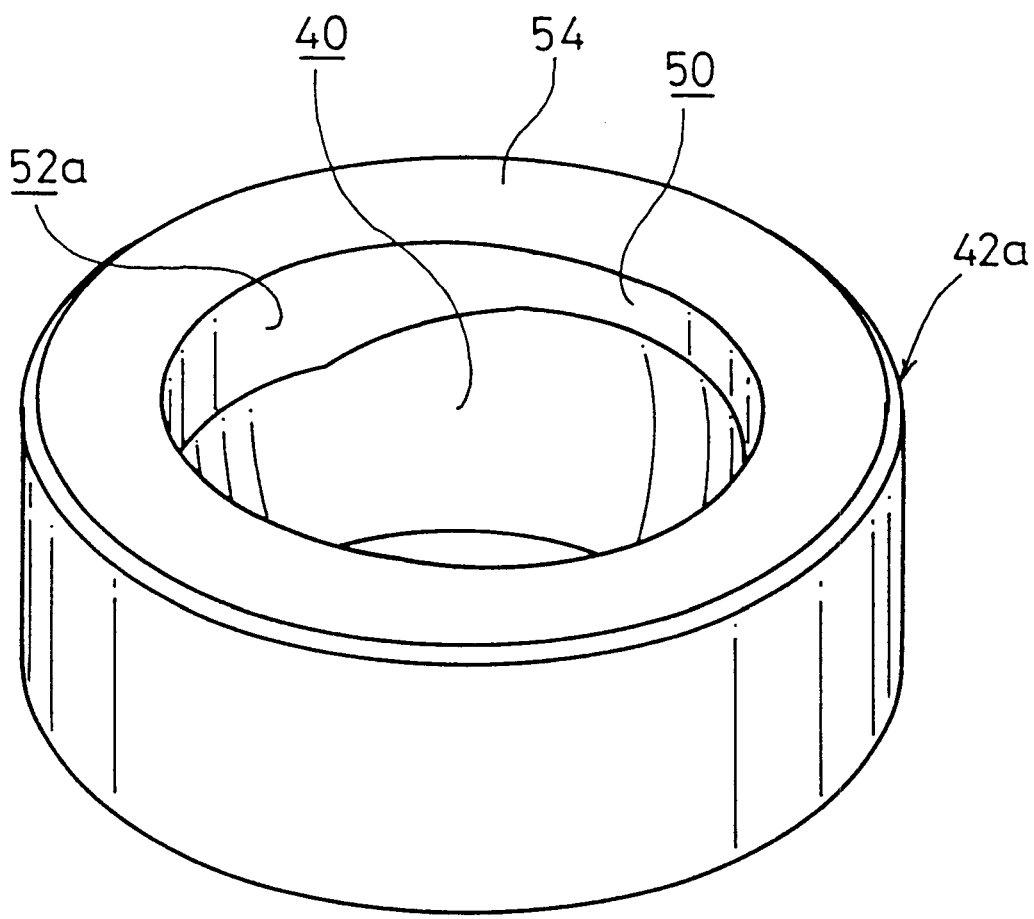
FIG. 8 shows a perspective view illustrating a modified embodiment of the inner roller shown in FIG. 4.
Figure 9:
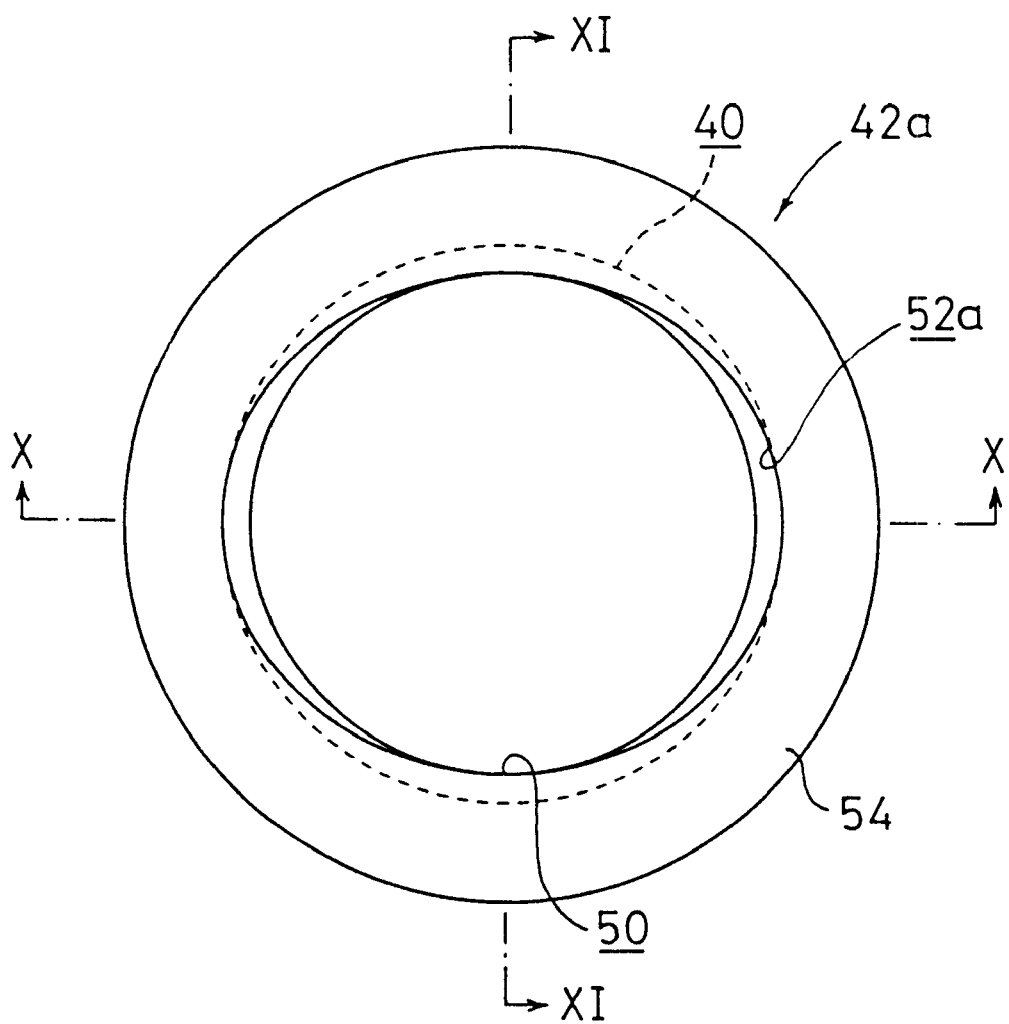
FIG. 9 shows a plan view illustrating the inner roller shown in FIG. 8.
Figure 10:
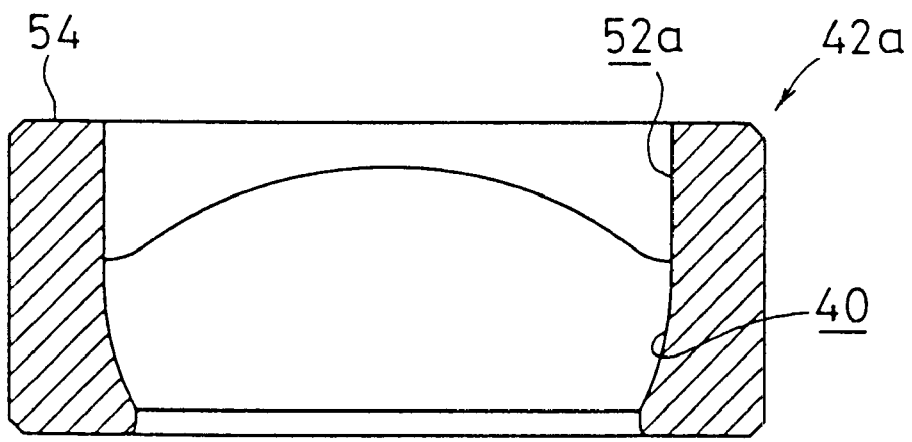
FIG. 10 shows a vertical sectional view taken along a line X—X shown in FIG. 9.
Figure 11:
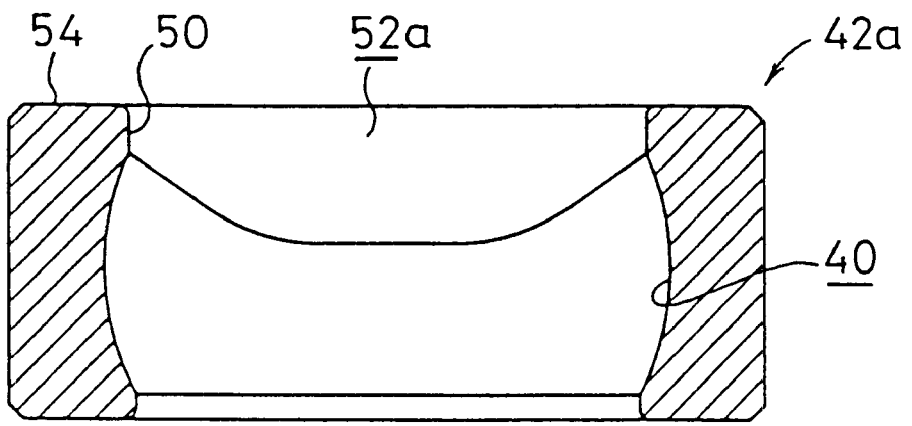
FIG. 11 shows a vertical sectional view taken along a line XI—XI shown in FIG. 9.

Cutouts 52 are formed on the inner roller 42 in order to easily assemble the trunnion 28a (28b, 28c) into a hole 50 of the inner roller 42. As shown in FIG. 4, the cutouts 52 are formed to have a pair of mutually opposing circular arc-shaped configurations disposed at boundary portions between an upper surface 54 and an inner wall surface of the circular hole 50. Alternatively, as shown in FIG. 8, in place of the inner roller 42, it is also preferable to use an inner roller 42a which includes substantially elliptic cutouts 52a formed at boundary portions between the upper surface 54 and the inner wall surface.

The spherical surface 36 of the trunnion 28a (28b, 28c) and the recess 40 of the inner roller 42 are provided to make surface-to-surface contact with each other. Therefore, the trunnion 28a (28b, 28c) is provided rotatably in the direction of the arrow A about a center of a point O (see FIG. 2) with respect to the inner roller 42, and it is provided rotatably in the circumferential direction (direction of the arrow B) along the spherical surface 36 about a center of rotation of the axis of the trunnion 28a (28b, 28c). Further, the trunnion 28a (28b, 28c) and the inner roller 42 are provided displaceably in the vertical direction (direction of the arrow C) in an integrated manner with respect to the needle bearings 44 held by the outer roller 46.

The constant velocity universal joint 10 according to the first embodiment of the present invention is basically constructed as described above. Next, its operation, function, and effect will be explained.

When the unillustrated first shaft is rotated, its rotary force is transmitted via the outer cup 12 to the inner member 16. Accordingly, the second shaft 13 is rotated in the predetermined direction by the aid of the trunnions 28a (28b, 28c).

That is, the rotary force of the outer cup 12 is transmitted to the inner roller 42 via the needle bearings 44 and the outer roller 46 contacting with the guide grooves 18. The rotary force is further transmitted to the trunnions 28a (28b, 28c) via the spherical surfaces 36 which make surface-to-surface contact with the recesses 40 of the inner rollers 42. Thus, the second shaft 13, which is engaged with the trunnions 28a (28b, 28c), is rotated.

In this arrangement, when the second shaft 13 is inclined by a predetermined angle with respect to the outer cup 12 provided with the first shaft, then the trunnion 28a (28b, 28c) makes sliding movement in the direction of the arrow A about the center of rotation of the point O, or the trunnion 28a (28b, 28c) makes sliding movement in the circumferential direction (direction of the arrow B) along the recess 40 having the spherical surface about the center of rotation of the axis of the trunnion 28a (28b, 28c), while maintaining the state in which the spherical surface of the trunnion 28a (28b, 28c) makes surface-to-surface contact with the recess 40 having the spherical surface formed on the inner roller 42.

The trunnion 28a (28b, 28c) is also displaced along the axial direction (direction of the arrow C) of the trunnion 28a (28b, 28c) integrally with the inner roller 42 which makes sliding movement with respect to the needle bearings 44 held by the outer roller 46.

Further, the trunnion 28a (28b, 28c) is displaced in the direction substantially perpendicular to the axis of the trunnion 28a (28b, 28c), i.e., in the longitudinal direction of the guide groove 18, by the aid of the outer roller 46 which makes sliding movement along the guide groove 18.

Thus, the rotary motion of the first shaft is smoothly transmitted to the second shaft 13 without being affected by the angle of inclination of the second shaft 13 with respect to the outer cup 12.

In the first embodiment, the spherical surface 36 is provided on the side surface of the trunnion 28a (28b, 28c) to make sliding movement with respect to the inner roller 42 formed with the recess 40 corresponding to the spherical surface 36. Further, the trunnion 28a (28b, 28c) and the inner roller 42 are provided displaceably along the axial direction of the trunnion 28a (28b, 28c). Thus, it is possible to decrease the slide resistance and reduce the induced thrust force. Furthermore, the trunnion 28a (28b, 28c) and the recess 40 of the inner roller 42 make surface-to-surface contact with each other to reduce the contact surface pressure. Thus, it is possible to improve the durability of the constant velocity universal joint 10.

Figure 67:
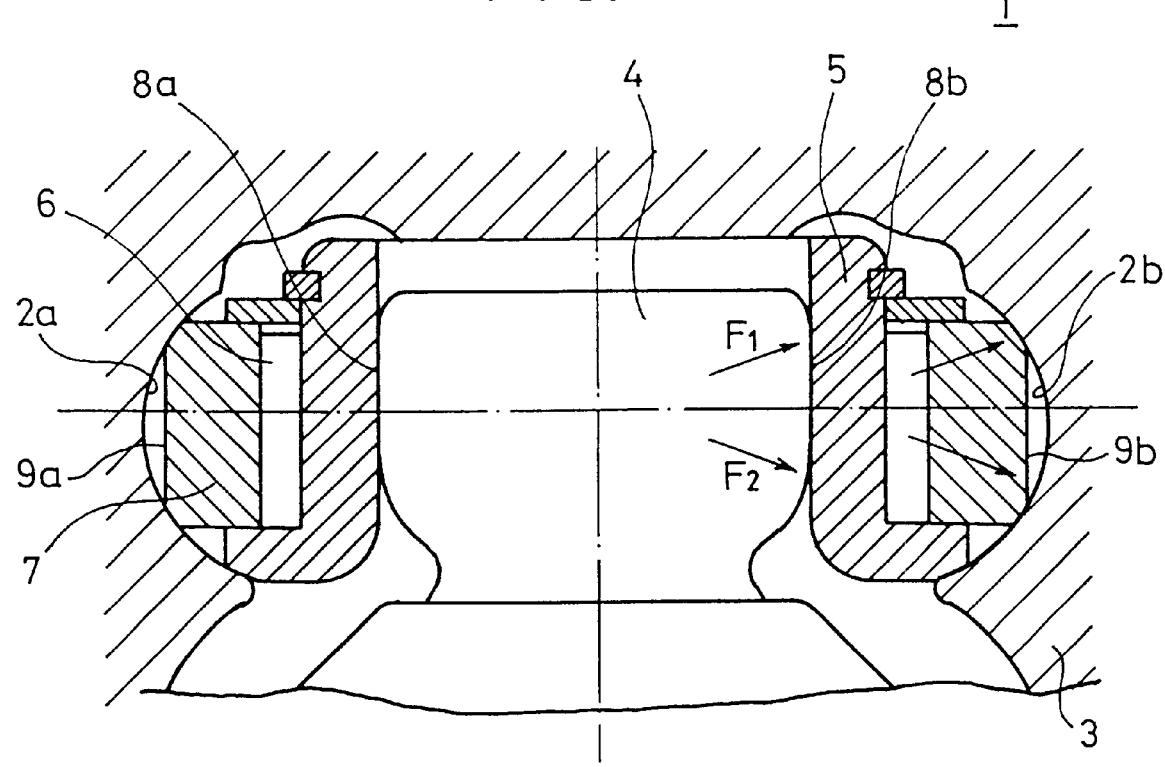
FIG. 67 shows a vertical sectional view, with partial omission, illustrating a constant velocity universal joint concerning the conventional technique.

In other words, in the case of the conventional technique, as shown in FIG. 67, the displacement of the tripod journal 4 in the axial direction is effected on the basis of the sliding movement between the inner roller 5 and the tripod journal 4. On the contrary, in the case of the embodiment of the present invention, the displacement is effected on the basis of the sliding movement between the needle bearings 44 and the inner roller 42 to be displaced integrally with the trunnion 28a (28b, 28c). As a result, in the embodiment of the present invention, the friction during the displacement can be decreased, and the slide resistance can be decreased, as compared with the conventional technique.

The "induced thrust force" described above refers to the load resulting from the frictional resistance generated by the displacement of the trunnion 28a (28b, 28c) along the guide groove 18.

Next, a method for assembling the constant velocity universal joint according to the first embodiment of the present invention will be explained below, as exemplified by cases in which the trunnion 28a (28b, 28c) is installed into the hole 50 of the inner roller 42 or the inner roller 42a respectively.

The inner roller 42 (see FIG. 4), which is provided with the pair of mutually opposing cutouts 52, is used as follows. That is, the spherical surface 36 of the trunnion 28a (28b, 28c) is inserted into the recess 40 of the inner roller 42 along the pair of cutouts 52 in a state in which the upper surface 54 of the inner roller 42 is allowed to be substantially perpendicular to the flat upper surface 32 of the trunnion 28a (28b, 28c). The trunnion 28a (28b, 28c) is inclined so that the axis of the trunnion 28a (28b, 28c) is substantially perpendicular to the upper surface 32 of the inner roller 42. Thus, the inner roller 42 is installed to the trunnion 28a (28b, 28c).

Figure 12:
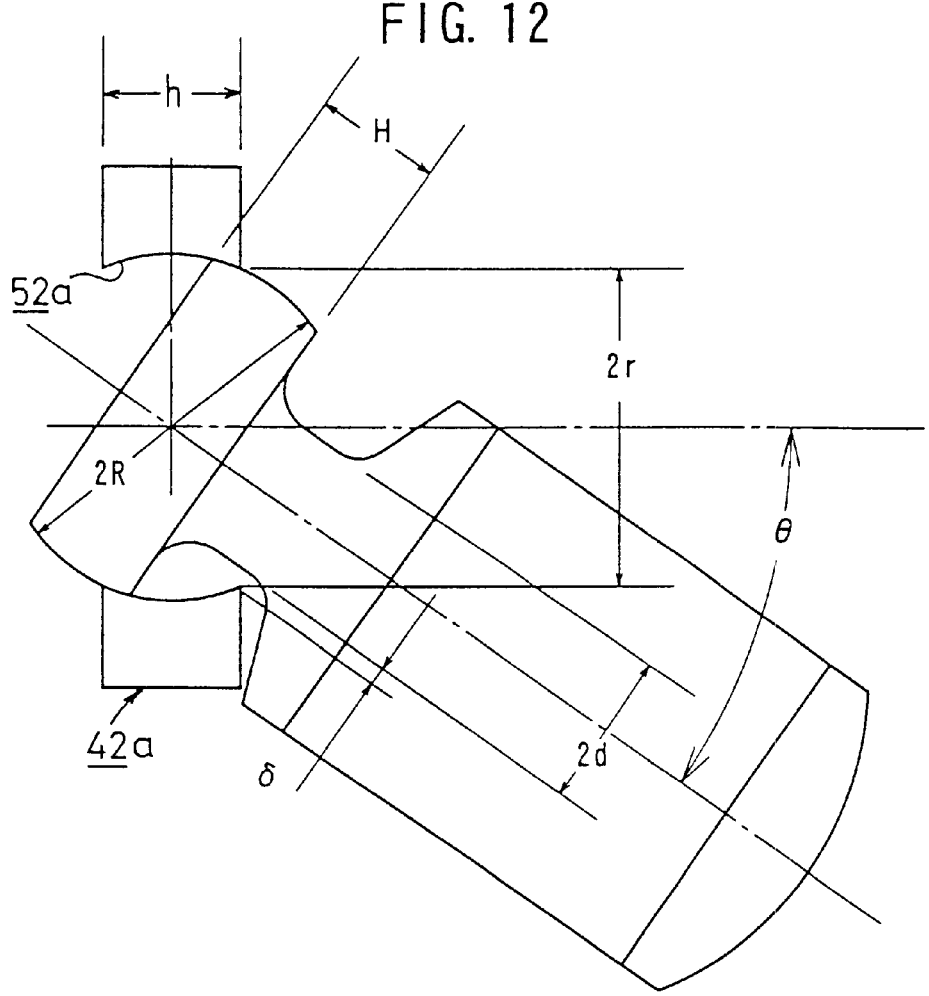
FIG. 12 illustrates a setting condition for installing the inner roller to a trunnion.

The inner roller 42a (see FIG. 8), which is provided with the substantially elliptic cutout 52a, is used as follows. That is, as shown in FIG. 12, the trunnion 28a (28b, 28c) is inserted along the substantially elliptic cutout 52a, while inclining the trunnion 28a (28b, 28c) by an angle θ with respect to the inner roller 42a. Thus, the inner roller 42a is installed to the trunnion 28a (28b, 28c).

Figure 13:
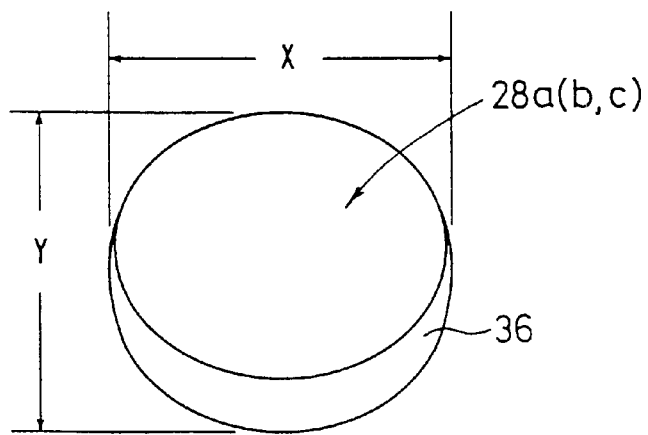
FIG. 13 illustrates the setting condition for installing the inner roller to the trunnion.

Symbols in FIGS. 12 and 13 are as follows. That is, the assembling angle is represented by θ. The radius of the spherical surface 36 of the trunnion 28a (28b, 28c) is represented by R. The spherical surface width of the trunnion 28a (28b, 28c) is represented by H. The short radius of the cutout 52a of the inner roller 42a is represented by r. The width of the inner roller 42a is represented by h. The radius of the trunnion 28a (28b, 28c) is represented by d. The projected long width of the spherical surface 36 of the trunnion 28a (28b, 28c), which is obtained when the assembling angle is inclined by θ, is represented by X. The projected short width of the spherical surface 36 of the trunnion 28a (28b, 28c), which is obtained when the assembling angle is inclined by θ, is represented by Y. The clearance between the cutout 52a of the inner roller 42a and the neck section 30 of the trunnion 28a (28b, 28c) is represented by δ.

In this embodiment, the condition, under which the projected short width Y of the spherical surface 36 of the trunnion 28a (28b, 28c) is smaller than 2R (diameter of the spherical surface) (the spherical surface 36 is ensured within the width h of the inner roller 42a), is represented by the following expression (1).

$$R - H\sin\theta - \sqrt{R^2 - H^2} \cdot \cos\theta > 0 \qquad (1)$$

The condition, under which Y<X is satisfied, is represented by the following expression (2).

$$\theta - \cos^{-1}\frac{\sqrt{R^2 - H^2}}{R} > 0 \qquad (2)$$

The condition, under which the trunnion 28a (28b, 28c) does not interfere with the inner roller 42a, is represented by the following expression (3).

$$\sqrt{r^2 + h^2} \cdot \sin\left(90° - \theta - \cos^{-1}\frac{r}{\sqrt{r^2 + h^2}}\right) - d > 0 \qquad (3)$$

The configurations of the trunnion 28a (28b, 28c) and the cutout 52a of the inner roller 42a are designed so that the foregoing expressions (1) to (3) are satisfied. It is assumed that the assembling angle θ is set to be larger than the operation angle of the constant velocity universal joint 10.

Figure 14:
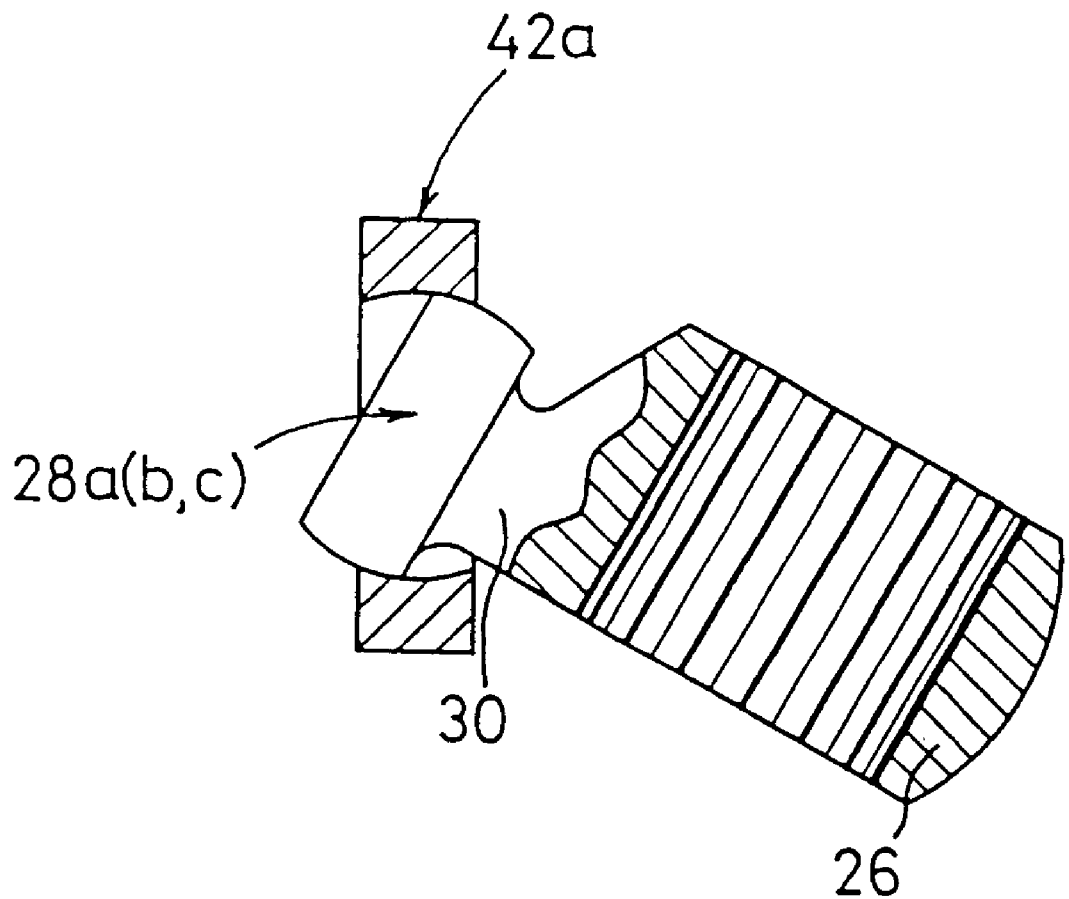
FIG. 14 shows a vertical sectional view, with partial omission, illustrating a modified embodiment of the trunnion.

Alternatively, as shown in FIG. 14, the trunnion 28a (28b, 28c), which is formed to expand from the spider boss 26, may be constructed such that the neck section 30 is provided at a position deflected with respect to the axial direction from the central portion of the ring-shaped spider boss 26.

Figure 15:
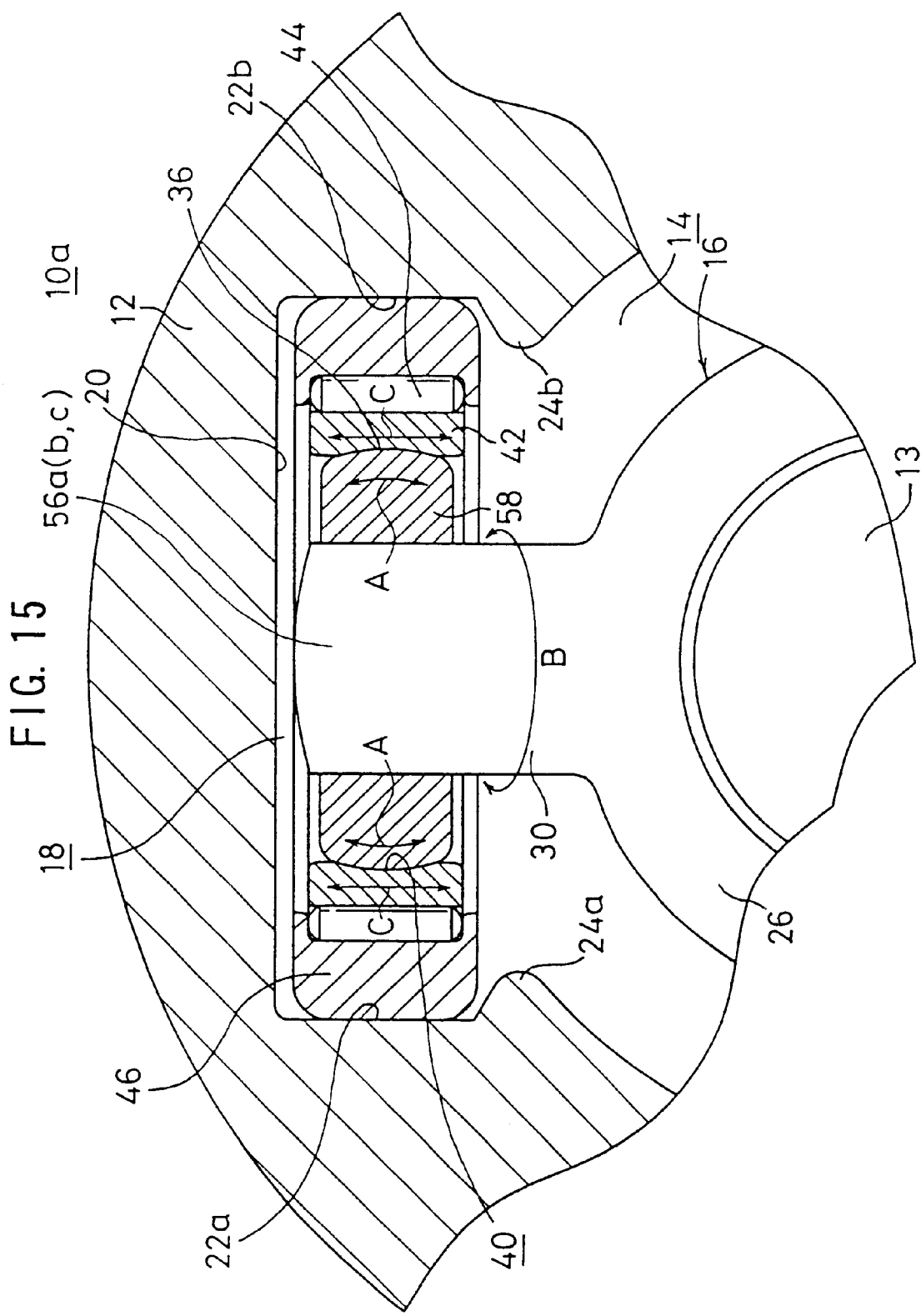
FIG. 15 shows an enlarged vertical sectional view, with partial omission, illustrating a constant velocity universal joint according to a second embodiment of the present invention.
Figure 16:
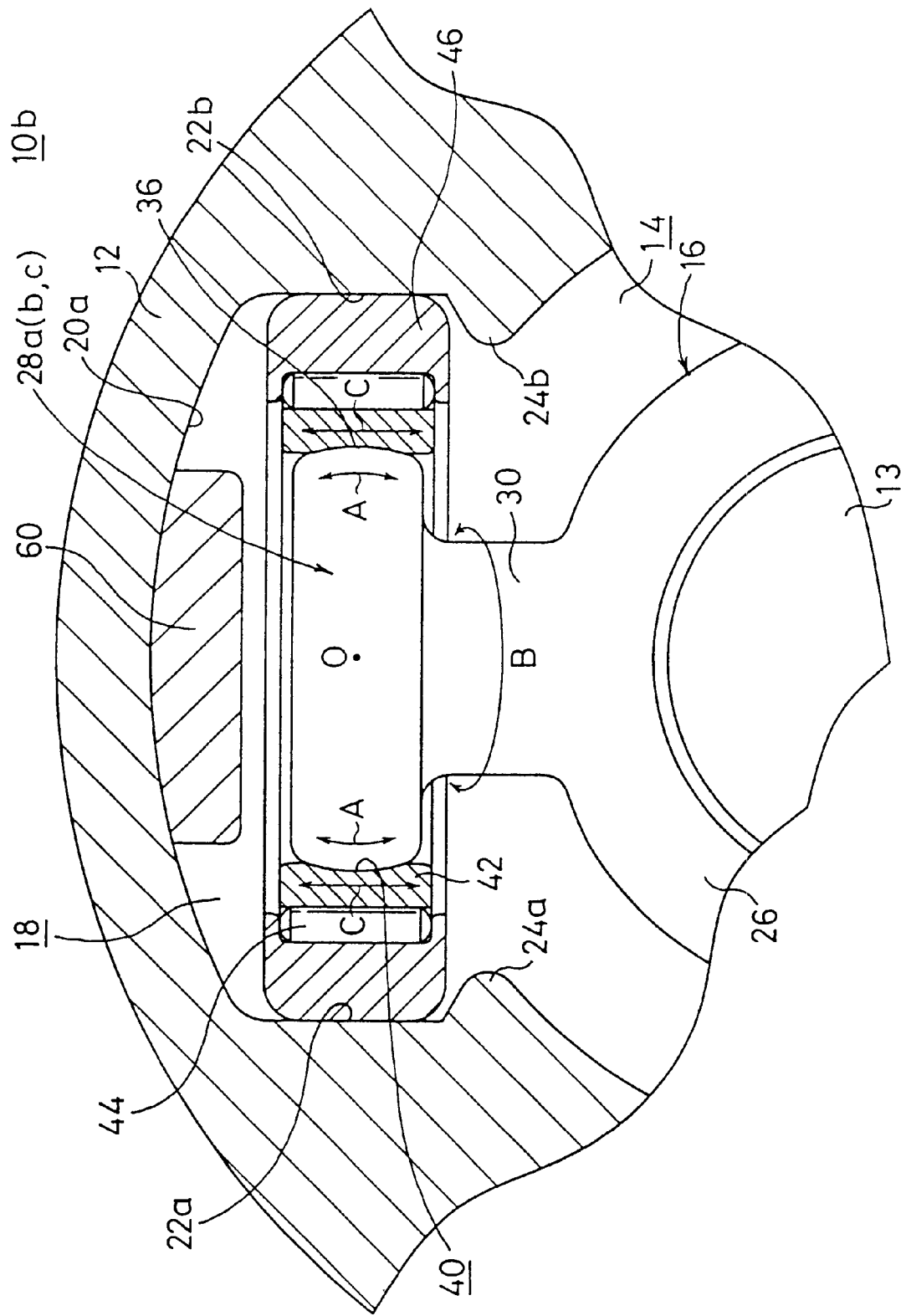
FIG. 16 shows an enlarged vertical sectional view, with partial omission, illustrating a constant velocity universal joint according to a third embodiment of the present invention.
Figure 17:
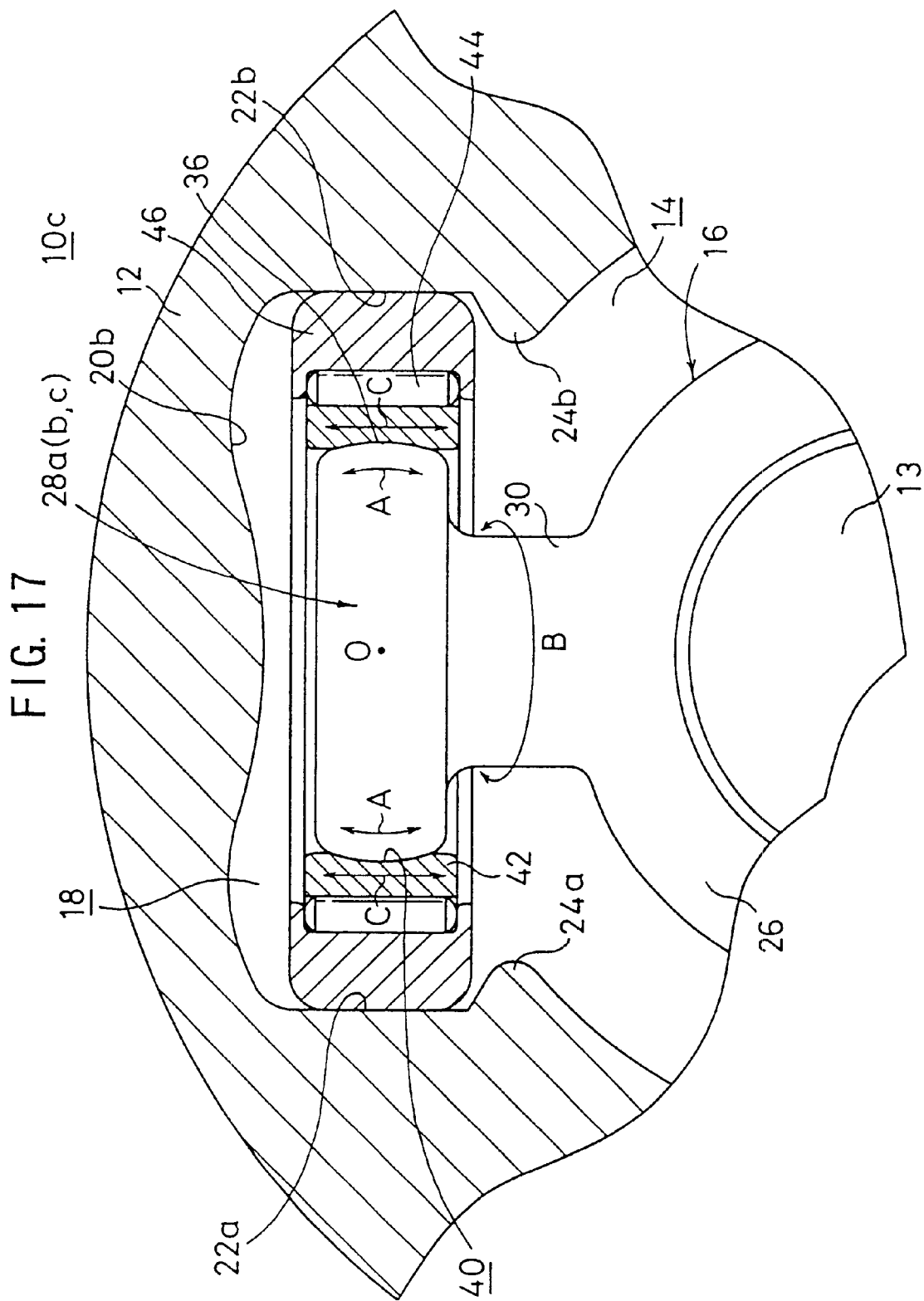
FIG. 17 shows an enlarged vertical sectional view, with partial omission, illustrating a constant velocity universal joint according to a fourth embodiment of the present invention.

Next, constant velocity universal joints according to other embodiments are shown in FIGS. 15 to 17. The same constitutive components as those of the constant velocity universal joint 10 shown in FIG. 1 are designated by the same reference numerals, detailed explanation of which will be omitted.

As shown in FIG. 15, a constant velocity universal joint 10a according to the second embodiment is constructed as follows. That is, a ring member 58, which has a spherical surface 36 formed on its outer circumferential surface, is forcibly inserted into a columnar trunnion 56a (56b, 56c). Such an arrangement is advantageous in that the trunnion 56a (56b, 56c) is easily manufactured.

As shown in FIG. 16, a constant velocity universal joint 10b according to the third embodiment is constructed as follows. That is, a ceiling section 20a of a guide groove 18 of an outer cup 12 is formed to have a curved configuration. A fixed member 60 is provided on the ceiling section 20a. Such an arrangement is advantageous in that the constant velocity universal joint 10b is allowed to have a light weight, and it is possible to avoid the increase in amount of lubricating oil to be charged in the outer cup 12.

As shown in FIG. 17, a constant velocity universal joint 10c according to the fourth embodiment is constructed as follows. That is, a ceiling section 20b of a guide groove 18 of an outer cup 12 is formed to have a wave-shaped curved configuration in order that the constant velocity universal joint 10c has a light weight.

Figure 18:
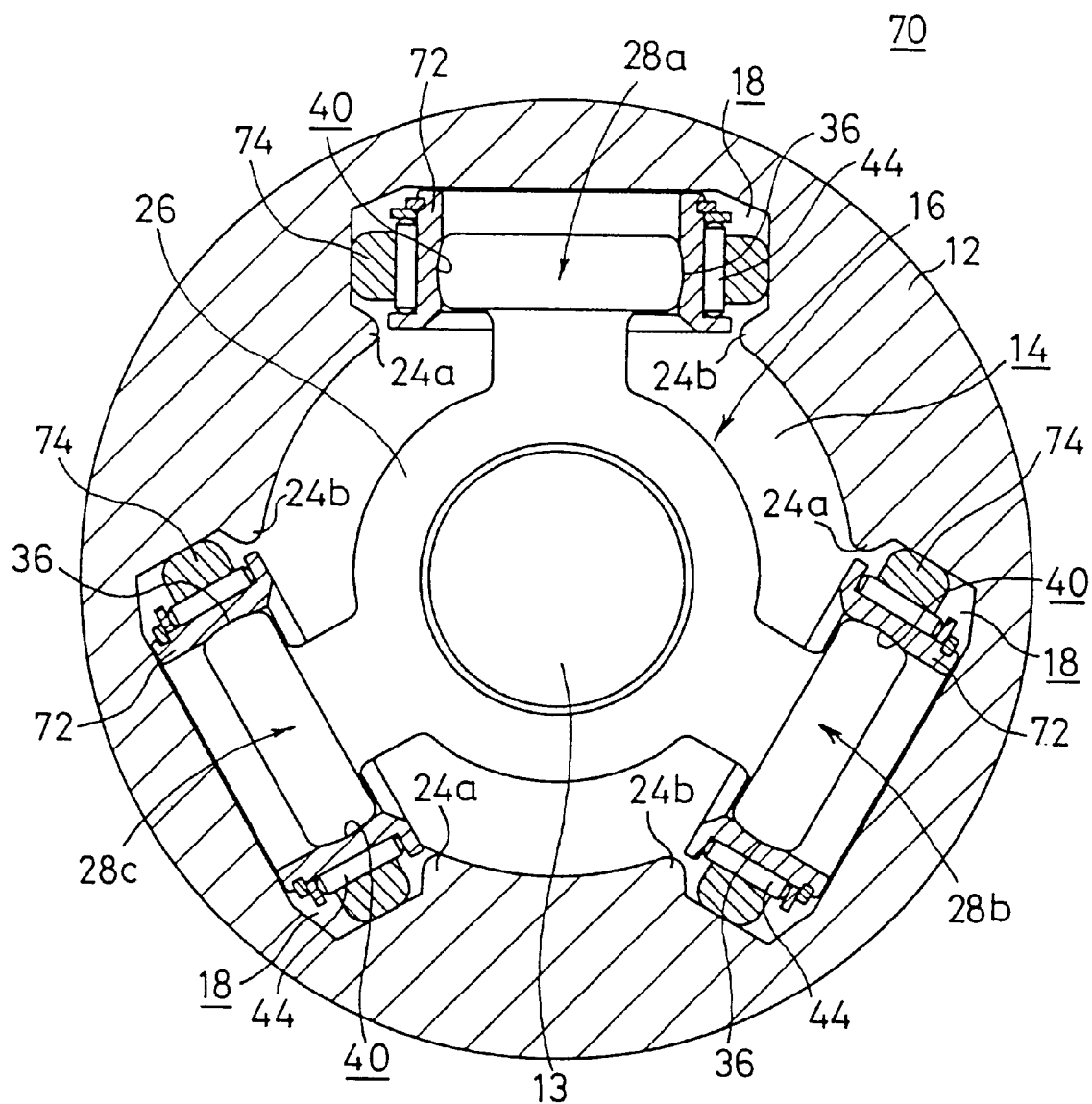
FIG. 18 shows a vertical sectional view taken along a direction substantially perpendicular to a longitudinal direction of a constant velocity universal joint according to a fifth embodiment of the present invention.
Figure 19:
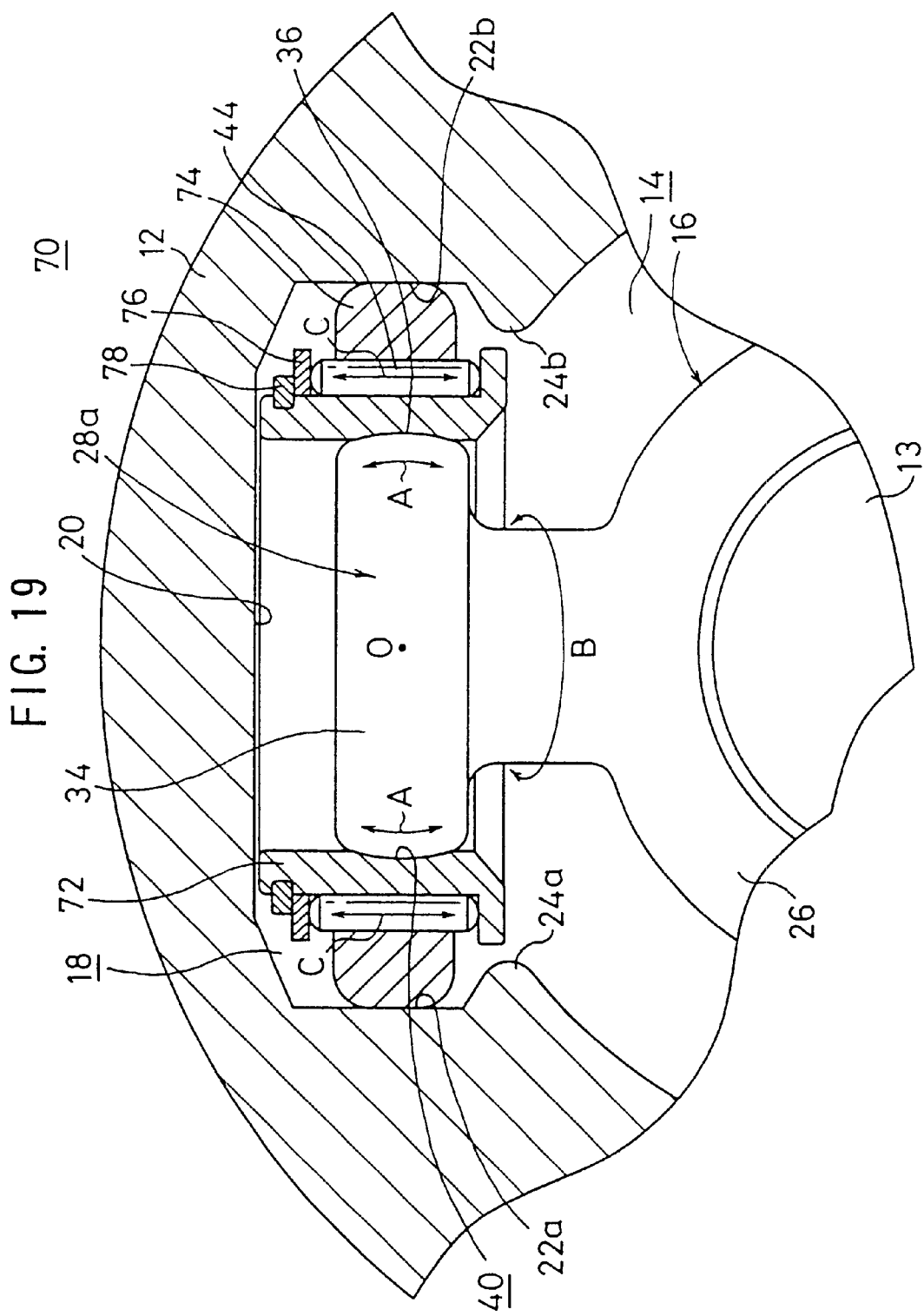
FIG. 19 shows an enlarged vertical sectional view, with partial omission, illustrating the constant velocity universal joint shown in FIG. 18.
Figure 20:
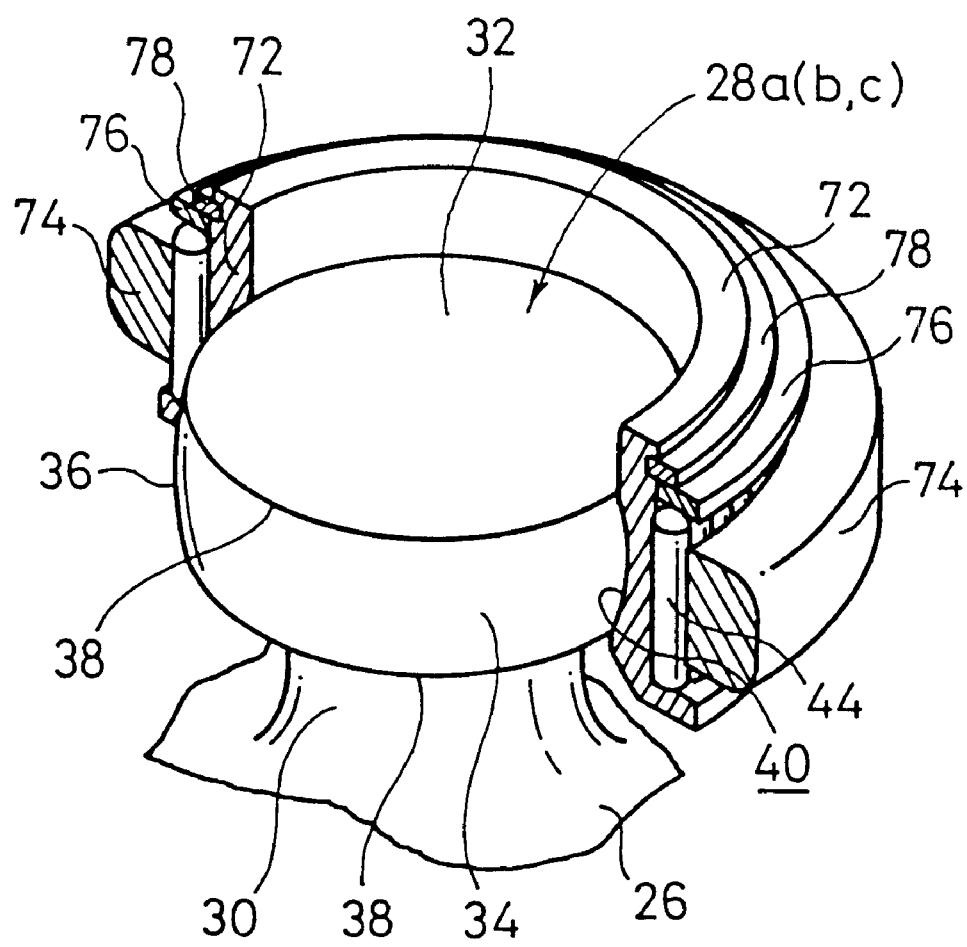
FIG. 20 shows a perspective view, with partial cutout, illustrating an inner member shown in FIG. 18.

Next, a constant velocity universal joint 70 according to the fifth embodiment of the present invention is shown in FIGS. 18 to 20. The same constitutive components as those of the constant velocity universal joint 10 according to the first embodiment are designated by the same reference numerals, detailed explanation of which will be omitted.

The constant velocity universal joint 70 according to the fifth embodiment comprises cylindrical inner rollers (first annular members) 72 each of which has a recess 40 having a spherical surface formed on the inner wall surface to make surface-to-surface contact with a spherical surface 36 of a trunnion 28a (28b, 28c), and outer rollers (second annular members) 74 each of which is arranged on the outer circumferential surface of the inner roller 72 via needle bearings 44. The needle bearing 44 is fastened onto the outer circumferential surface of the inner roller 72 by the aid of a washer 76 and a circlip 78.

In the fifth embodiment, as shown in FIG. 19, the sliding surface is provided between the outer roller 74 and the needle bearings 44. The trunnion 28a (28b, 28c), the inner roller 72, and the needle bearings 44 are provided integrally displaceably along the axial direction (direction of the arrow C) of the trunnion 28a (28b, 28c) with respect to the outer roller 74. Thus, it is possible to decrease the slide resistance and reduce the induced thrust force. Further, the trunnion 28a (28b, 28c) and the recess 40 of the inner roller 72 make surface-to-surface contact with each other so that the contact surface pressure is reduced. Thus, it is possible to improve the durability of the constant velocity universal joint.

Next, constant velocity universal joints according to other embodiments are shown in FIGS. 21 to 24. The same constitutive components as those of the constant velocity universal joint 70 shown in FIG. 19 are designated by the same reference numerals, detailed explanation of which will be omitted.

Figure 21:
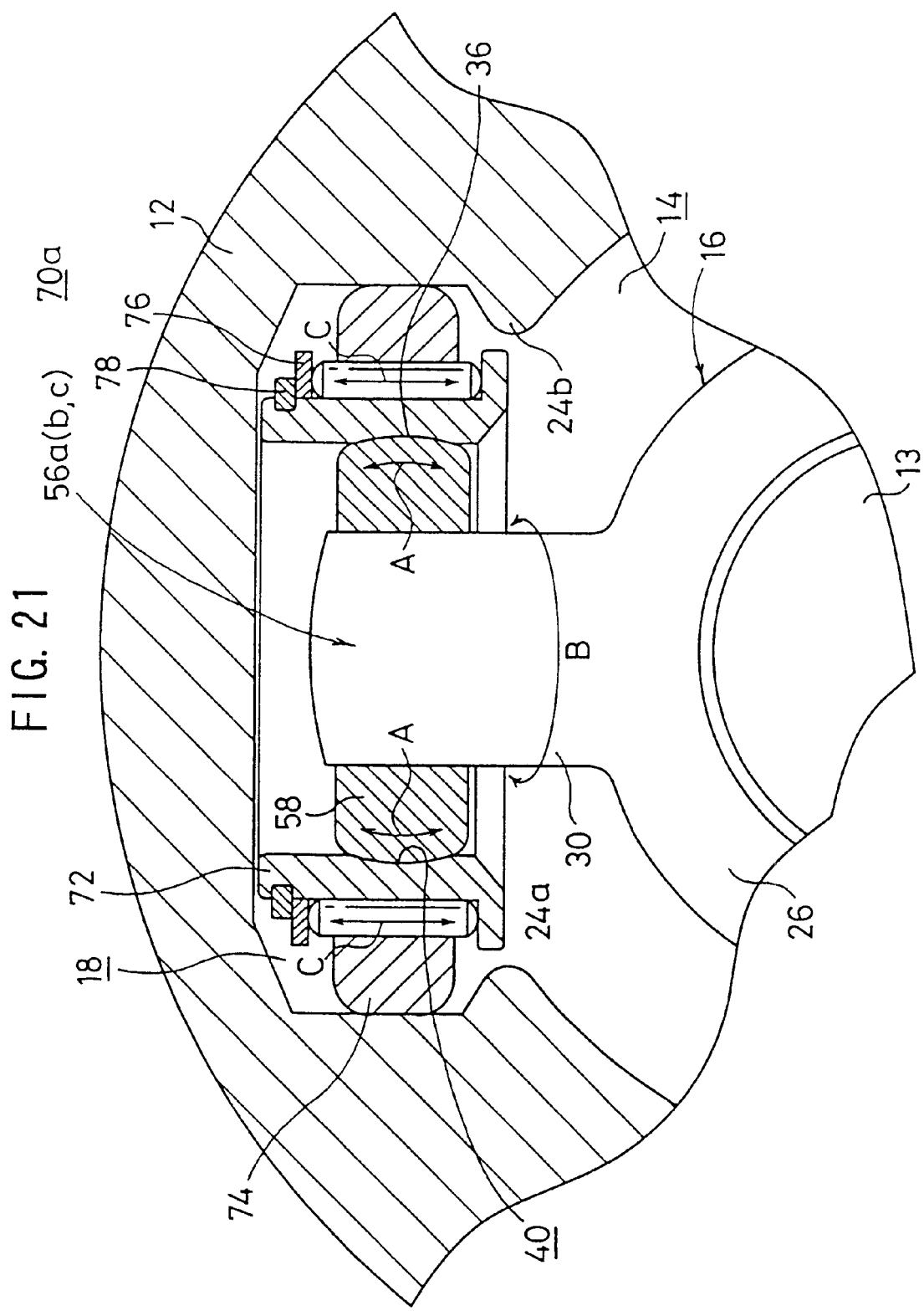
FIG. 21 shows an enlarged vertical sectional view, with partial omission, illustrating a constant velocity universal joint according to a sixth embodiment of the present invention.

As shown in FIG. 21, a constant velocity universal joint 70a according to the sixth embodiment is constructed as follows. That is, a ring member 58, which has a spherical surface 36 formed on its outer circumferential surface, is forcibly inserted into a columnar trunnion 56a (56b, 56c). Such an arrangement is advantageous in that the trunnion 56a (56b, 56c) is easily manufactured.

Figure 22:
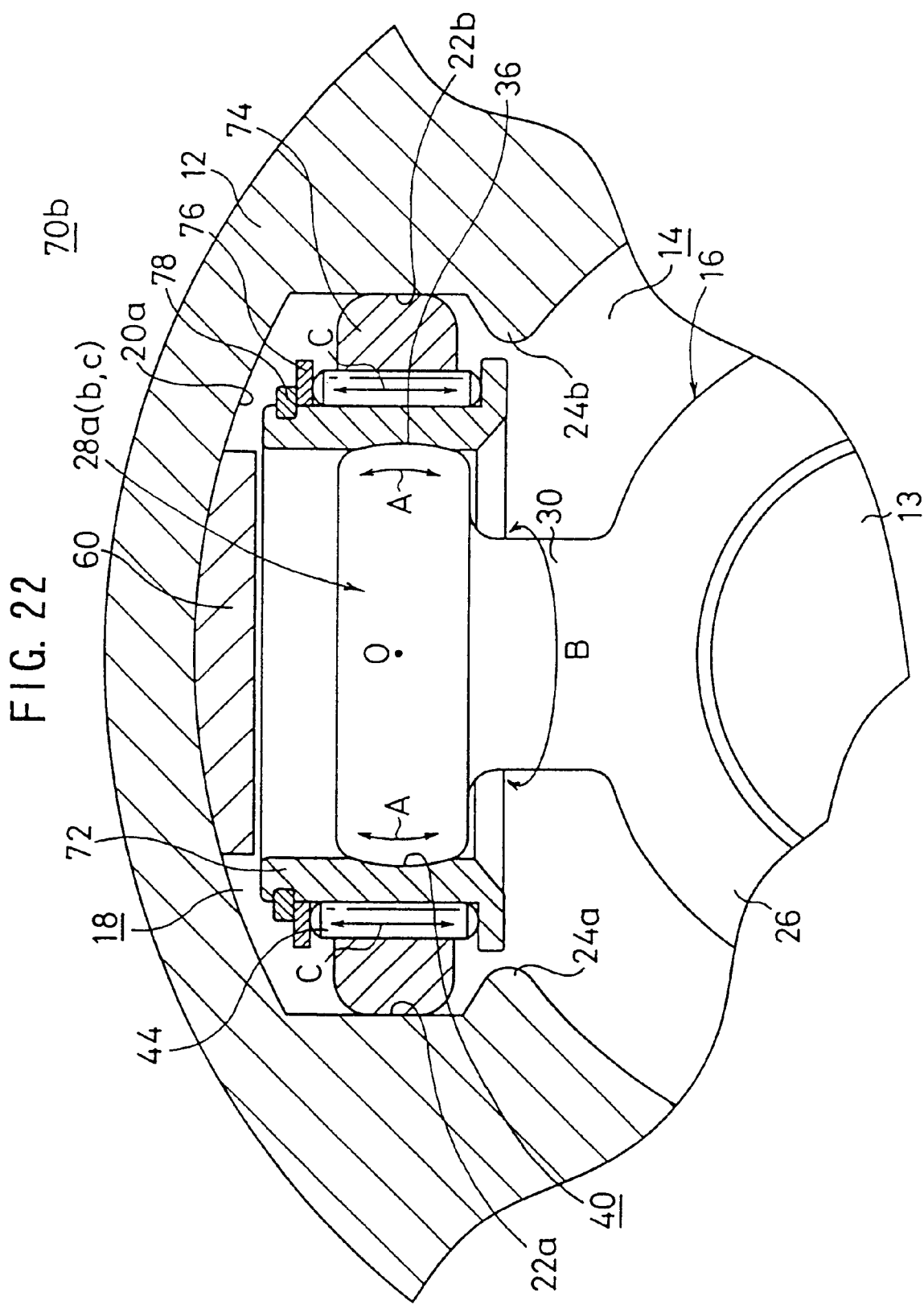
FIG. 22 shows an enlarged vertical sectional view, with partial omission, illustrating a constant velocity universal joint according to a seventh embodiment of the present invention.

As shown in FIG. 22, a constant velocity universal joint 70b according to the seventh embodiment is constructed as follows. That is, a ceiling section 20a of a guide groove 18 of an outer cup 12 is formed to have a curved configuration. A fixed member 60 is provided on the ceiling section 20a. Such an arrangement is advantageous in that the constant velocity universal joint is allowed to have a light weight, and it is possible to avoid the increase in amount of lubricating oil to be charged in the outer cup 12.

Figure 23:
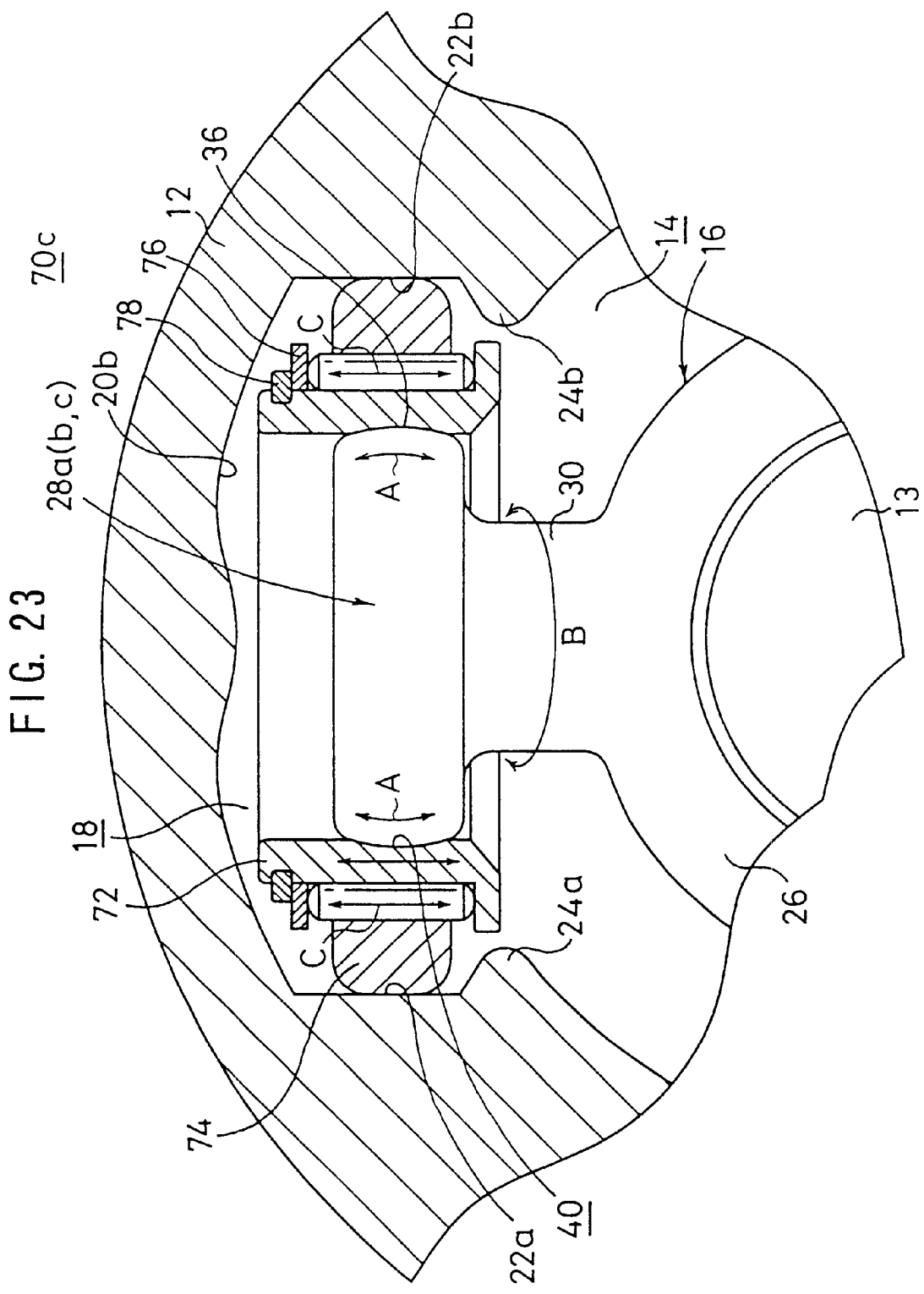
FIG. 23 shows an enlarged vertical sectional view, with partial omission, illustrating a constant velocity universal joint according to an eighth embodiment of the present invention.

As shown in FIG. 23, a constant velocity universal joint 70c according to the eight embodiment is constructed as follows. That is, a ceiling section 20b of a guide groove 18 of an outer cup 12 is formed to have a wave-shaped curved configuration in order that the constant velocity universal joint 70c has a light weight.

Figure 24:
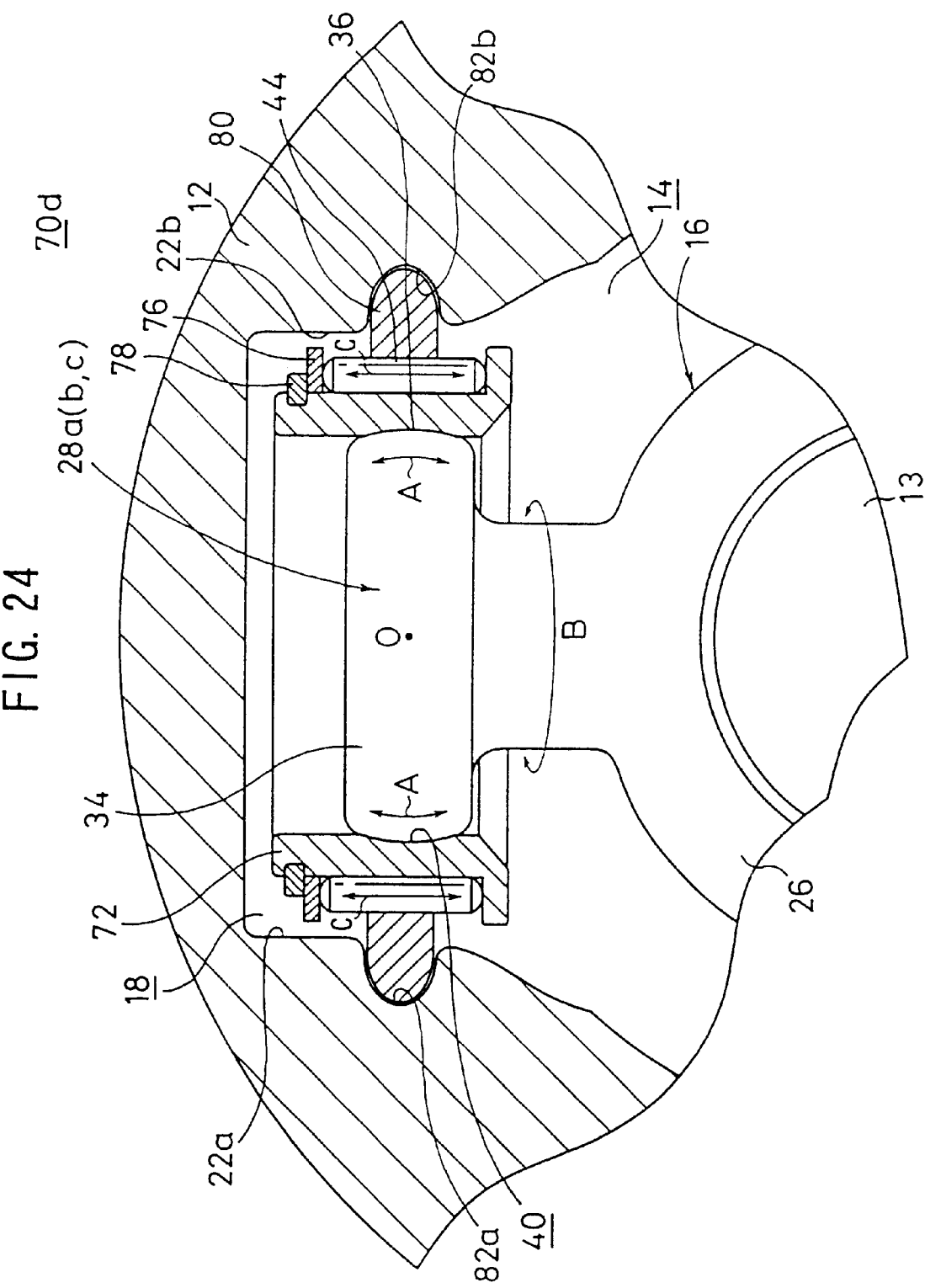
FIG. 24 shows an enlarged vertical sectional view, with partial omission, illustrating a constant velocity universal joint according to a ninth embodiment of the present invention.

As shown in FIG. 24, a constant velocity universal joint 70d according to the ninth embodiment is constructed as follows. That is, a flat outer roller 80 having a semi-elliptical cross-sectional configuration is provided. Guide tracks 82a, 82b, each of which has a semi-elliptical configuration corresponding to the corss-sectional configuration of the outer roller 80, are formed on side surface sections 22a, 22b of the guide groove 18. In this arrangement, the outer roller 80 is restricted by the guide tracks 82a, 82b for the displacement in the axial direction (direction of the arrow C) of the trunnion 28a (28b, 28c). Thus, the displacement can be easily effected in the axial direction of the trunnion 28a (28b, 28c) by using the sliding surface of the inner circumferential surface of the outer roller 80 and the needle bearings 44.

The first to ninth embodiments of the present invention have been explained by using the tripod type constant velocity universal joints 10, 10a to 10c, 70, 70a to 70d each of which is provided with the three trunnions 28a to 28c, 56a to 56c. However, there is no limitation thereto. It is a matter of course that the present invention is also applicable to unillustrated bipod type constant velocity universal joints.

Figure 25:
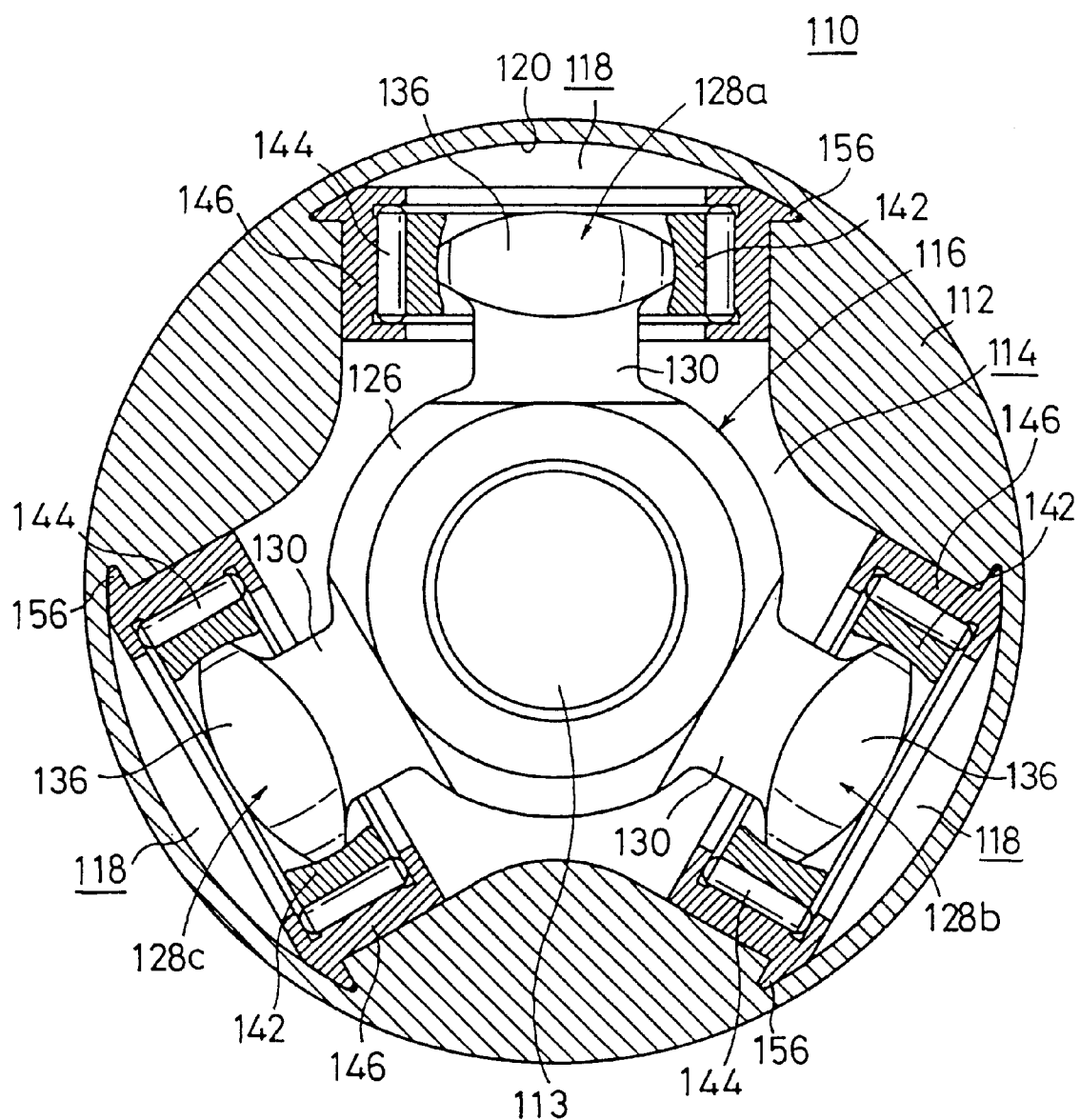
FIG. 25 shows a vertical sectional view taken along a direction substantially perpendicular to a longitudinal direction of a constant velocity universal joint according to a tenth embodiment of the present invention.
Figure 26:
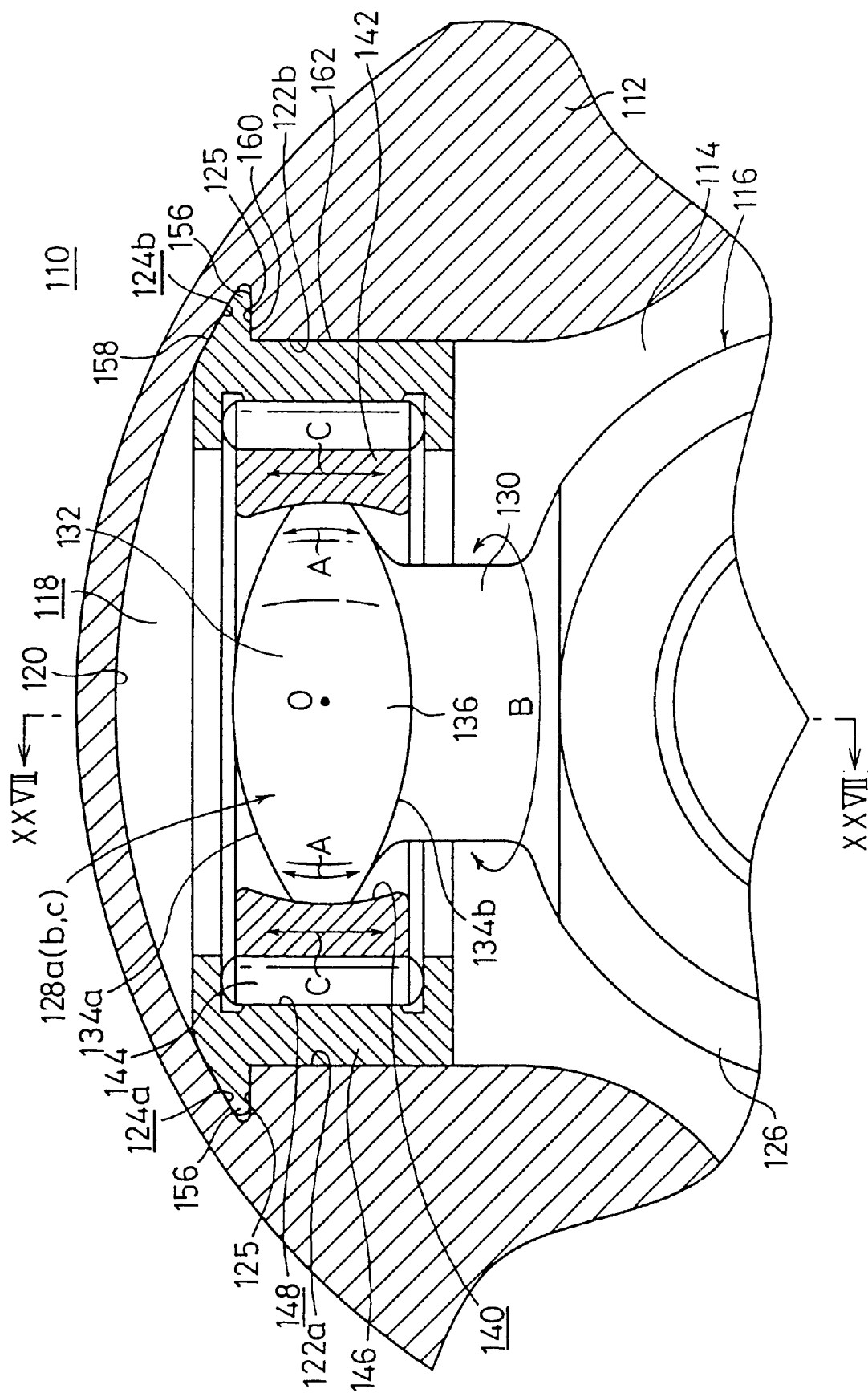
FIG. 26 shows an enlarged vertical sectional view, with partial omission, illustrating the constant velocity universal joint shown in FIG. 25.

Next, a constant velocity universal joint according to the tenth embodiment of the present invention is shown in FIGS. 25 and 26.

The constant velocity universal joint 110 basically comprises a cylindrical outer cup (outer member) 112 which has an opening and which is integrally connected to one end of an unillustrated first shaft, and an inner member 116 which is secured to one end of a second shaft 113 and which is accommodated in a hole 114 of the outer cup 112. The outer cup 112 is formed in an integrated manner.

As shown in FIG. 25, three guide tracks 118, which extend in the axial direction and which are spaced apart from each other by about 120 degrees about the central axis, are formed on the inner wall surface of the outer cup 112.

As shown in FIG. 26, the guide track 118 includes a ceiling section 120 which is formed to have a circular arc-shaped cross section about the center of the axis of the outer cup 112, side surface sections 122a, 122b each of which is formed to have a planar configuration extending along the axial direction of the outer cup 112 and which are opposed to one another on both sides of the ceiling section 120, and grooves 124a, 124b which are formed mutually opposingly at both ends of the ceiling section 120 and which extend along the axial direction. Each of the grooves 124a, 124b is formed with a planar shoulder 125 which is substantially perpendicular to the side surface section 122a, 122b.

Figure 28:
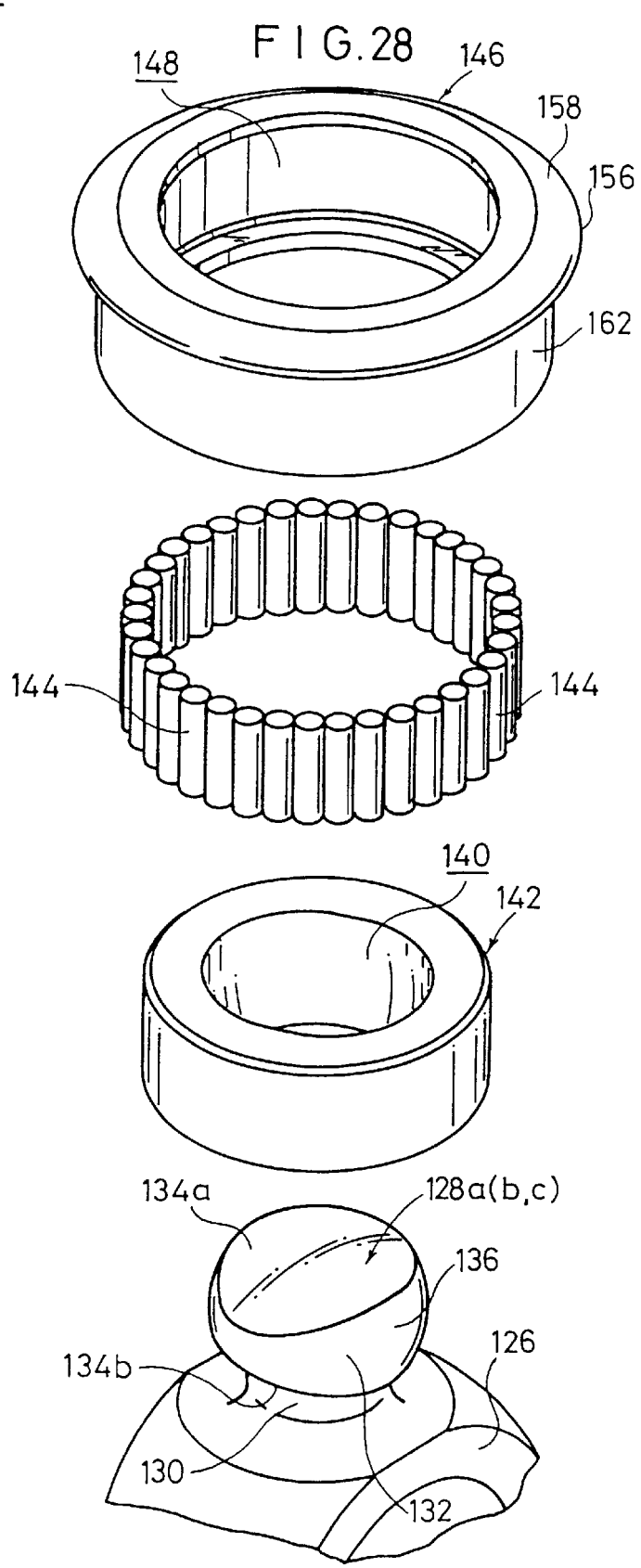
FIG. 28 shows an exploded perspective view illustrating an inner member shown in FIG. 25.
Figure 29:
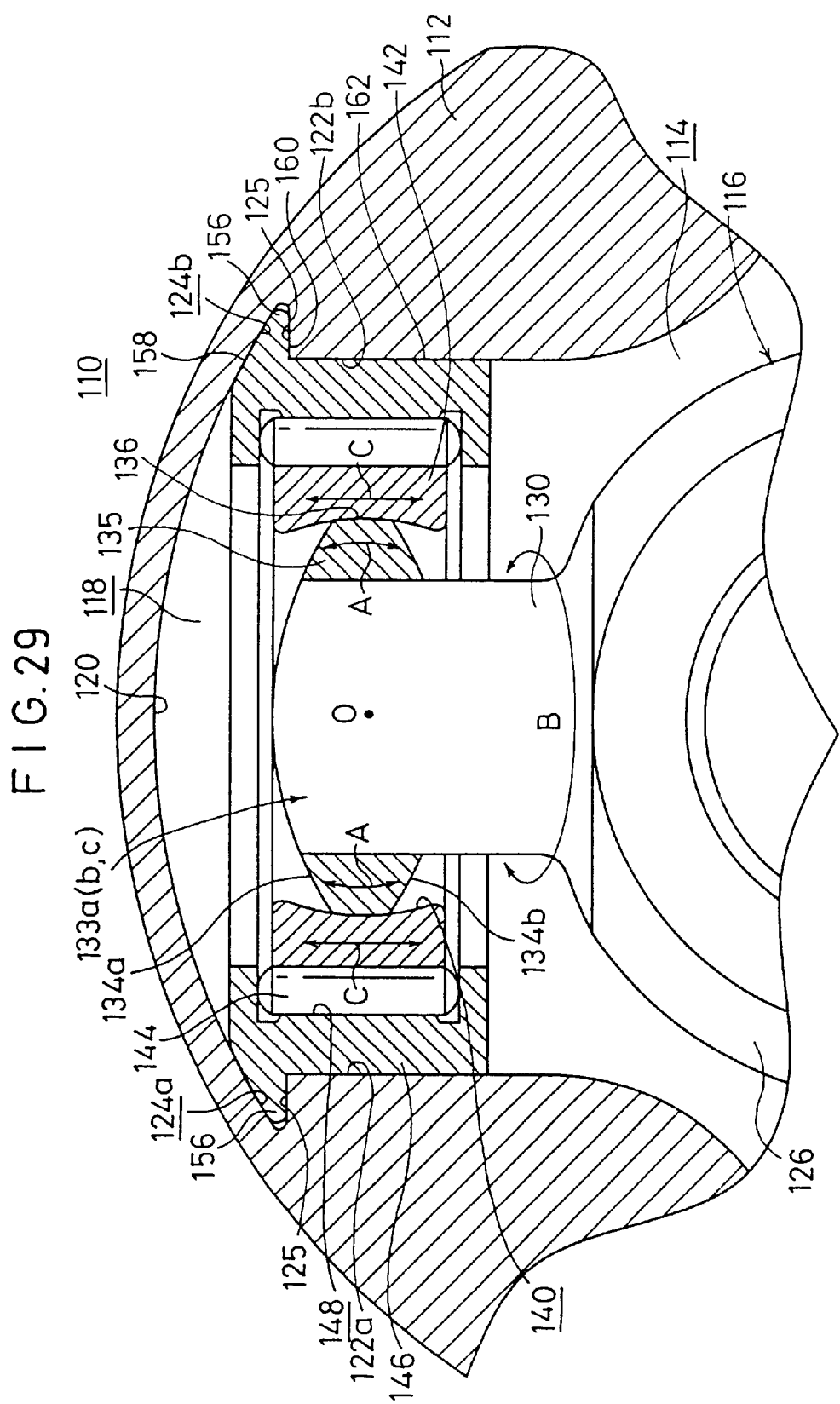
FIG. 29 shows an enlarged vertical sectional view, with partial omission, illustrating a modified embodiment of a trunnion for constructing the constant velocity universal joint shown in FIG. 25.

A ring-shaped spider boss 126 is externally fitted to the second shaft 113. Three trunnions 128a to 128c, which expand toward the guide tracks 118 respectively and which are spaced apart from each other by about 120 degrees about the central axis, are integrally formed on the outer circumferential surface of the spider boss 126. As shown in FIG. 28, each of the trunnions 128a (128b, 128c) has a neck section 130 which expands radially outwardly from the ring-shaped spider boss 126, and a head section 132 which is constructed integrally with the neck section 130 and which is formed to have a thin-walled flat configuration. Alternatively, as shown in FIG. 29, each of the sections may be formed by forcibly inserting a ring member 135 onto the outer circumferential surface of a columnar trunnion 133*a* (133*b*, 133*c*).

Figure 27:
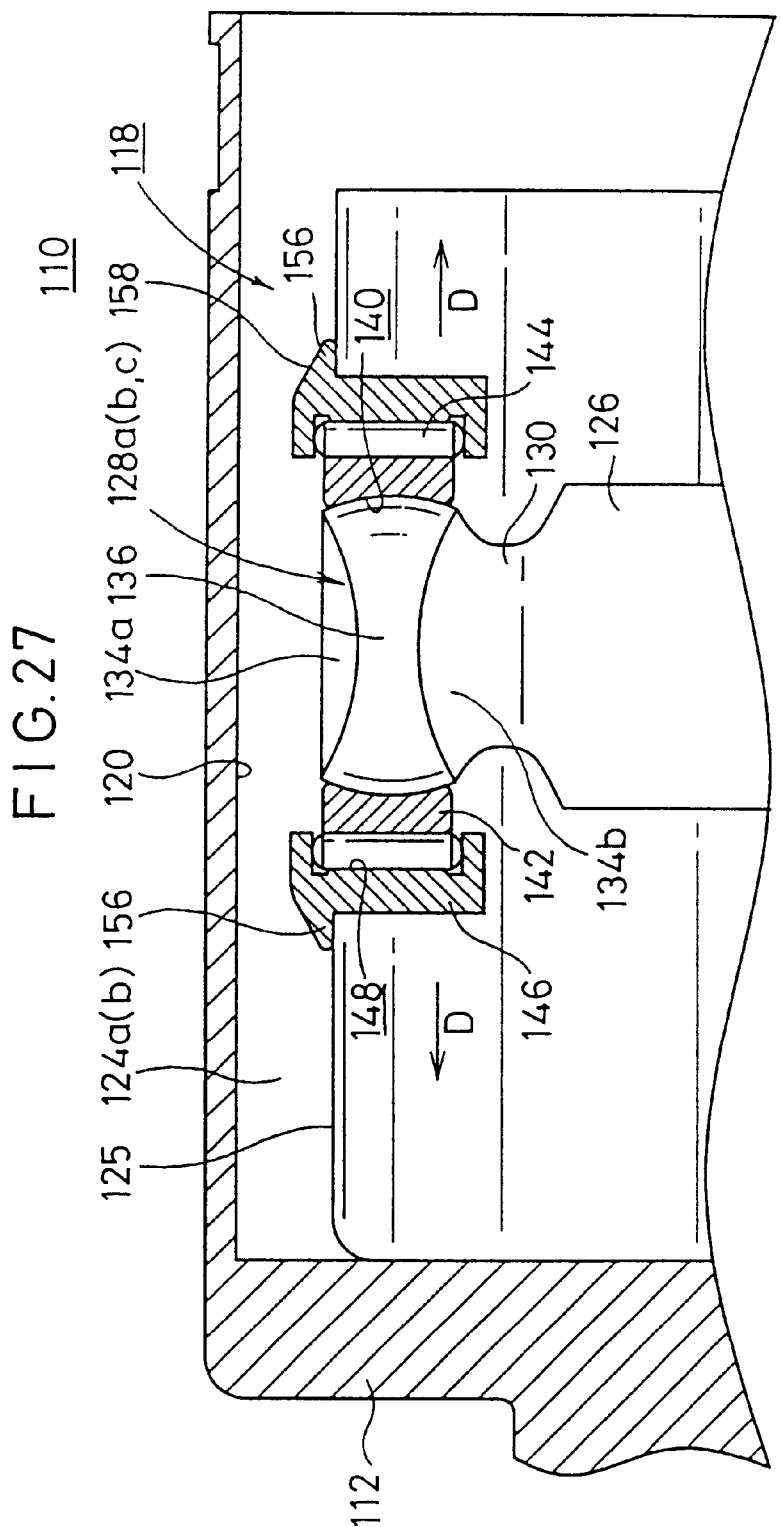
FIG. 27 shows a vertical sectional view taken along a line XXVII—XXVII shown in FIG. 26.
Figure 30:
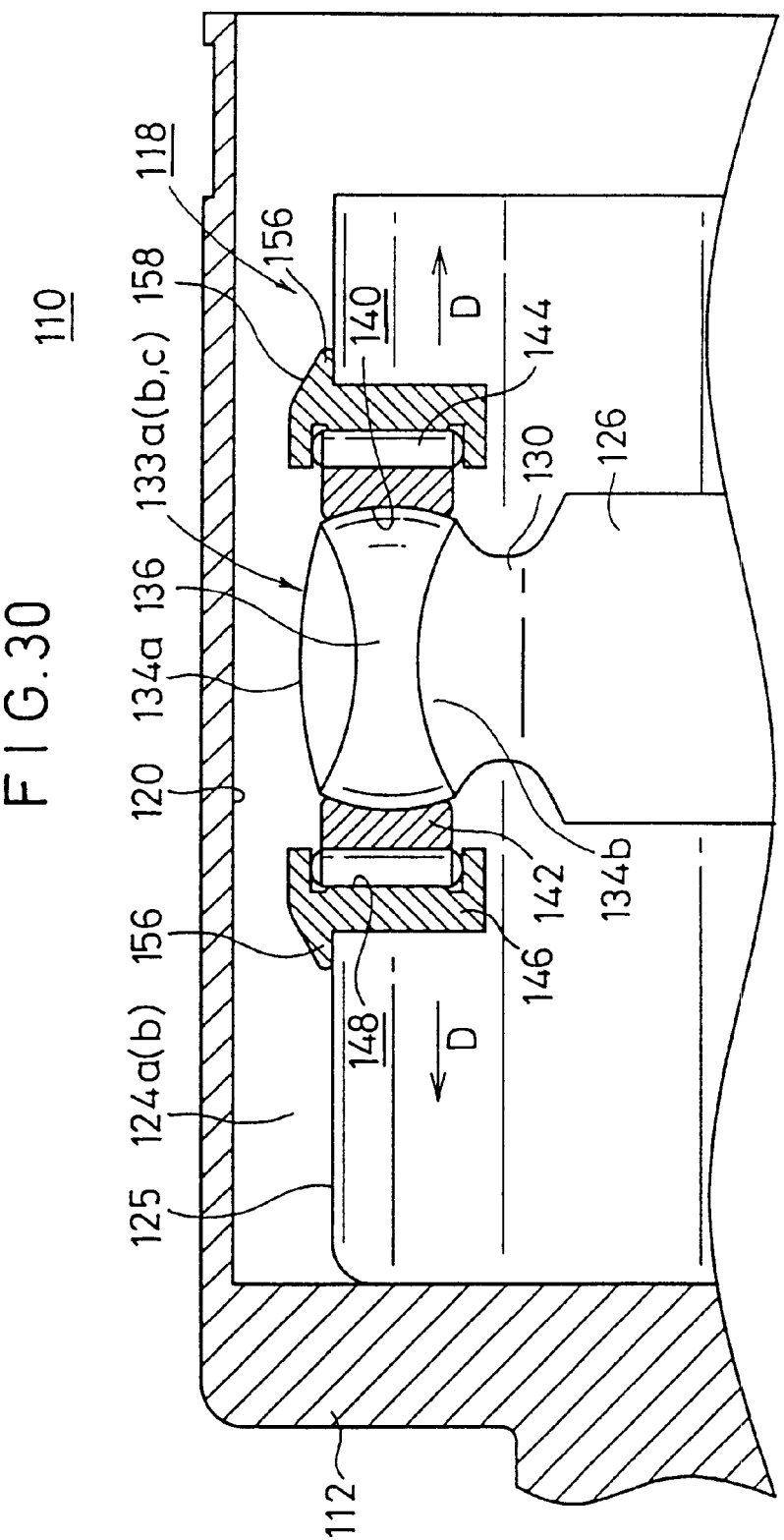
FIG. 30 shows a vertical sectional view, with partial omission, illustrating a modified embodiment of a first curved surface formed on a head section of the trunnion shown in FIG. 27.

A first curved surface 134*a*, which is formed to have a circular arc-shaped configuration having a predetermined curvature as viewed in the axial direction of the outer cup 112 (see FIG. 26) and which is formed to have a linear configuration as viewed in a direction perpendicular to the axis of the outer cup 112, is provided on the upper surface of the head section 132 (see FIG. 27). In this embodiment, as shown in FIG. 27, the shape of the first curved surface 134*a* is not limited to the linear configuration as viewed in the direction perpendicular to the axis of the outer cup 112. Alternatively, as shown in FIG. 30, the shape of the first curved surface 134*a* may be formed to have a circular arc-shaped configuration having a predetermined curvature.

A second curved surface 134*b*, which is similar to the first curved surface 134*a*, is formed to continue to the neck section 130 on the lower surface of the head section 132. The head section 132 further comprises a spherical surface 136 which is formed on the outer circumferential surface between the first curved surface 134*a* and the second curved surface 134*b*. An unillustrated filleting section having a curved cross section may be provided at a boundary between the first curved surface 134*a* and the spherical surface 136 and at a boundary between the second curved surface 134*b* and the spherical surface 136 of each of the trunnions 128*a*, (128*b*, 128*c*).

As shown in FIG. 28, those disposed between the trunnion 128*a* (128*b*, 128*c*) and the side surface sections 122*a*, 122*b* are an inner roller (first annular member) 142 which is composed of a ring member and which is formed with a recess 140 having a spherical surface corresponding to the spherical surface 136 of the trunnion 128*a* (128*b*, 128*c*), and an outer roller (second annular member) 146 which is composed of a ring member having a diameter larger than that of the inner roller 142 and which is externally fitted to the inner roller 142 via a plurality of needle bearings (bearing members) 144.

The plurality of needle bearings 144 are rollably installed in annular recesses 148 which are formed on the inner circumferential surface of the outer roller 146, and they are incorporated so that they are not disengaged from the recesses 148 owing to the keystone effect. For example, an unillustrated holding fixture may be provided and used so that the plurality of needle bearings 144 are installed along the outer circumferential surface of the inner roller 142.

Figure 31:
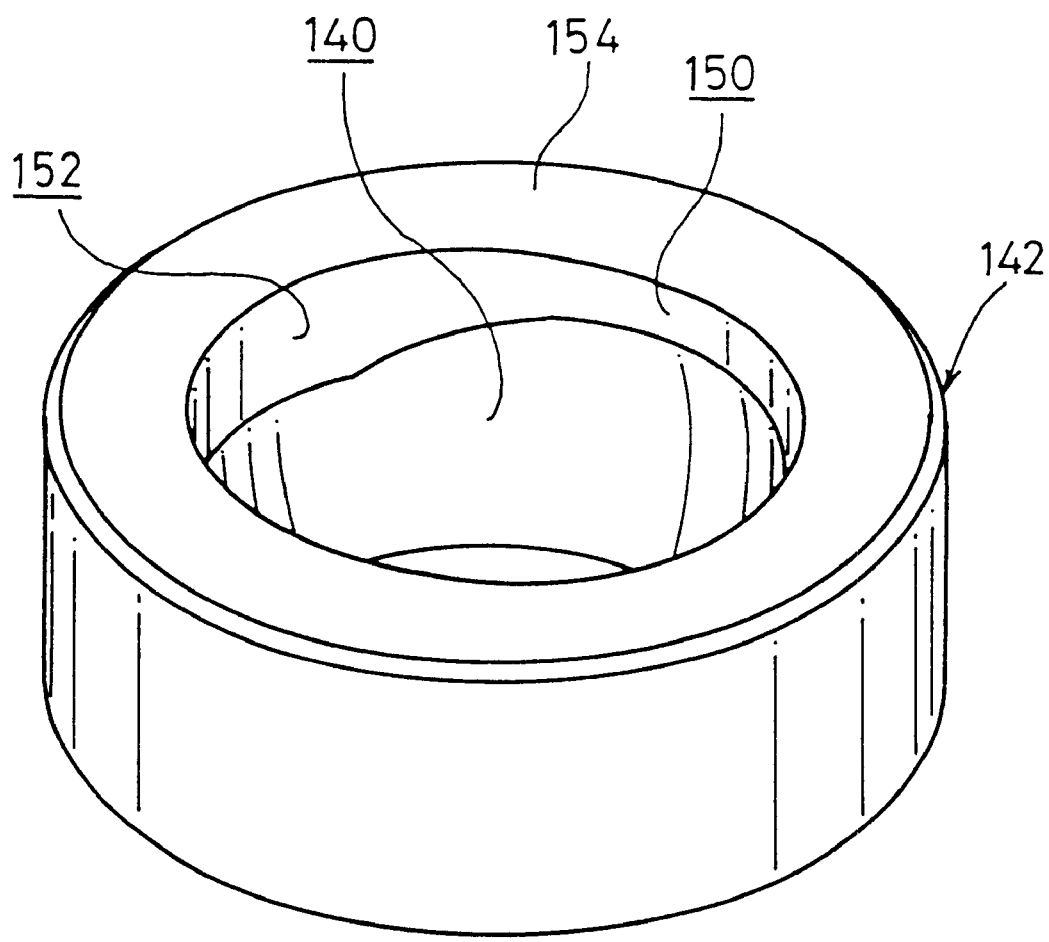
FIG. 31 shows a magnified perspective view illustrating an inner roller for constructing an inner member shown in FIG. 28.
Figure 32:
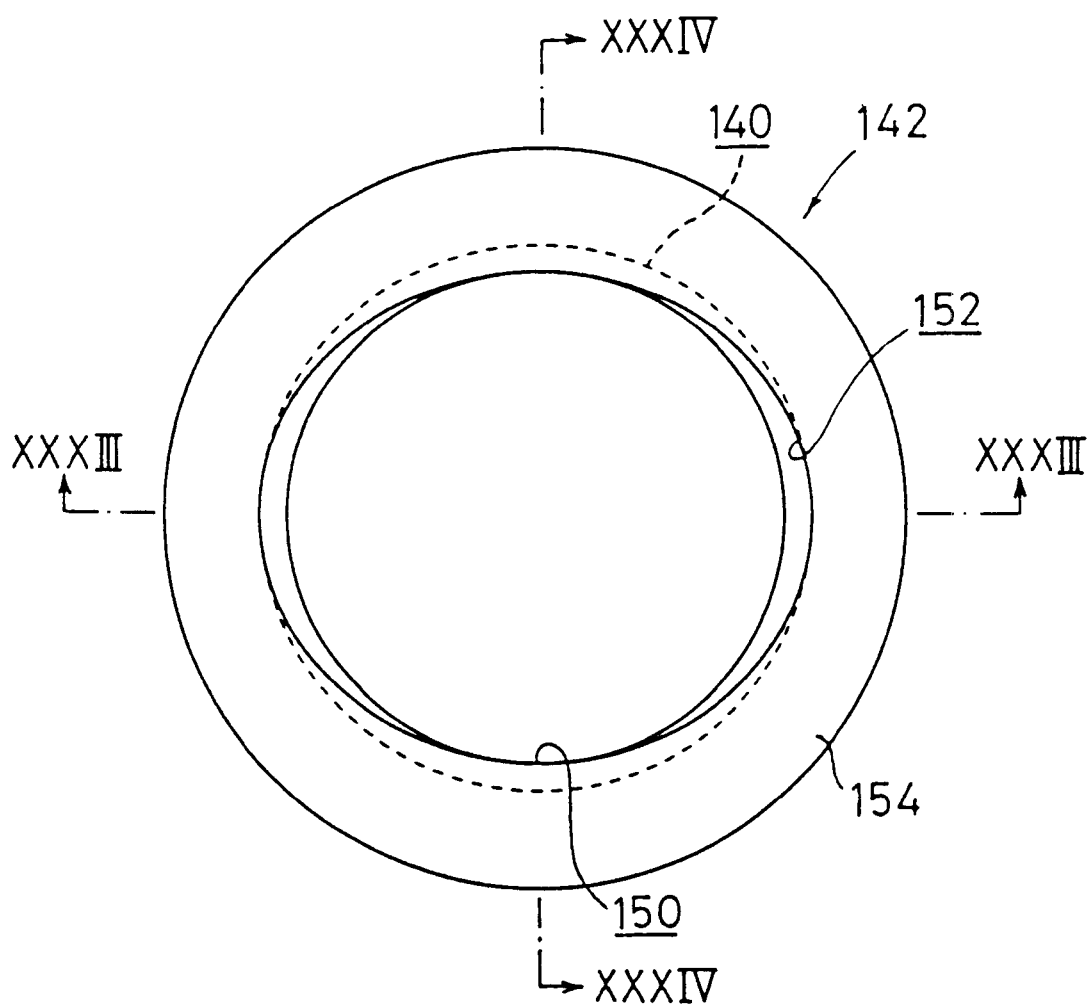
FIG. 32 shows a plan view illustrating the inner roller shown in FIG. 31.
Figure 33:
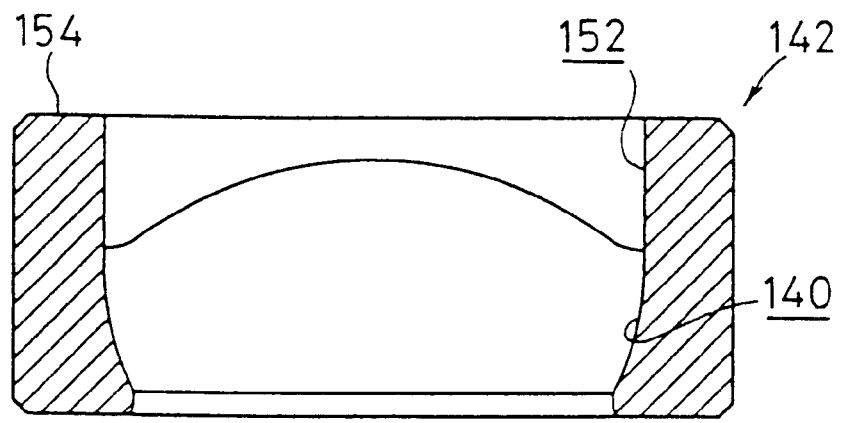
FIG. 33 shows a vertical sectional view taken along a line XXXIII—XXXIII shown in FIG. 32.
Figure 34:
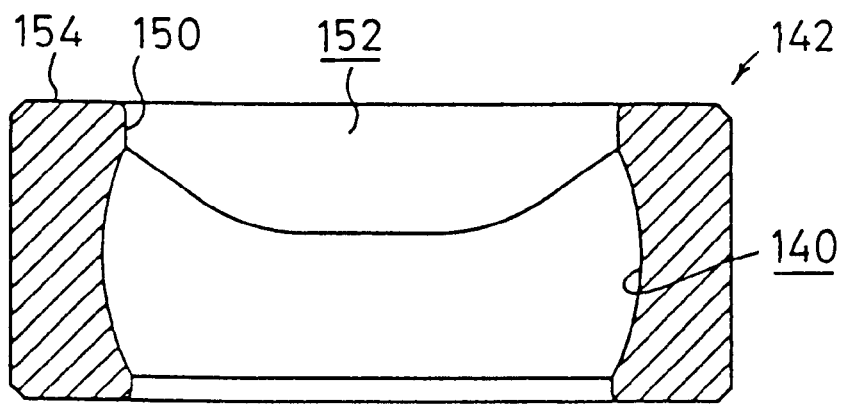
FIG. 34 shows a vertical sectional view taken along a line XXXIV—XXXIV shown in FIG. 32.

As shown in FIG. 31, a substantially elliptical cutout 152 is formed at a boundary between the upper surface 154 and the inner wall surface of the inner roller 142 in order to easily assemble the trunnion 128*a* (128*b*, 128*c*) into a hole 150 of the inner roller 142.

Figure 37:
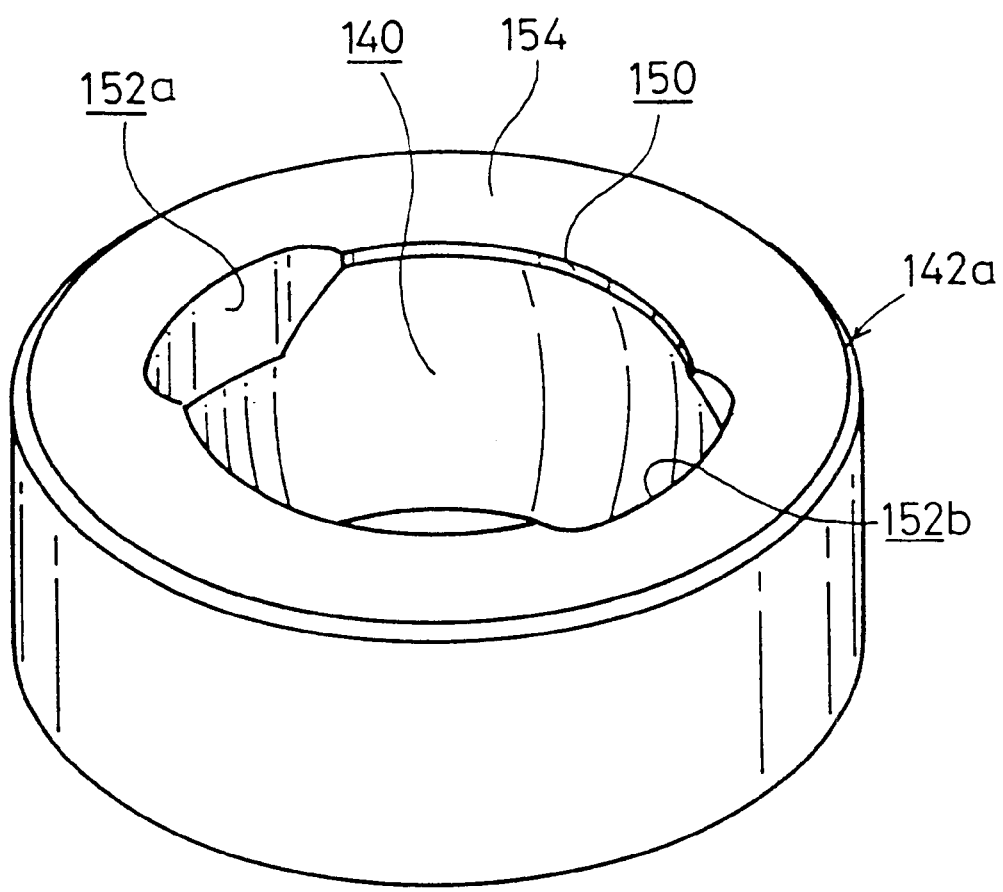
FIG. 37 shows a perspective view illustrating a modified embodiment of the inner roller shown in FIG. 31.
Figure 38:
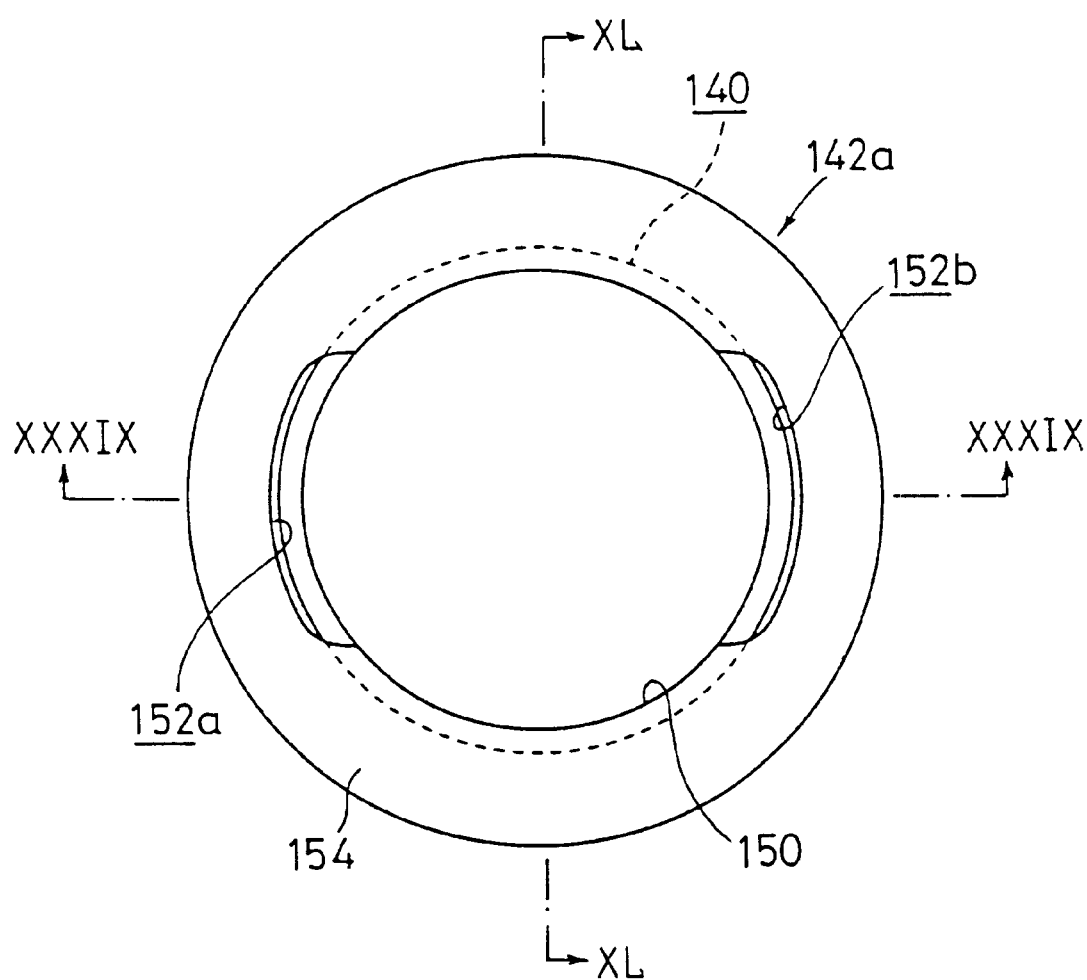
FIG. 38 shows a plan view illustrating the inner roller shown in FIG. 37.
Figure 39:
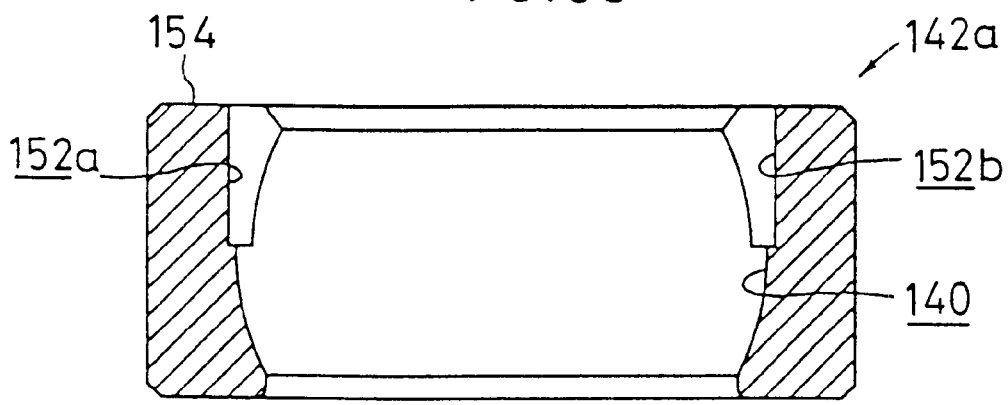
FIG. 39 shows a vertical sectional view taken along a line XXXIX—XXXIX shown in FIG. 38.
Figure 40:
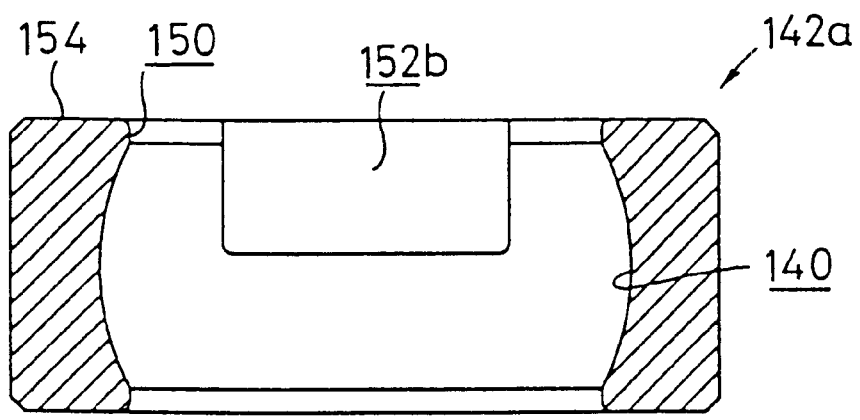
FIG. 40 shows a vertical sectional view taken along a line XL—XL shown in FIG. 38.

When the ring member 135 is forcibly inserted onto the outer circumferential surface of the columnar trunnion 133*a* (133*b*, 133*c*), as shown in FIG. 37, in place of the inner roller 142, it is preferable to use an inner roller 142*a* which includes a pair of mutually opposing circular arc-shaped cutouts 152*a*, 152*b* formed at boundary portions between the upper surface 154 and the inner wall surface of the circular hole 150.

An annular projection 156, which has a cross-sectional configuration corresponding to the groove 124*a*, 124*b* and which protrudes radially outwardly, is formed at an upper portion of the outer circumferential surface of the outer roller 146. The annular projection 156 has a first engaging surface 158 having a circular arc-shaped cross section to make contact with the ceiling section 120, and a second engaging section 160 formed to have a planar configuration to make contact with the shoulder 125. An outer circumferential surface 162 for making surface-to-surface contact with the side surface section 122*a*, 122*b* is formed at a lower portion of the annular projection 156.

In this arrangement, the annular projection 156 functions as follows. That is, when the outer roller 146 rolls along the axial direction of the outer cup 112, then the first engaging surface 158 is engaged with the ceiling section 120, and the second engaging surface 160 is engaged with the shoulder 125. Accordingly, an attitude-holding mechanism is provided, whereby the attitude of the outer roller 146 is maintained so that the outer roller 146 is substantially parallel to the axial direction.

The spherical surface 136 of the trunnion 128*a* (128*b*, 128*c*) and the recess 140 of the inner roller 142 are provided to make surface-to-surface contact with each other. Therefore, the trunnion 128*a* (128*b*, 128*c*) is provided rotatably in the direction of the arrow A about a center of a point O (see FIG. 26) with respect to the inner roller 142, and it is provided rotatably in the circumferential direction (direction of the arrow B) along the spherical surface 136 about a center of rotation of the axis of the trunnion 128*a* (128*b*, 128*c*).

Further, the trunnion 128*a* (128*b*, 128*c*) and the inner roller 142 are provided displaceably in the vertical direction (direction of the arrow C) in an integrated manner with respect to the needle bearings 144 held by the outer roller 146.

Furthermore, trunnion 128*a* (128*b*, 128*c*) is provided slidably in the axial direction (direction of the arrow D) of the outer cup along the guide track 118 by the aid of the outer roller 146 provided with the annular projection 156 to make engagement with the groove 124*a*, 124*b*.

The constant velocity universal joint 110 according to the tenth embodiment of the present invention is basically constructed as described above. Next, its operation, function, and effect will be explained.

The rotary force of the outer cup 112 is transmitted to the inner roller 142 via the needle bearings 144 and the outer roller 146 contacting with the guide track 118. The rotary force is transmitted to the trunnions 128*a* (128*b*, 128*c*) via the spherical surfaces 136 which make surface-to-surface contact with the recesses 140 of the inner rollers 142. Thus, the second shaft 113, which is engaged with the trunnions 128*a* (128*b*, 128*c*), is rotated.

In this arrangement, when the second shaft 113 is inclined by a predetermined angle with respect to the outer cup 112 provided with the first shaft, then the trunnion 128*a* (128*b*, 128*c*) makes sliding movement in the direction of the arrow A about the center of rotation of the point O, or the trunnion 128*a* (128*b*, 128*c*) makes sliding movement in the circumferential direction (direction of the arrow B) along the recess 140 having the spherical surface about the center of rotation of the axis of the trunnion 128*a* (128*b*, 128*c*), while maintaining the state in which the spherical surface 136 of the trunnion 128*a* (128*b*, 128*c*) makes surface-to-surface contact with the recess 140 having the spherical surface formed on the inner roller 142.

The trunnion 128*a* (128*b*, 128*c*) is also displaced along the axial direction (direction of the arrow C) of the trunnion 128*a* (128*b*, 128*c*) integrally with the inner roller 142 which makes sliding movement with respect to the needle bearings 144 held by the outer roller 146.

Further, the trunnion 128*a* (128*b*, 128*c*) is displaced in the direction substantially perpendicular to the axis of the trunnion 128a (128b, 128c), i.e., in the longitudinal direction of the guide track 118 by the aid of the outer roller 146 which makes sliding movement along the guide track 118. In this arrangement, the first engaging surface 158 is engaged with the ceiling section 120, and the second engaging surface 160 is engaged with the shoulder 125. Accordingly, the attitude of the outer roller 146 is maintained so that the outer roller 146 is substantially parallel to the axial direction of the outer cup 112.

Therefore, it is possible to decrease the sliding friction of the outer roller 146, and it is possible to suppress the occurrence of friction resulting from the sliding friction, by maintaining the attitude of the outer roller 146 so that the outer roller 146 is substantially parallel to the axial direction of the outer cup 112.

The outer roller 146 is provided such that it slides along the guide track 118 by the aid of the annular projection 156 and the outer circumferential surface 162, and it rolls on the guide track 118 by the aid of the needle bearings 144 intervening between the outer roller 146 and the inner roller 142. Therefore, it is possible to decrease the coefficient of friction. Further, the outer roller 146 makes surface-to-surface contact with the guide track 118 via the annular projection 156 and the outer circumferential surface 162. Therefore, the contact area is increased, and it is possible to reduce the contact surface pressure.

Thus, the rotary motion of the first shaft is smoothly transmitted to the second shaft 113 without being affected by the angle of inclination of the second shaft 113 with respect to the outer cup 112.

In the tenth embodiment, the spherical surface 136 is provided on the side surface of the trunnion 128a (128b, 128c) to make sliding movement with respect to the inner roller 142 formed with the recess 140 corresponding to the spherical surface 136. Further, the trunnion 128a (128b, 128c) and the inner roller 142 are provided displaceably along the axial direction of the trunnion 128a (128b, 128c). Thus, it is possible to decrease the slide resistance and reduce the induced thrust force. Furthermore, the trunnion 128a (128b, 128c) and the recess 140 of the inner roller 142 make surface-to-surface contact with each other to reduce the contact surface pressure. Thus, it is possible to improve the durability of the constant velocity universal joint 110.

Next, a method for assembling the constant velocity universal joint according to the tenth embodiment of the present invention will be explained below, as exemplified by a case in which the trunnion 128a (128b, 128c) is installed into the hole 150 of the inner roller 142.

Figure 36:
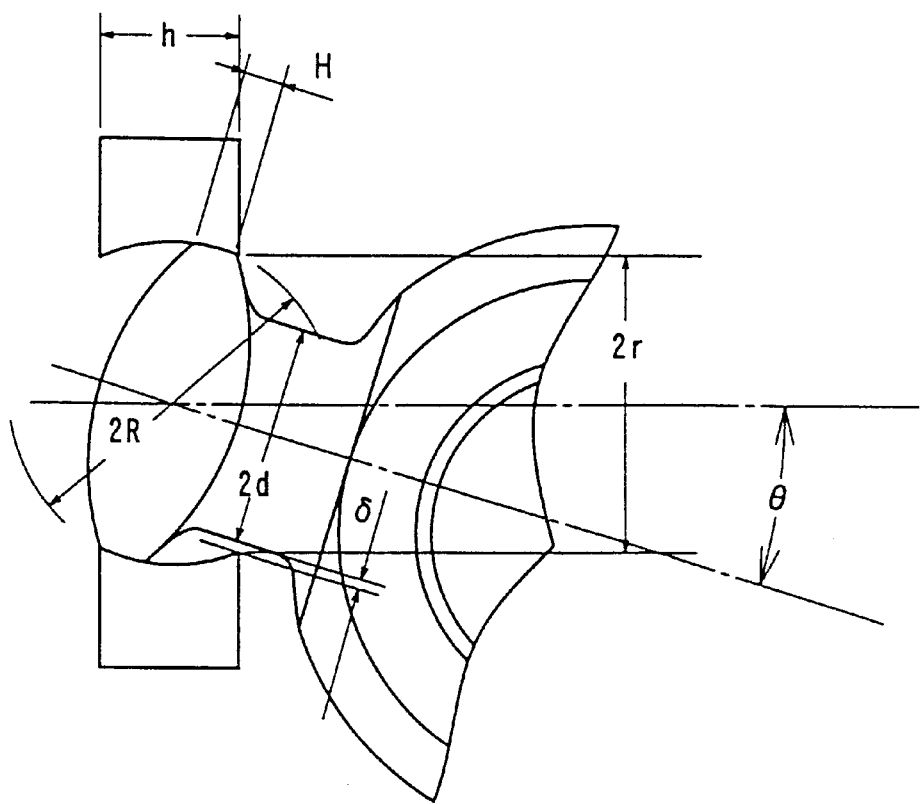
FIG. 36 illustrates the setting condition for installing the inner roller to the trunnion of the constant velocity universal joint shown in FIG. 25.

The inner roller 142 (see FIG. 31), which is provided with the substantially elliptical cutout 152, is used as follows. That is, as shown in FIG. 36, the trunnion 128a (128b, 128c) is inserted along the substantially elliptical cutout 152, while inclining the trunnion 128a (128b, 128c) by an angle θ with respect to the inner roller 142. Thus, the inner roller 142 is installed to the trunnion 128a (128b, 128c). In this arrangement, the second shaft 113 extends in a direction substantially perpendicular to the plane of paper of FIG. 36.

Figure 35:
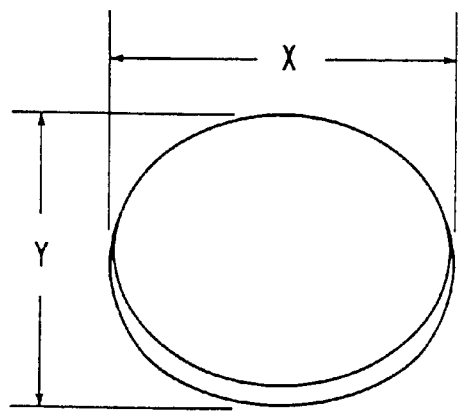
FIG. 35 illustrates a setting condition for installing the inner roller to the trunnion of the constant velocity universal joint shown in FIG. 25.

Symbols in FIGS. 35 and 36 are as follows. That is, the assembling angle is represented by θ. The radius of the spherical surface 136 of the trunnion 128a (128b, 128c) is represented by R. The spherical surface width of the trunnion 128a (128b, 128c) is represented by H. The short radius of the cutout 152 of the inner roller 142 is represented by r. The width of the inner roller 142 is represented by h. The radius of the trunnion 128a (128b, 128c) is represented by d. The projected long width of the spherical surface 136 of the trunnion 128a (128b, 128c), which is obtained when the assembling angle is inclined by θ, is represented by X. The projected short width of the spherical surface 136 of the trunnion 128a (128b, 128c), which is obtained when the assembling angle is inclined by θ, is represented by Y. The clearance between the cutout 152 of the inner roller 142 and the neck section 130 of the trunnion 128a (128b, 128c) is represented by δ.

In this embodiment, the condition, under which the projected short width Y of the spherical surface 136 of the trunnion 128a (128b, 128c) is smaller than 2R (diameter of the spherical surface) (the spherical surface 136 is ensured within the width h of the inner roller 142), is represented by the following expression (1).

$$R - H \sin\theta - \sqrt{R^2 - H^2}\cos\theta > 0 \qquad (1)$$

The condition, under which Y<X is satisfied, is represented by the following expression (2).

$$\theta - \cos^{-1}\frac{\sqrt{R^2 - H^2}}{R} > 0 \qquad (2)$$

The condition, under which the trunnion 128a (128b, 128c) does not interfere with the inner roller 142, is represented by the following expression (3).

$$\sqrt{r^2 + h^2} \cdot \sin\left(90° - \theta - \cos^{-1}\frac{r}{\sqrt{r^2 + h^2}}\right) - d > 0 \qquad (3)$$

The configurations of the trunnion 128a (128b, 128c) and the cutout 152 of the inner roller 142 are designed so that the foregoing expressions (1) to (3) are satisfied. It is assumed that the assembling angle θ is set to be larger than the angle formed by the axis of the trunnion 128a (128b, 128c) and the axis of the inner roller 142 determined on the basis of the operation angle of the constant velocity universal joint 110 (angle formed by the first shaft and the second shaft 113) on the plane of paper of FIG. 36 (plane including the central axes of the three trunnions 128a to 128c).

On the other hand, the columnar trunnion 133a (133b, 133c) (see FIG. 29) provided with the forcibly inserted ring member 135 is installed as follows to the inner roller 142a (see FIG. 37) which is provided with the pair of mutually opposing cutouts 152a, 152b. In this case, the spherical surface 136 of the trunnion 133a (133b, 133c) is inserted into the recess 140 of the inner roller 142 along the pair of cutouts 152a, 152b in a state in which the upper surface 154 of the inner roller 142 is allowed to be substantially perpendicular to the upper surface of the trunnion 133a (133b, 133c). The trunnion 133a (133b, 133c) is inclined so that the axis of the trunnion 133a (133b, 133c) is substantially perpendicular to the upper surface of the inner roller 142. Thus, the inner roller 142 is installed to the trunnion 133a (133b, 133c).

Figure 41:
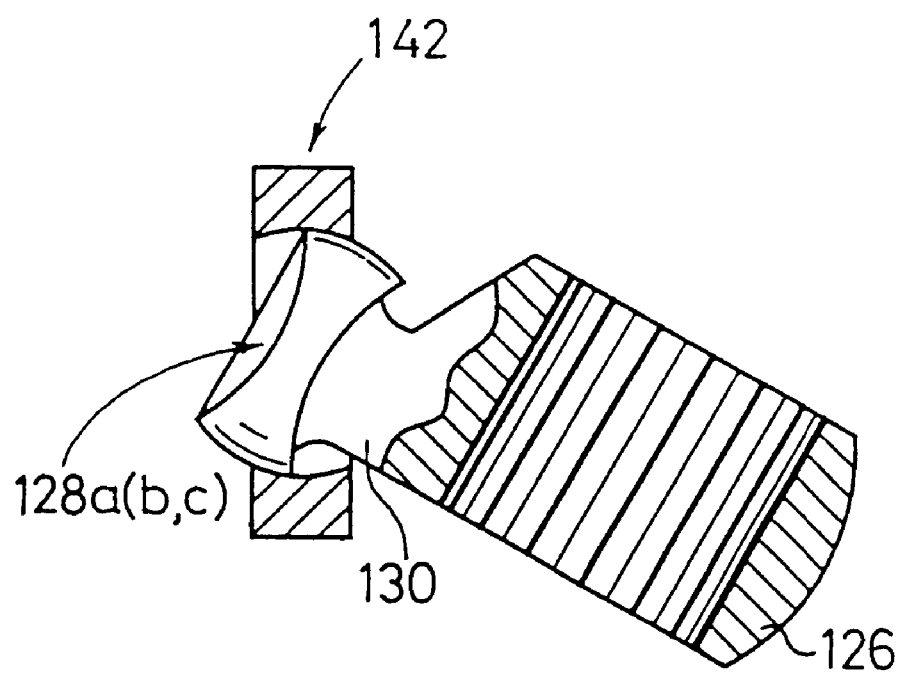
FIG. 41 shows a vertical sectional view, with partial omission, illustrating another modified embodiment of the trunnion for constructing the constant velocity universal joint shown in FIG. 25.

Alternatively, as shown in FIG. 41, the trunnion 128a (128b, 128c), which is formed to expand from the spider boss 126, may be constructed such that the neck section 130 is provided at a position deflected with respect to the axial direction from the central portion of the ring-shaped spider boss 126.

Figure 42:
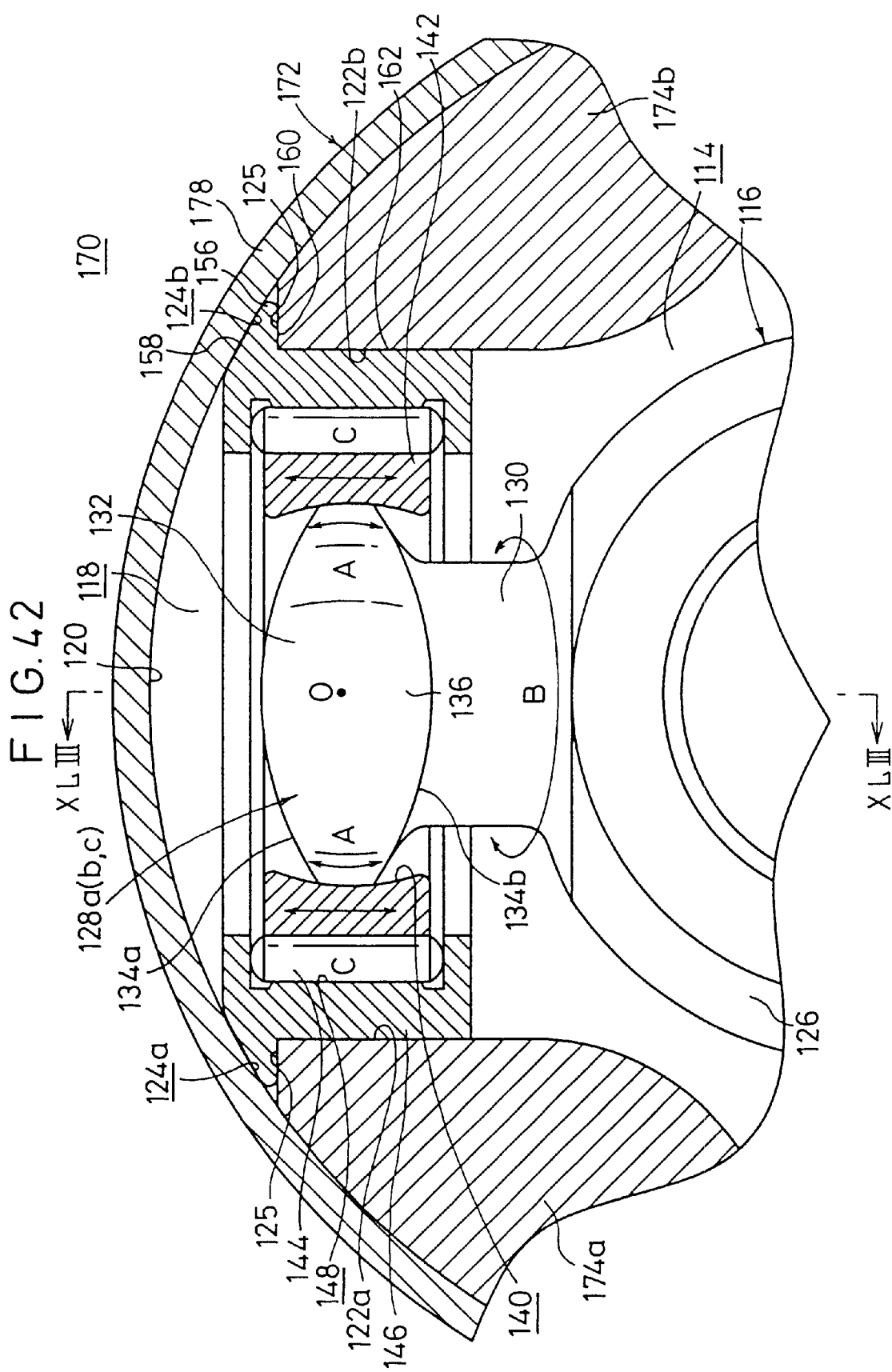
FIG. 42 shows, with partial omission, an enlarged vertical sectional view taken along a direction substantially perpendicular to a longitudinal direction of a constant velocity universal joint according to an eleventh embodiment of the present invention.
Figure 43:
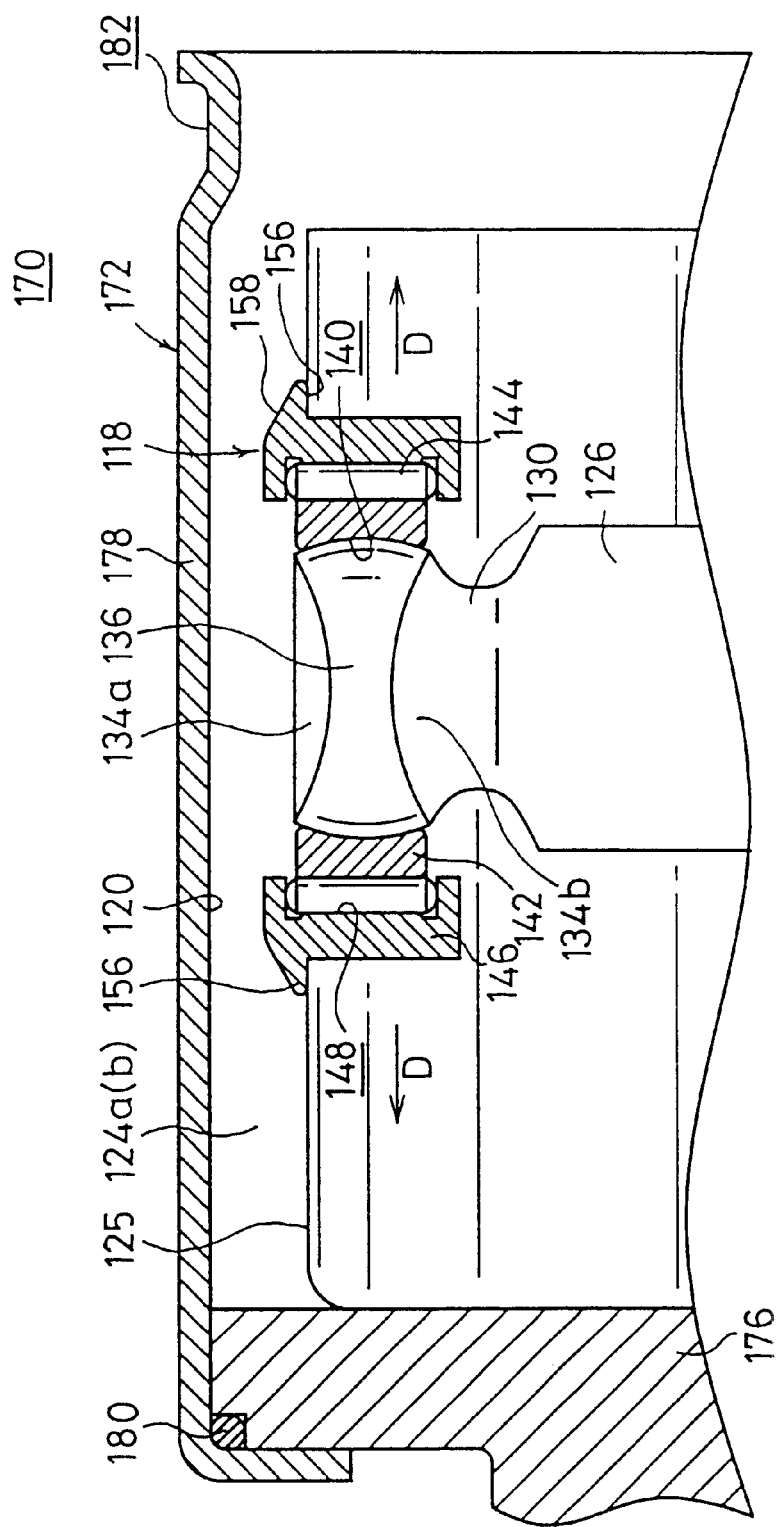
FIG. 43 shows a vertical sectional view taken along a line XLIII—XLIII shown in FIG. 42.
Figure 44:
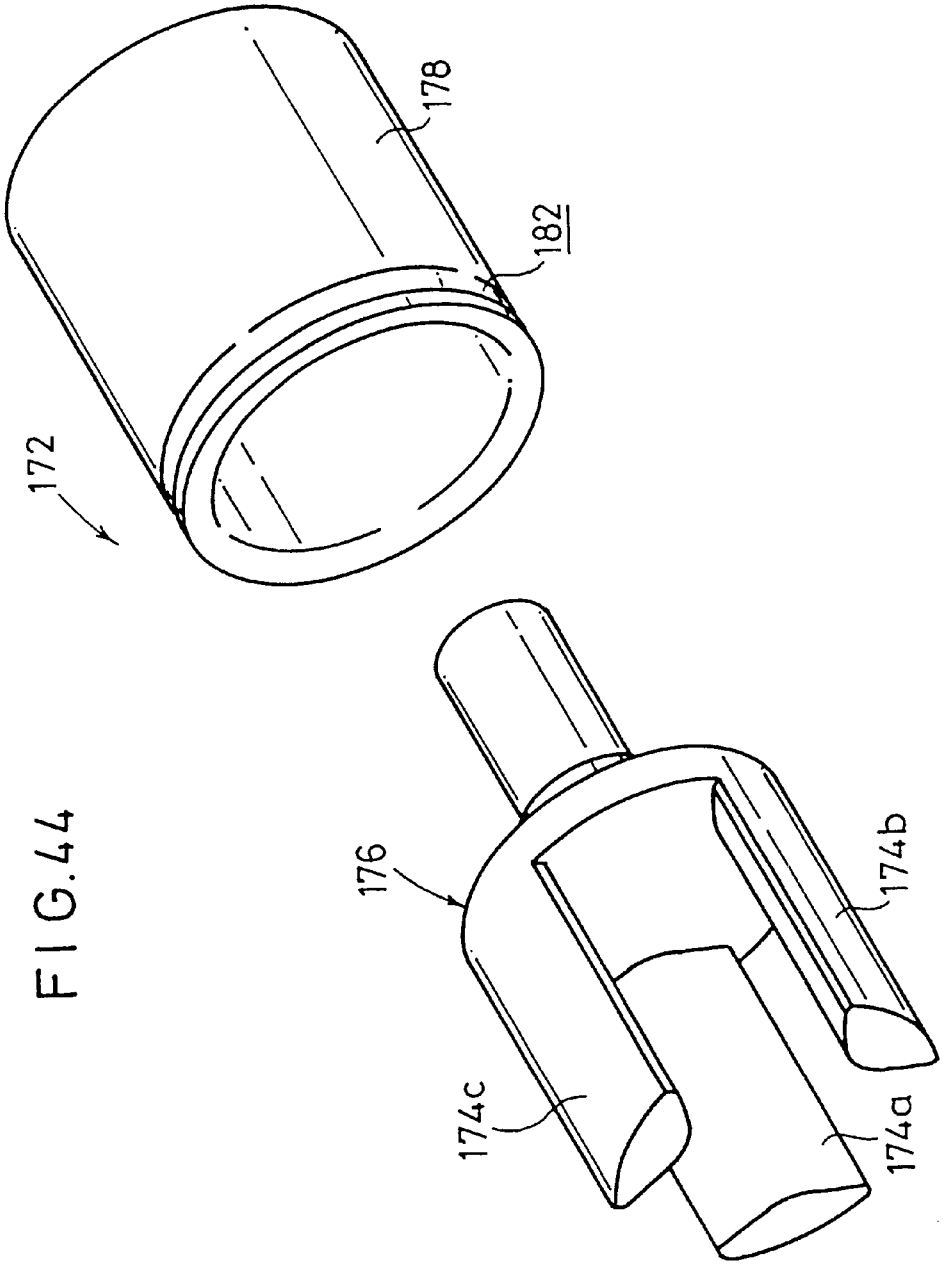
FIG. 44 shows an exploded perspective view illustrating an outer cup for constructing the constant velocity universal joint shown in FIG. 43.

Next, a constant velocity universal joint 170 according to the eleventh embodiment of the present invention is shown in FIGS. 42 to 44. The same constitutive components as those of the constant velocity universal joint 110 according to the tenth embodiment are designated by the same reference numerals, detailed explanation of which will be omitted.

The constant velocity universal joint 110 according to the tenth embodiment is different from the constant velocity universal joint 170 according to the eleventh embodiment in that the former comprises the outer cup 112 which is formed in the integrated manner, while the latter comprises an outer cup 172 which is composed of two members.

That is, as shown in FIG. 44, the outer cup 172 of the constant velocity universal joint 170 according to the eleventh embodiment has three expanded sections 174a to 174c which extend in the axial direction and which are formed and separated from each other by 120 degrees respectively about the central axis. The outer cup 172 comprises a main body 176 for forming guide tracks 118 between the adjoining expanded sections 174a to 174c, and a cylindrical member 178 for being externally fitted to the expanded sections 174a to 174c. An O-ring 180 for preventing any leakage of lubricating oil charged at the inside is installed at a connecting section between the main body 176 and the cylindrical member 178.

An annular groove 182 for fastening a boot (not shown) by the aid of an unillustrated band is formed at one end of the outer circumferential surface of the cylindrical member 178. In this embodiment, the cylindrical member 178 is formed by means of press working of an unillustrated iron plate. The annular groove 182 is simultaneously formed by means of press working as well.

Therefore, the constant velocity universal joint 170 according to the eleventh embodiment is advantageous as follows. That is, the formation of the annular groove 182, which has been performed by machining in the conventional technique, can be performed substantially simultaneously by means of the press working of the cylindrical member 178. Therefore, it is possible to eliminate the step required for the machining and improve the production efficiency.

The other construction, function, and effect are the same as those of the constant velocity universal joint 110 according to the tenth embodiment, detailed explanation of which is omitted.

The tenth and eleventh embodiments have been explained by using the tripod type constant velocity universal joints 110, 170 each of which is provided with the three trunnions 128a to 128c, 133a to 133c. However, there is no limitation thereto. It is a matter of course that the present invention is also applicable to unillustrated bipod type constant velocity universal joints.

Next, a constant velocity universal joint 210 according to the twelfth embodiment of the present invention is shown in FIGS. 45 to 54. The same constitutive components as those of the constant velocity universal joint 110 according to the tenth embodiment are designated by the same reference numerals, detailed explanation of which will be omitted.

Figure 45:
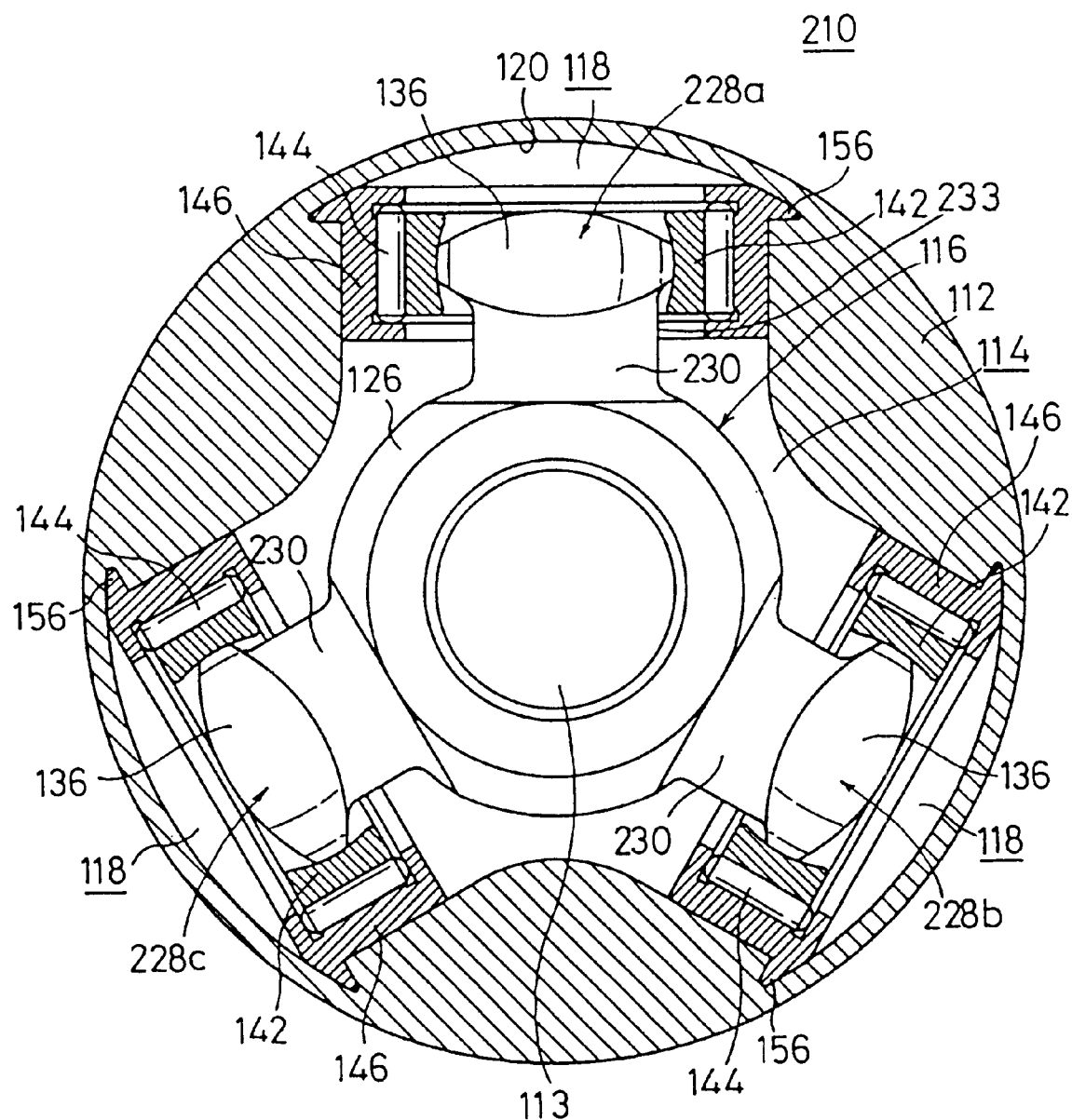
FIG. 45 shows a vertical sectional view taken along a direction substantially perpendicular to a longitudinal direction of a constant velocity universal joint according to a twelfth embodiment of the present invention.
Figure 46:
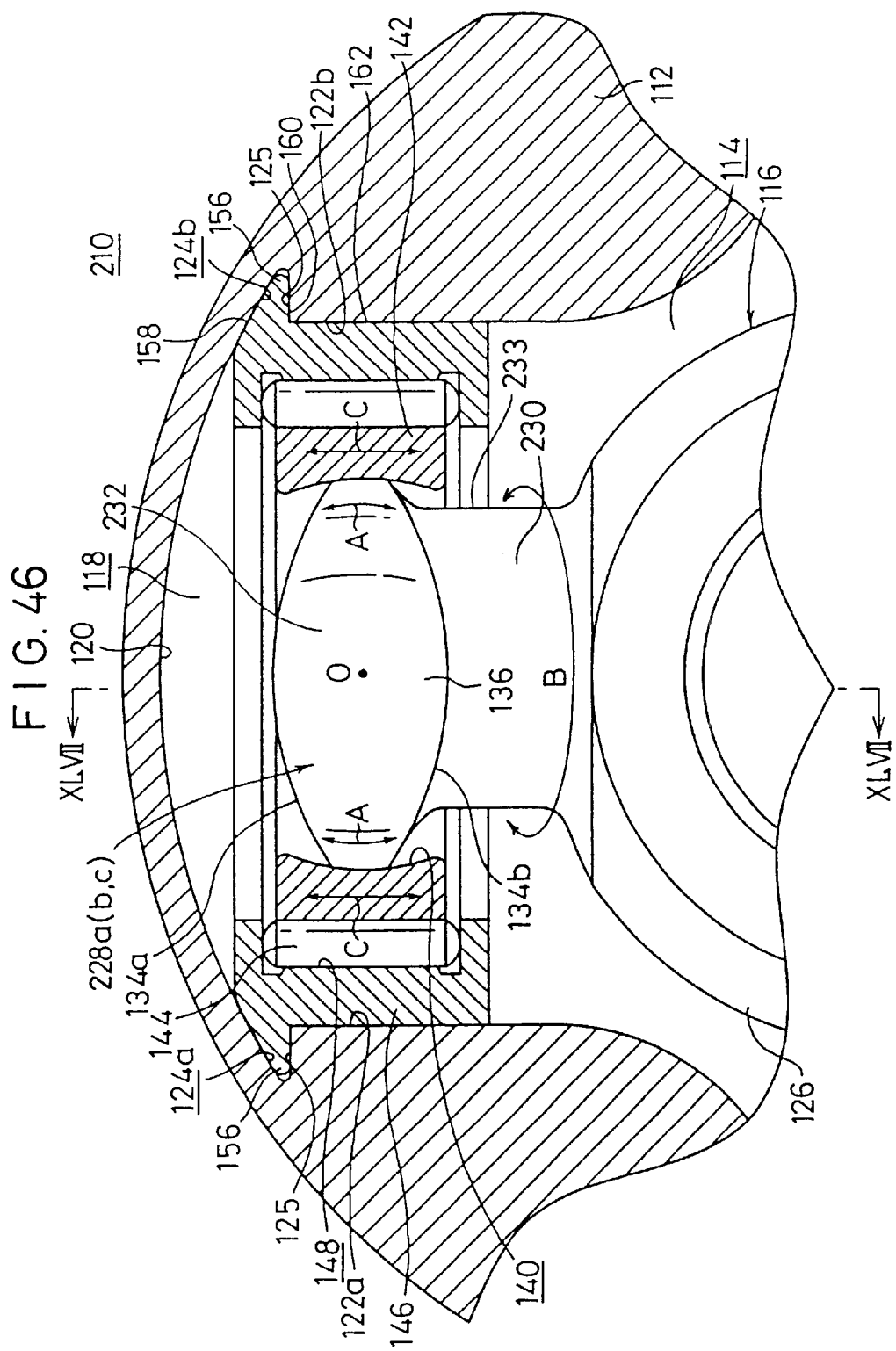
FIG. 46 shows an enlarged vertical sectional view, with partial omission, illustrating the constant velocity universal joint shown in FIG. 45.
Figure 47:
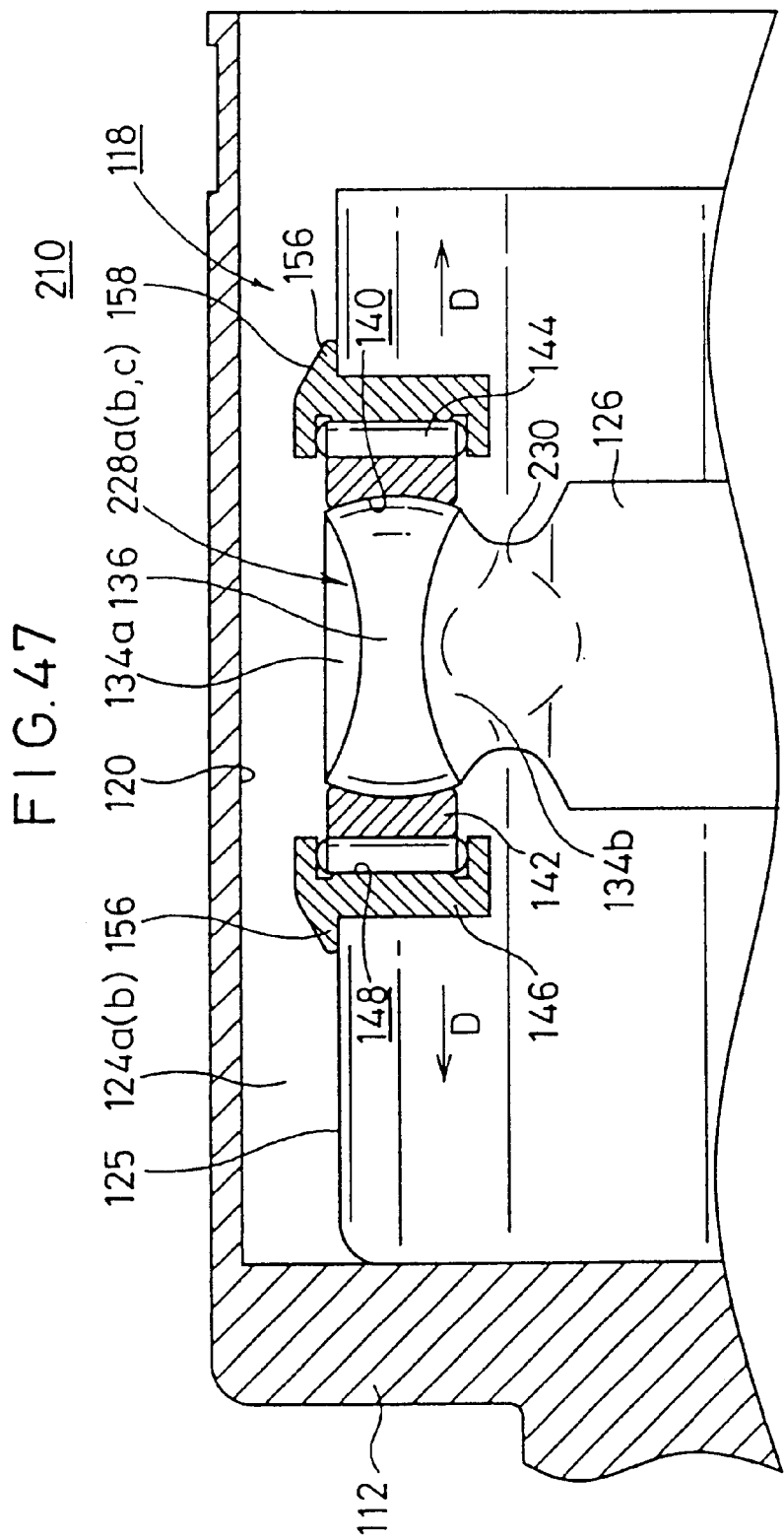
FIG. 47 shows a vertical sectional view taken along a line XLVII—XLVII shown in FIG. 46.
Figure 48:
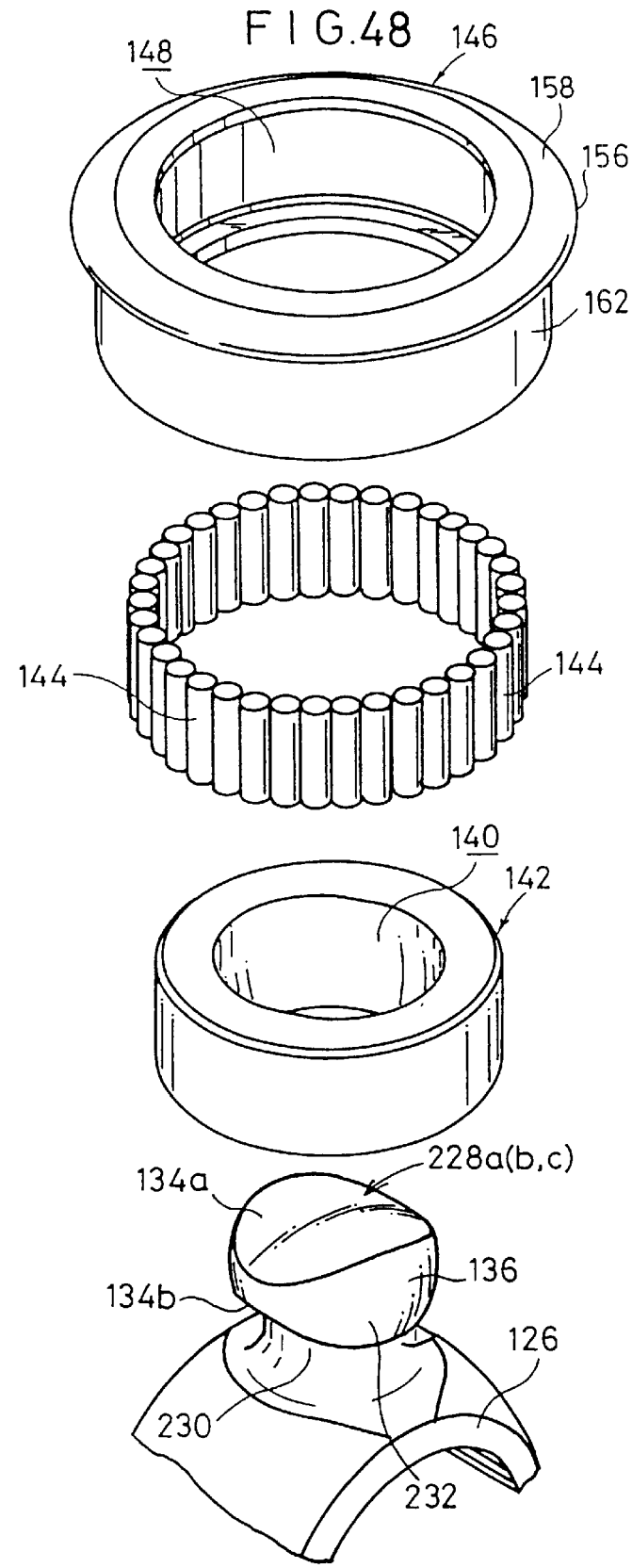
FIG. 48 shows an exploded perspective view illustrating an inner member for constructing the constant velocity universal joint shown in FIG. 45.
Figure 49:
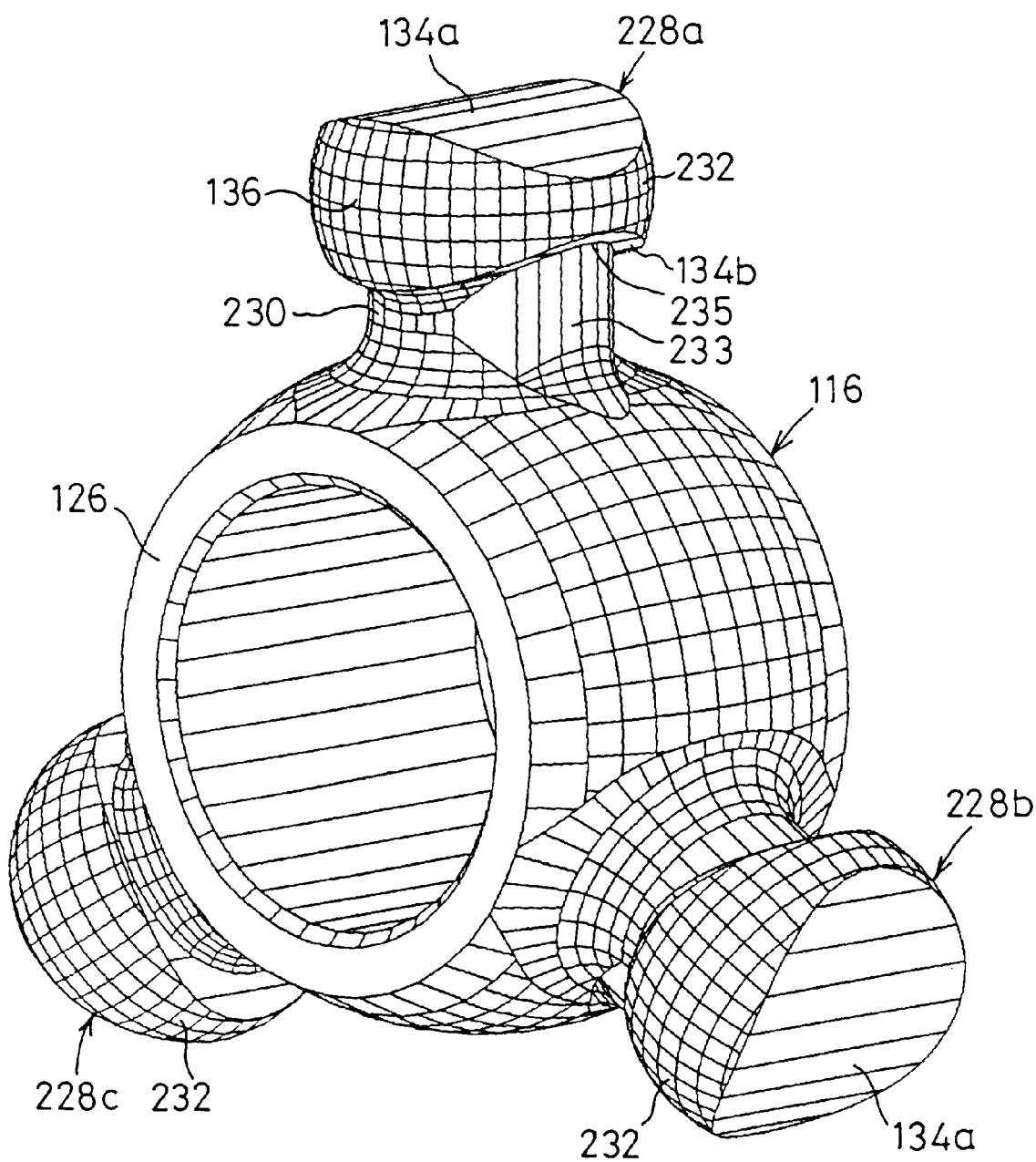
FIG. 49 shows a perspective view illustrating trunnions including a spider boss for constructing the constant velocity universal joint shown in FIG. 45.
Figure 50:
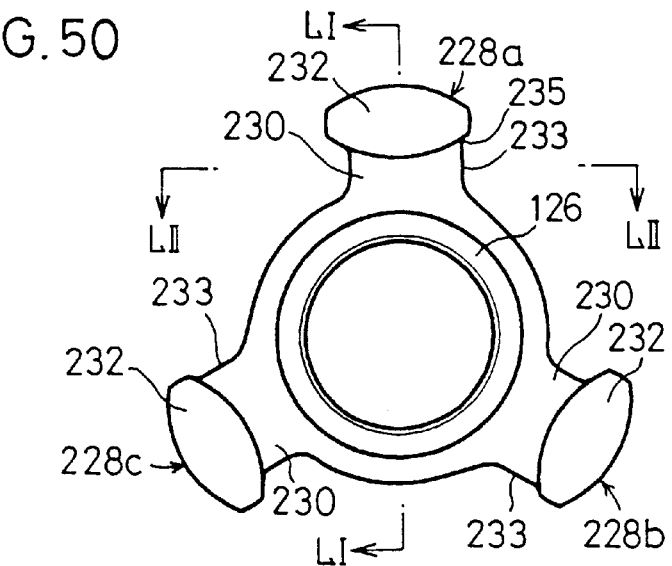
FIG. 50 shows a front view illustrating the trunnions shown in FIG. 49.
Figure 51:
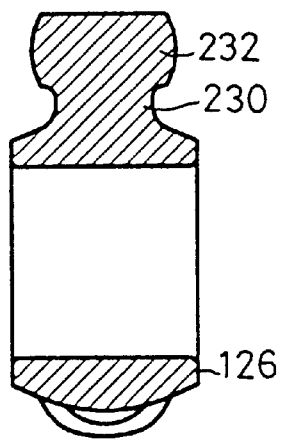
FIG. 51 shows a vertical sectional view taken along a line LI—LI shown in FIG. 50.

As shown in FIG. 45, each of trunnions 228a (228b, 228c) comprises a neck section 230 which expands radially outwardly from a ring-shaped spider boss 126, and a head section 232 which is constructed integrally with the neck section 230 and which is formed to have a thin-walled flat configuration.

Figure 52:
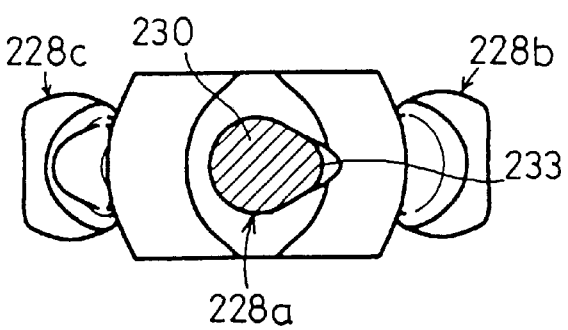
FIG. 52 shows a lateral sectional view taken along a line LII—LII shown in FIG. 50.
Figure 53:
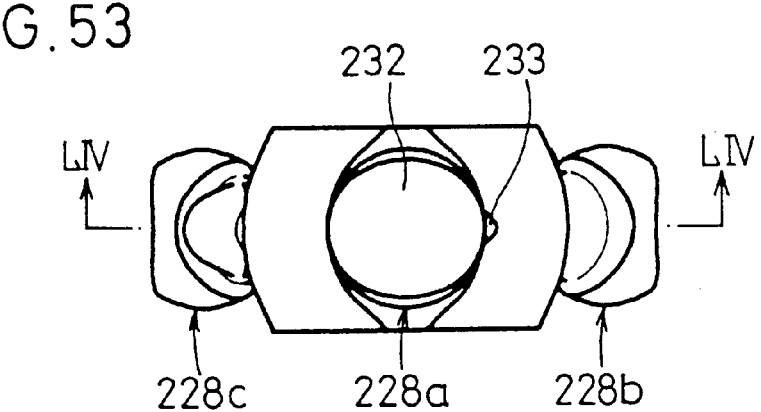
FIG. 53 shows a plan view illustrating the trunnions shown in FIG. 49.
Figure 54:
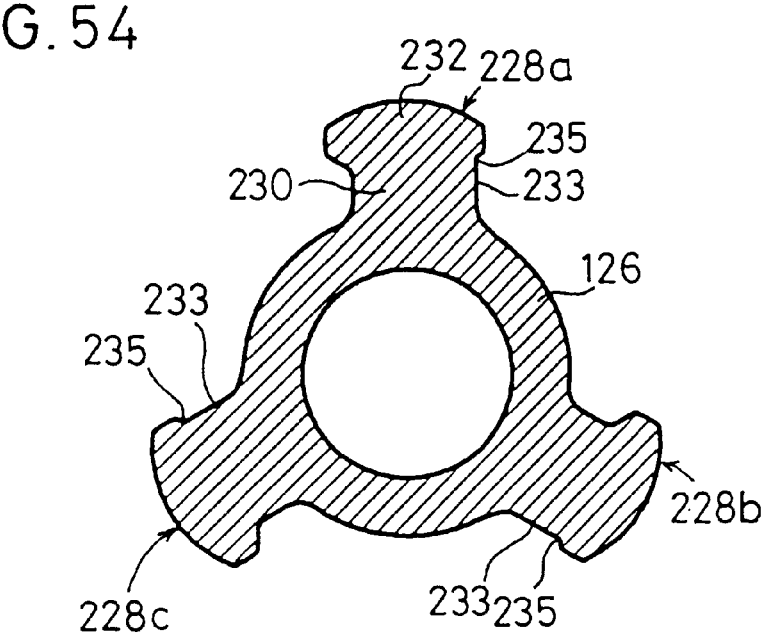
FIG. 54 shows a vertical sectional view taken along a line LIV—LIV shown in FIG. 53.
Figure 55:
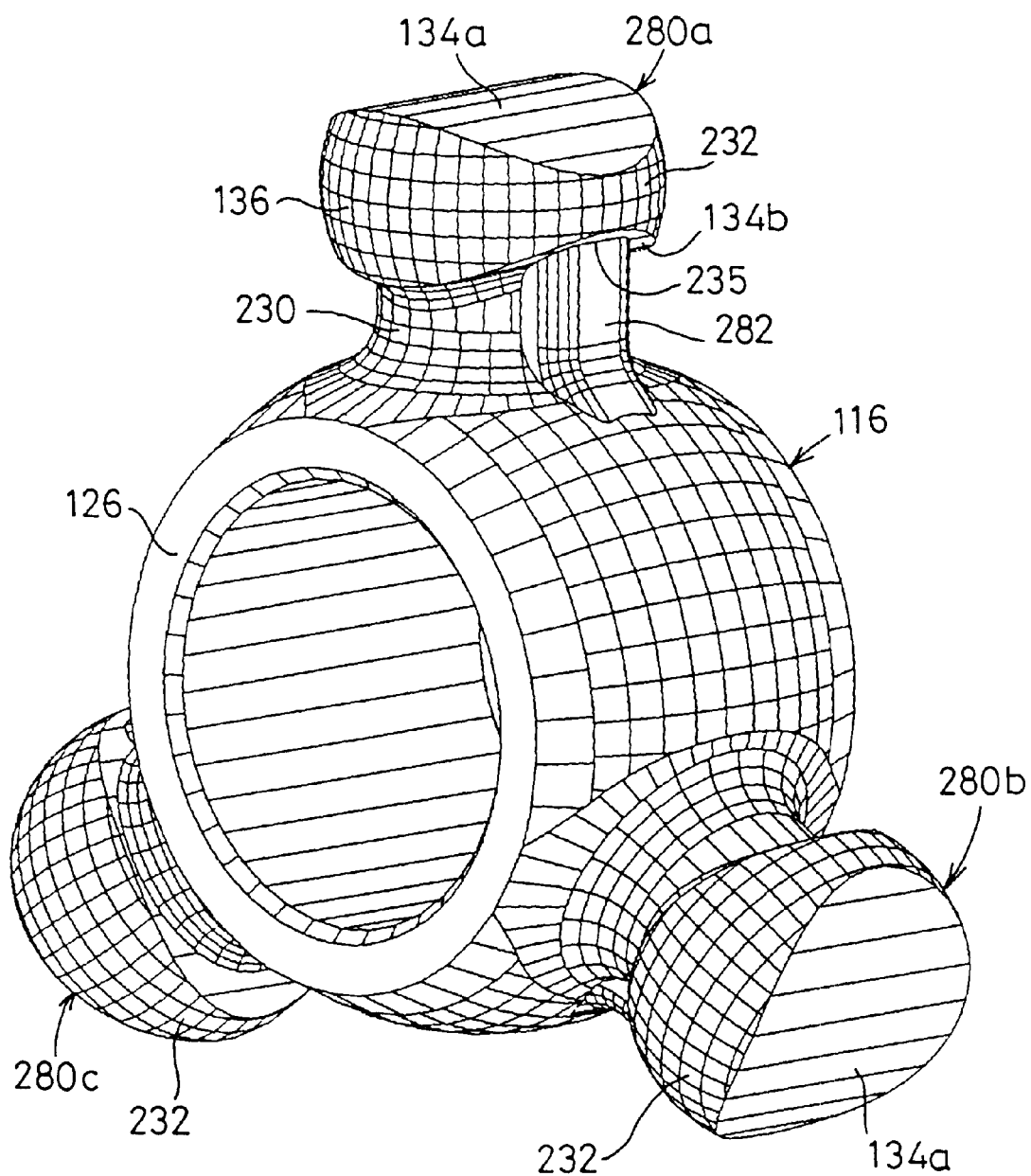
FIG. 55 shows a perspective view illustrating trunnions according to a modified embodiment.
Figure 59:
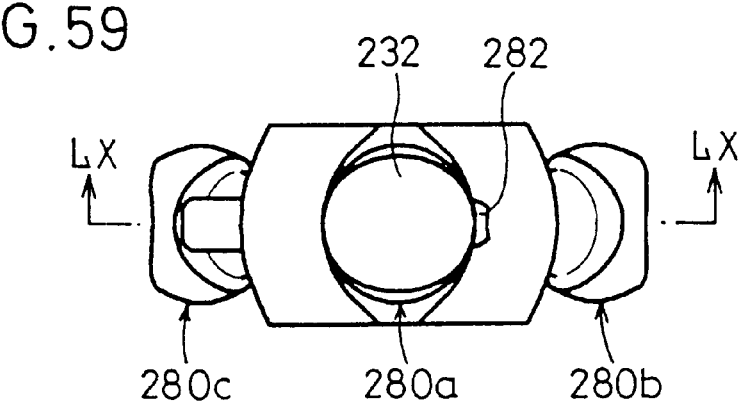
FIG. 59 shows a plan view illustrating the trunnions shown in FIG. 55.
Figure 60:
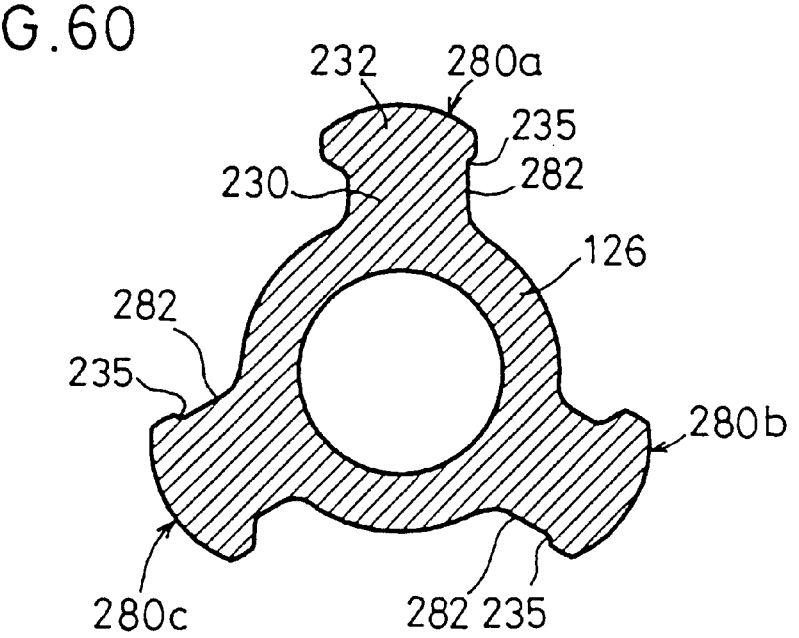
FIG. 60 shows a vertical sectional view taken along a line LX—LX shown in FIG. 59.
Figure 62:
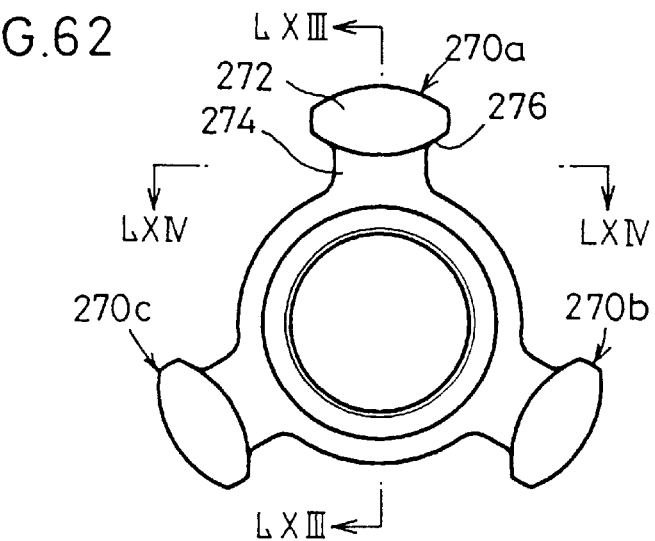
FIG. 62 shows a front view illustrating the trunnions shown in FIG. 61.
Figure 63:
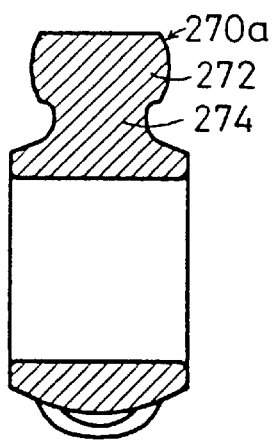
FIG. 63 shows a vertical sectional view taken along a line LXIII—LXIII shown in FIG. 62.
Figure 64:
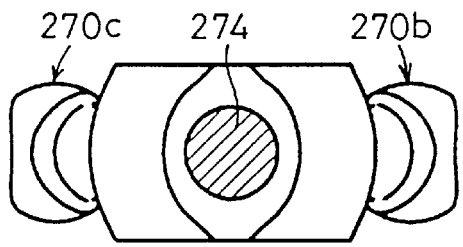
FIG. 64 shows a lateral sectional view taken along a line LXIV—LXIV shown in FIG. 62.
Figure 65:
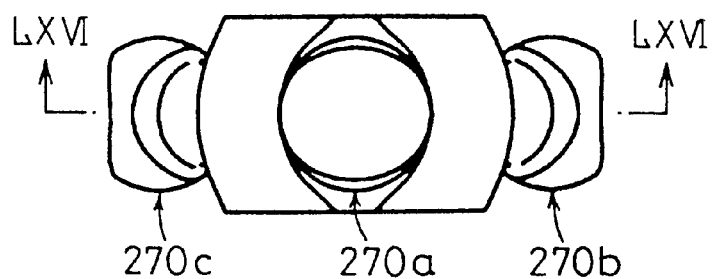
FIG. 65 shows a plan view illustrating the trunnions shown in FIG. 61.
Figure 66:
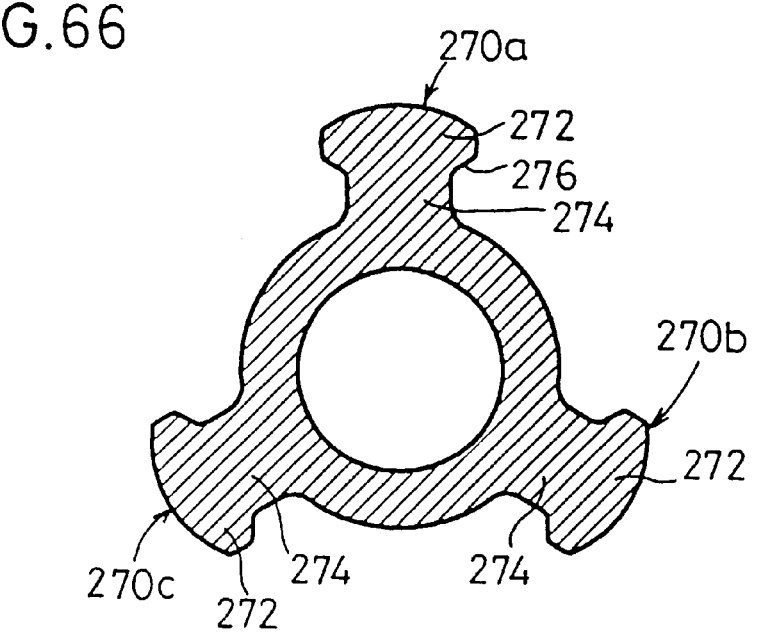
FIG. 66 shows a vertical sectional view taken along a line LXVI—LXVI shown in FIG. 62.

As shown in FIGS. 49 to 54, a nape section 233, which slightly expands toward the adjoining trunnion 228b (228c, 228a), is integrally formed on one side along the circumferential direction of the spider boss 126, of the neck section 230 of each of the trunnions 228a (228b, 228c). As shown in FIG. 52, the nape section 233 has its cross-sectional configuration which is gradually tapered-off toward the adjoining trunnion 228b as viewed from the side of the head section 232. As shown in FIG. 54, the nape section 233 has its cross-sectional configuration which is formed to have a substantially linear shape substantially along the vertical direction and substantially continuously to a slightly narrow part 235 of the head section 232 as viewed in the axial direction of the second shaft 113.

Comparison and investigation will now be made for the shape of a comparative trunnion 270a (270b, 270c) (see FIGS. 61 to 66) and for the shape of the trunnion 228a (228b, 228c) according to the twelfth embodiment.

In the case of the comparative trunnion 270a (270b, 270c), the cross-sectional configuration of the neck section 274 of the trunnion 270a (270b, 270c) is formed to be a perfect circle as viewed from the side of the head section 272. On the contrary, in the case of the trunnion 228a (228b, 228c) for constructing the constant velocity universal joint 210 according to the twelfth embodiment, the nape section 233, which expands merely slightly toward one side of the adjoining trunnion 228b (228c, 228a), is formed. The cross-sectional configuration thereof is formed to have the curved configuration which is gradually tapered-off as viewed from the side of the head section 232.

In the case of the comparative trunnion 270a (270b, 270c), the narrow part 276 (see FIG. 66) of the head section 272 is large, and it is formed in linear symmetry in which the axis of the head section 272 is the axis of symmetry, as viewed in the axial direction of the second shaft 113. On the contrary, in the case of the twelfth embodiment, the diameter of the neck section 230 is large as compared with the comparative trunnion 270a (270b, 270c), and the trunnion 228a (228b, 228c) is formed asymmetrically.

Therefore, in the twelfth embodiment, the support cross-sectional area of the trunnion 228a to 228c can be increased, and it is possible to further improve the strength of the trunnion 228a to 228c. Further, in the twelfth embodiment, the nape section 233 is formed only one side along the circumferential direction of the spider boss 226. Therefore, the assembling performance of the trunnion 228a to 228c is not inhibited with respect to the inner roller 142. Thus, it is possible to smoothly assemble the trunnion 228a to 228c to the inner roller 142. Furthermore, the cross-sectional shape of the nape section 233, which is formed to have the curved configuration, makes it possible to simplify the structure of an unillustrated die to be used for integrally forming the trunnions 228a to 228c including the spider boss 126.

Next, trunnions 280a to 280c according to a modified embodiment are shown in FIGS. 55 to 60. The trunnion 280a to 280c according to this modified embodiment differs in that the cross-sectional configuration of a nape section 232 is angular as viewed from the side of the head section 232 (see FIG. 58). The cross-sectional configuration, which is formed to be angular, is advantageous in that the support cross-sectional area of the trunnion 280a to 280c can be made larger. The other function and effect are the same as those of the foregoing embodiment, detailed explanation of which is omitted.

What is claimed is:

1. A constant velocity universal joint having a cylindrical outer member which is connected to a first transmission shaft and which is provided, on its inner wall surface, with a plurality of guide tracks separated from each other by predetermined spacing distances and extending along an axial direction, and an inner member which is connected to a second transmission shaft and which is inserted into an open inner space of said outer member, said constant velocity universal joint comprising:

trunnions each of which expands toward said guide track and each of which includes a first curved surface and a second curved surface which are opposed to one another, as well as a spherical surface which surrounds said first curved surface and said second curved surface;

first annular members each of which is externally fitted to said trunnion and each of which has a recess having a spherical surface formed on an inner circumferential surface to make surface-to-surface contact corresponding to said spherical surface;

second annular members each of which is externally fitted to said first annular member via a bearing member and each of which is provided relatively displaceably with respect to said first annular member along an axial direction of said trunnion; and an attitude-holding mechanism for maintaining an attitude of said second annular member so that said second annular member is substantially parallel to an axial direction of said outer member.

2. The constant velocity universal joint according to claim 1, wherein said trunnion is integrally formed with a neck section expanding from a ring-shaped spider boss, and a head section continuing to said neck section, a first curved surface, which is cut out to have a circular arc-shaped cross section, is formed on an upper surface of said head section along a circumferential direction of said outer member, and a spherical surface is formed on an outer circumferential surface which is continuous to said upper surface.

3. The constant velocity universal joint according to claim 1, wherein said attitude-holding mechanism includes a pair of grooves which are formed mutually opposingly at both ends of a ceiling section of said guide track and which extend along said axial direction of said outer member, and an annular projection which is formed along an outer circumferential surface of said second annular member, for making engagement with said grooves.

4. The constant velocity universal joint according to claim 3, wherein said annular projection has a first engaging surface for engaging with said ceiling section having a circular arc-shaped cross section for constructing said guide track, and a second engaging surface for engaging with a substantially flat shoulder formed on said groove.

5. The constant velocity universal joint according to claim 1, wherein a non-circular cutout, which continues to said recess having said spherical surface and which includes a substantially elliptic configuration, is provided on said inner circumferential surface of said first annular member.

6. The constant velocity universal joint according to claim 1, wherein a pair of mutually opposing cutouts each having a circular arc-shaped configuration, which continue to said recess having said spherical surface, are formed on said inner circumferential surface of said first annular member.

7. The constant velocity universal joint according to claim 5, wherein said non-circular cutout and said trunnion to be fitted into a hole of said first annular member via said cutout are designed to satisfy the following expressions (1) to (3):

$$R - H\sin\theta - \sqrt{R^2 - H^2} \cdot \cos\theta > 0 \quad (1)$$

$$\theta - \cos^{-1}\frac{\sqrt{R^2 - H^2}}{R} > 0 \quad (2)$$

$$\sqrt{r^2 + h^2} \cdot \sin\left(90° - \theta - \cos^{-1}\frac{r}{\sqrt{r^2 + h^2}}\right) - d > 0 \quad (3)$$

wherein an assembling angle is represented by $\theta$, a radius of said spherical surface of said trunnion is represented by R, a spherical surface width of said trunnion is represented by H, a short radius of said cutout of said first annular member is represented by r, a width of said first annular member is represented by h, a radius of said trunnion is represented by d, a projected long width of said spherical surface of said trunnion, which is obtained when said assembling angle is inclined by $\theta$, is represented by X, and a projected short width of said spherical surface of said trunnion, which is obtained when said assembling angle is inclined by $\theta$, is represented by Y.

8. The constant velocity universal joint according to claim 2, wherein said neck section is provided at a position deflected from a center of said spider boss.

9. The constant velocity universal joint according to claim 1, wherein said outer member has a plurality of expanded sections which extend in said axial direction and which are formed and separated from each other by predetermined angles respectively about a central axis, and said outer member comprises a main body for forming said guide tracks between said adjoining expanded sections, and a cylindrical member for being externally fitted to said expanded sections.

10. The constant velocity universal joint according to claim 1, wherein said bearing member comprises a plurality of needle bearings which are held on an outer circumferential surface of said first annular member or on an inner circumferential surface of said second annular member, and said first annular member and said second annular member are provided relatively displaceably along said axial direction of said trunnion in accordance with a sliding action on said needle bearings.

11. The constant velocity universal joint according to claim 10, wherein said plurality of needle bearings are held on said inner circumferential surface of said second annular member owing to a keystone effect.

12. The constant velocity universal joint according to claim 1, wherein said trunnion has a neck section which protrudes radially outwardly from a ring-shaped spider boss, and a head section which continues to said neck section, and a nape section, which expands toward said adjoining trunnion, is formed on one side of said neck section.

13. The constant velocity universal joint according to claim 12, wherein said nape section is formed to have a curved cross section which is gradually tapered-off toward said adjoining trunnion as viewed from a side of said head section.

14. The constant velocity universal joint according to claim 12, wherein said nape section is formed to have a rectangular cross section as viewed from a side of said head section.

15. A method for assembling a constant velocity universal joint having a cylindrical outer member which is connected to a first transmission shaft and which is provided, on its inner wall surface, with a plurality of guide grooves separated from each other by predetermined spacing distances and extending along an axial direction, and an inner member which is connected to a second transmission shaft and which is inserted into an open inner space of said outer member, wherein a pair of mutually opposing cutouts each having a circular arc-shaped configuration are formed on an inner circumferential surface of a first annular member, said method comprising the step of:

inserting a spherical surface of a trunnion into a recess having a spherical surface of said first annular member along said pair of cutouts so that said trunnion is installed into a hole of said first annular member.

16. A method for assembling a constant velocity universal joint having a cylindrical outer member which is connected to a first transmission shaft and which is provided, on its inner wall surface, with a plurality of guide tracks separated from each other by predetermined spacing distances and extending along an axial direction, and an inner member which is connected to a second transmission shaft and which is inserted into an open inner space of said outer member, wherein a first curved surface, a second curved surface, and a spherical surface which surrounds said first curved surface and said second curved surface are formed on a trunnion, while a non-circular cutout including a substantially elliptic configuration is formed on an inner circumferential surface of an annular member, said method comprising the step of:

inclining said trunnion by a predetermined angle with respect to said annular member to insert said spherical surface of said trunnion into a recess having a spherical surface of said annular member along said non-circular cutout so that said trunnion is installed into a hole of said annular member.

17. The method for assembling said constant velocity universal joint according to claim 16, wherein said non-circular cutout and said trunnion to be fitted into said hole of said annular member via said cutout are designed to satisfy the following expressions (1) to (3):

$$R - H\sin\theta - \sqrt{R^2 - H^2} \cdot \cos\theta > 0 \tag{1}$$

$$\theta - \cos^{-1}\frac{\sqrt{R^2 - H^2}}{R} > 0 \tag{2}$$

$$\sqrt{r^2 + h^2} \cdot \sin\left(90° - \theta - \cos^{-1}\frac{r}{\sqrt{r^2 + h^2}}\right) - d > 0 \tag{3}$$

wherein an assembling angle is represented by $\theta$, a radius of said spherical surface of said trunnion is represented by R, a spherical surface width of said trunnion is represented by H, a short radius of said cutout of said annular member is represented by r, a width of said annular member is represented by h, a radius of said trunnion is represented by d, a projected long width of said spherical surface of said trunnion, which is obtained when said assembling angle is inclined by $\theta$, is represented by X, and a projected short width of said spherical surface of said trunnion, which is obtained when said assembling angle is inclined by $\theta$, is represented by Y.

* * * * *